United States Patent [19]

Pasetes, Jr. et al.

[11] Patent Number: 5,202,977

[45] Date of Patent: Apr. 13, 1993

[54] EDI TRANSLATION SYSTEM USING PLURALITY OF COMMUNICATION PROCESSES AND DE-ENVELOPING PROCEDURE CORRESPONDING TO TRANSMITTED COMMUNICATION PROCESS

[75] Inventors: Emmanuel K. Pasetes, Jr., Danville; Lew Jenkins, Pleasant Hill, both of Calif.

[73] Assignee: Premenos Corp., Concord, Calif.

[21] Appl. No.: 552,080

[22] Filed: Jul. 13, 1990

[51] Int. Cl.⁵ .................... G06F 15/21; G06F 15/24
[52] U.S. Cl. .................... 395/500; 364/401; 364/408; 364/DIG. 1
[58] Field of Search ........ 364/401, 408, 200 MS File, 364/900 MS File; 345/500

[56] References Cited

U.S. PATENT DOCUMENTS

| | | | |
|---|---|---|---|
| 4,667,290 | 5/1987 | Goss et al. | 364/200 |
| 4,729,096 | 3/1988 | Larson | 364/200 |
| 4,787,035 | 11/1988 | Bourne | 364/200 |
| 4,860,203 | 8/1989 | Corrigan et al. | 364/200 |
| 4,951,196 | 8/1990 | Jackson | 364/401 |

*Primary Examiner*—Thomas C. Lee
*Assistant Examiner*—L. Donaghue
*Attorney, Agent, or Firm*—Kenyon & Kenyon

[57] ABSTRACT

A language-based electronic data interchange ("EDI") translation system provides the capability to receive data in a first format from a source, execute a script to translate the data into a second format, and transmit the data in the second format to a destination. The system employs a data tree structure to enable flexible translation between EDI documents and application documents with differing data structures.

18 Claims, 30 Drawing Sheets

```
                    8110              8120
stream =       Envelope    ("ATTMAIL")
     8210  SendUnixMail  (stream)
     vfList = ReadUnixMail ("ATTMAIL");
                    8510 for each in vfList
   begin
8410  MakeMailInterchange
   end
```

FIG. 3

```
{       ' read and discard text up to first occurrence of BS or ISA
9110    cursor = OpenInterchange(stdin, "ISA")
9210    xcan = Deenvelope(X12,cursor)         ' extract virtual file
        while not null (xacn) begin
          route (xacn)                        ' send virtual file to servicer
          xacn = Deenvelope(X12,cursor);      ' and repeat
        }
}
```

FIG. 4

```
(defun convmonth (m d y)
  (catch '$retval_convmonth
    (setq mdy (concat m d))
    (setq mdy (concat md y))
    (throw '$retval_convmonth mdy)))
```

```
10110  (setq invoice '(
                  (loop
                    ((record header)
                      (progn
                        (printf "%s" "remit to: ")
                        (printf "%x" contact)
                        (printf "\n")))
                    ((record unused))
                      (setq invdate (convmonth month day year))
                      (progn
                        (printf "%s" "date: ")
                        (printf "%s" invdate)
                        (printf "\n")))
                    ((record unused))
           10120  ((record terms)
                      (progn
                        (printf "%s" "cust. number:")
           10121        (printf "[%s]" custnum)
                        (printf "\n")
                        (printf "%s" "terms;")
                        (printf "%s" termper)
                        (printf "%s" "%")
                        (printf "%s" termdays)
                        (printf "\n")))
                    ((record unused))
                    ((record names)
                      (progn
                        (printf "%s" "bill to:")
                        (printf "%s" billname)
                        (printf "\n")))
```

FIG. 5A

```
((record streets)
 (progn
    (printf "%s" "street:")
    (printf "%" billstrt)
    (printf "\n")))
((record csz)
  (progn
     (printf "%s" "city,state,zip:")
     (printf "%s" billcsz)
     (printf "\n")))
((record unused)
  (progn
     (printf "%s" "unsused")
     (printf "\n")))
((record unused)
   (setq n 1))
(loop
((record detail)
   (if (> dozens 0)
      (setq itemun (* dozens units))
      (setq itemun units))
(progn
   (printf "%s" item)
   (printf "%s" dettot)
   (printf "%s" price)
   (printf "%s" units)
   (printf "%s" dozens)
   (printf "\n"))))
((record unused)
   (progn
   (printf "%s" "unsused")
   (printf "\n")))
((record unused)
   (progn
      (printf "%s" "unsused")
      (printf "\n")))
((record unused)
   (progn
      (printf "%s" "unsused")
      (printf "\n")))
```

FIG. 5B

```
                    ((record total1)
                      (progn
                        (printf "%s" merchtot)
                        (printf "\n")))
                    ((record total2)
                      (progn
                        (printf "%s" nontot)
                        (printf "\n")))
        10300  10310  ((record total3)
                      (progn
          10310    (mark_end)
 10400   10410      (setq vf (do_split))
 ;; every time a record of the format total13 is found set the
 ;; ending mark, and split.
             10420   (set_app_normal_receiver vf custnum)
 ;; determine the receiver using the data element
      custnum found
 ;; in the terms record earlier in the scanning.
             10430 (mark_start)
 ;; reset the start marker
                        (printf "%s" (-tottot nontot))
                        (printf "\n")) ))))
    10440 (setq header '(
                        (filler (x 0) nil)
                        (filler (x 4) "MAIL")
                        (filler (b 5) nil)
                        (contact (x 15) nil)
                        (filler (x 0 nil)
                        (filler (x 9) "INVOICE #")
                        (filler (x 1) "\n")))

(setq info '(
                        (ponum (x 6) nil)
                        (filler (x 33) nil)
                        (showeth (x 20) nil)
                        (month (x 3) nil)
                        (filler (b 1) nil)
                        (day (x 2) nil)
```

FIG. 5C

```
                (filler (b 1) nil)
                (year (x 4) nil)
                (filler (x 3) nil)
                (invnum (x 0) nil)
                (filler (x 1) "\n")))

(setq names '(
                (filler (x 0) nil)
                (filler (x 5) "BILL")
                (billname (x 25) nil)
                (filler (x 0) nil)
                (filler (x 5) "SHIP")
                (shipname (x 9) nil)
                (filler (b 0) nil)
                (filler (x 1) "\n")))

(setq detail '(
                (item (x 8) nil)
                (filler (x 14) nil)
                (filler (x 1) " ")
                (filler (x 30) nil)
                (dozens (n "9") nil)
                (filler (b 1) nil)
                (units (n "z9") nil)
                (filler (b 7) nil)
                (price (n "z") nil)
                (filler (b 7) nil)
                (detto (n "zz9") nil)
                (filler (x 0) nil)
                (filler (x 1) "\n")))

(setq total1 '(
                (filler (x 0) nil)
                (filler (x 18) "MERCHANDISE TOTAL-")
                (filler (x 7) nil)
                (merchtot (n "zz9") nil)
                (filler (x 1) "\n")))
```

FIG. 5D

```
(setq total2 '(
          (filler (x 0) nil)
          (filler (x 16) "NON-MERCH TOTAL-")
          (filler (x 7) nil)
          (nontot (n "zzz9") nil)
          (filler (x 1) "\n")))

(setq total3 '(
          (filler (x 16) nil)
          (duedte (x 11) nil)
          (filler (x 0) nil)
          (filler (x 14) "INVOICE TOTAL-")
          (filler (x 7) nil)
          (tottot (n "zz9") nil)
          (filler (x 1) "\n")))

(setq streets '(
          (filler (b 0) nil)
          (filler (x 4) "TO  ")
          (billstrt (x 17) nil)
          (filler (x 0) nil)
          (filler (x 4) "TO  ")
          (shipstrt (x 19) nil)
          (filler (x 0) nil)
          (filler (x 1) "\n")))

(setq csz '(
          (filler (b 0) nil)
          (billcsz (x 29) nil)
          (filler (b 0) nil)
          (shipcsz (x 10) nil)
          (filler (x 0) nil)
          (filler (x 1) "\n")))

(setq terms '(
          (custnum (x 6) nil)
          (filler (x 55) nil)
          (termper (n "9") nil)
          (filler (x 2) nil)
```

FIG. 5E

```
                        (termdays (x 2) nil)
                        (filler (x 0) nil)
                        (filler (x 1) "\n")))

(setq unused '(
                        (filler (x 0) nil)
                        (filler (x 1) "\n")))

;; Sets the start marker at the begining of the data stream 10520 (setq vfl (split stdin invoice))

;; Asks that each invoice to split and keep a list in the
         ;; variable vfl - the flemap to be used is "invoice" and the
         ;; data to be matched is in "stdin"

10600   10610  (while vfl
         10620 (setq vf (car vfl))
         10630 (printf "deenv: routing to translator\n")

10640  (route_app_to_translator vf)
            ;; each invoice document is routed to the translator
                 work center (setq vfl (cdr vfl)))
```

FIG. 5F

```
AAAAA  CCCCC  SSSSS                                    6110
A      C      S
AAAAA  C      SSSSS    REMITTANCE    Perry Lawrence              DUNS #
A  A   C      S            TO        Bank of Trade               99-999-9999
A      CCCCC  SSSSS                  9022 Lawrence Express Way
                                     San Jose, CA 94520               Page- ORDER =  CUSTOMER PO #  DEPT  SALESPRS  SHIP VIA            DATE        INVOICE =
004127                  150   100       UNITED PARCEL GROUN NOV 27 1989  101903

CUSTOMER #        DIVISION                          6120         TERMS
B1200-            JUNIORS DIVISION                               8% 10 EOM

BILL   ATHLETIC FASHIONS BILLING           SHIP   BROADMORE
TO     1445 JONES STREET                   TO     1400 WILSHIRE BLVD.
       SAN FRANCISCO       CA 94103               LOS ANGELES        CA 94800
***************************************************************************
STYLE    CLR   DIM  ***     ***       ***    ***    DOZ/UN   PRICE    TOTAL
***************************************************************************
ASTYLE01 BLK   J     5       5         5      5      5 00      5       300
 (YR STYLE-123     )
ASTYLE02 RED   G                                       06      7        42
 (YR STYLE-A0000000000001 )                             1       2        2
FREIGHT        HALF AIR FREIGHT
               SHIP ORDER COMPLETE
***************************************************************************
TOTAL DOZ/UN-      5 06                          MERCHANDISE TOTAL-     342
CARTONS-  1 WEIGHT- 5 LBS.                       NON-MERCH TOTAL-         2
DUE DATE-     JAN 10 1990                        INVOICE TOTAL-         344
```

FIGURE 7

BIG* [NOV271989] * [101903-]
         7111              7112

N1*PE
N2*ATHLETIC FASHIONS BILLING
N3*1445 JONES STREET
N4 * SAN FRANCISCO*CA*94103
PER*AD*Perry Lawrence
N1*SD
N2*BROADMORE
N3*1400 WILSHIRE BLVD.
N4*LOS ANGELES*CA*94800
IT1*ASTYLE01*60*UN*5
CTP*****SEL*300
PID*F***G
TDS*344*02*342
CTT*1

FIGURE 8

```
                  defdocument doc810:
1100 ┌──           area x12_heading:
     │      1101 seg ST: m 1
     │      1102 seg BIG: m 1
     │           seg NTE: f 100
     │           seg CUR: o 1
     │1110 ┌──   loop loop_n1: 1 200
     │     │         seg N1: o 1
     │     │1111 seg N2: o 2
     │     │         seg N4: o 1
     │     │         seg REF: o 12
     │     │         seg PER: o 3
     │     └──   endloop
     │           seg ITD: o 5
     │           seg DTM: o 1
     │           seg FOB: o 1
     └──      endarea 1200 ┌──      area x12_detail:
     │           loop loop_1: 1 99999
     │               seg ITI: m 1
     │               seg NTE: f 100
     │               seg CUR: o 1
     │               seg SLN: o 100
     │               seg J2X: o 10000
     │               seg IT3: o 1
     │               seg CTP: o 25
     │               seg IT4: o 1
     │               seg ITA: o 10
     │               seg ITD: o 2
     │               loop loop_n1_2: 1 200
     │                   seg N1: o 1
     │                   seg N2: o 2
     │                   seg N3: o 3
     │                   seg N4: o 1
     │                   seg REF: o 12
     │                   seg PER: o 3
     │               endloop
     │               seg DTM: o 10
     │               seg CAD: o 1
     │           endloop
     └──      endarea 1300 ┌──      area x12_summary:
     │           seg TDS: m 1
     │           seg CAD: o 1
     │           seg ITA: o 10
     │           seg ISS: o 2
     │           seg CTT: m 1
     │      1321 seg SE: m 1
     └──        endarea
               enddef
```

FIGURE 9

```
2100 ─┬─ (defseg |CUR| 2105
       │  "CURRENCY"
       │  :used-in
       │    ( 810 830 832 840 843 850 855 856 860 861
       │      865 820 844 845 846 867 823 )
       │  :syntax
       │  ((->  (-or 8 9) 7)
       │   (->  (-or 11 12) 10)
       │   (->  (-or 14 15) 13)
       │   (->  (-or 17 18) 16)
       │   (->  (-or 20 21) 19))
       │  :elts
       │    ((M 0098) (M 0100)  (C 0280) (O 0098)  (O 0100) (O 0669) (C 0374)
       │     (O 373) (C 0337) (C 0374) (O 0373) (C 0374) (O 0337) (C 0373) (O 0337)
       │     (C 0374) (O 0373) (O 0337) (C 0374) (O 373) )
       │  :vers ( "X12-0.0")

2200 ─┬─ (defseg |N1| 2205
       │  2210 "NAME"
       │  2220 :used-in
       │       2225
       │    ( |810| 830 832 840 843 850 855 856 860 861 865 104 105 107
       │      108 109 113 116 300 301 302 304 305 306 307 308 310 312 313 316
       │      317 422 423 424 425 820 875 876 877 880 881 882 884 885 888 889
       │      890 891 900 905 940 941 942 943 944 945 994 110 204 205 206 207
       │      208 210 214 216 309 874 878 879 920 892 893 824 844 845 846 862
       │      867 869 870 360 404 410 417 426 883 823 858 947 )
  2270 │  :syntax
  2240 │    ((-or 2 (-and 3 4))))
  2250 │  :elts ((M 0098) (C 0093) (C 0066) (C 0067) )
       │  :vers ( "X12-0.0"))
```

FIG. 10

```
3100 ┌ 3110 ( defelt 0093 ("AN" 1 35 ) "NAME"
      │                       3113    3114
      │        ()
      │ 3120 :used-in ( ACT G3 G61 N1 N2 PER POD SCH S8)
      └ 3130 :vers ( "TDCC-1.5"))

3200 ┌ ( defelt 0098 ("ID" 2 2) "ENTITY IDENTIFIER CODE"
      │  ("AC" "AD" "AG" "AK" "AO" "AS" "BK" "BL" "BN" "BO"
      │   "BS" "BT" "BW" "BY" "CA" "CB" "CC" "CL" "CM" "CN" "CO" "CP"
      │   "CR" "CS" "CT" "CV" "C1" "C2" "DB" "DC" "DE" "DS" "EC" "EE"
      │   "EM" "EP" "EX" "FH" "FR" "FW" "IA" "IC" "II" "IK" "IM" "IN"
 3220 │   "IS" "IT" "LN" "LP" "MA" "MC" "MF" "MI" "MP" "NC" "NO" "NP"
      │   "NV" "N1" "N2" "OB" "OC" "OI" "OO" "OP" "OT" "OV" "OW" "PA"
      │   "PB" "PC" "PD" "PE" "PF" "PG" "PH" "PI" "PJ" "PM" "PN" "PP"
      │   "PR" "PS" "PT" "PU" "PV" "RB" "RC" "RD" "RE" "RH" "RL" "RM"
      │   "RO" "RP" "RR" "RS" "RT" "SA" "SC" "SD" "SE" "SF" "SG" "SH"
      │   "SI" "SM" "SN" "SO" "SP" "SS" "ST" "SU" "SW" "TN" "TO" "TR"
      │   "TS" "TT" "UC" "UP" "VN" "VO" "WH" "ZZ" "11"
      │ :used-in ( CUR D1 D5 F1 F5 M1 N1 PT PWK SCH U1 U5
      │            Y1)
      └ :vers ( "TDCC-1.5"))
```

FIG. 11

```
4100  (defun x12>n verification-generator (descriptor)
        (set-edi>datatype-scaling-factor descriptor
                 (- (aref (get-regular-expression-match "a")
                          0)))
        (let* ((maxlength (get-edi-datatype-max-length descriptor))
               (minlength (get-edi-datatype-min-length descriptor))
               (regx (compile-regular-expression
                      (if (equal maxlength 1) "<0>[--]{1,0}[0-9]<'0>"
                          (concat "<0>[--]{1,0}(0[0-9]{"
                                  (format "%d" (1-minlength))
                                  "}|[1-9][0-9]{"
                                  (format "%d,%d" (1-maxlength) (1-minlength))
                                  "})<^0>")))))
          (set-edi-datatype-verification descriptor regx)
          (set-edi-datatype-max-length descriptor (1- maxlength))))

4200  (defun x12-r-verification-generator (descriptor)
        (set-edi-datatype-scaling-factor descriptor 0)
        (let* ((maxlength (get-edi-datatype-max-length descriptor))
               (minlength (get-edi-datatype-min-length descriptor))
               (regx (compile-regular-expression
                      (if (equal maxlength 1)
                          "<0>[-+]{1,0}(\\.[0-9]|[0-9]\\.)<^0>"
                          (concat "<0>(0[0-9])+(<"
                                  (format "%d" minlength)
                                  "})|\\.[0-9]*<"
                                  (format "%d" (1- minlength))
                                  "})|[1-9][0-9]*<"
                                  (format "%d-%d" minlength maxlength)
                                  "})|\\.[0-9]*<"
                                  (format "%d-%d" (1- minlength) (1- maxlength))
                                  "})|[+-])0[0-9]*<"
```

FIG. 12A

```
            (format "%d" (1-minlength))
       ">|\\.[0-9]*<"
            (format "%d" (- 2 minlength))
       ">)|[+-][1-9][0-9]*<"  (<"
            (format "%d-%d" (1- minlength) (1- maxlength))
       ">|\\.[0-9]*<"
            (format "%d-%d" (- 2 minlength) (- 2 maxlength))
       ">))<"0>"))))
 (set-edi-datatype-verification descriptor regx)
 (set-edi-datatype-max-length descriptor (- 2 maxlength)))
)

;This version allows all blank values
(defun x12-an-verification-generator (descriptor)
  (let* ((maxlength (get-edi-datatype-max-length descriptor))
         (minlength (get-edi-datatype-min-length descriptor))
         (regx (compile-regular-expression
                (if (equal minlength maxlength)
                    "<0>[]a-ij-rs-zA-IJ-RS-Z
0-9[!\"#&'()*+,./:;?=$%@_{}\\|<>-]*<'0>"
                    (concat "<0>[]a-ij-rs-zA-IJ-RS-Z
0-9[!\"#&'()*+,./:;?=$%@_{}\\|<>-]*{"
                            (format "%d" minlength)
                            "}(<'0>|[]a-ij-rs-zA-IJ-RS-Z
0-9[!\"#&'()*+,./:;?=$%@_{}\\|<>-]*<'1>]a-ij-rs-zA-IJ-RS-ZO
                            -9[!\"#&'()*+,./:;
$%@_{}\\|<>-])<"0>")))
             )))
    (set-edi-datatype-verification descriptor regx))
)
```

FIG. 12B

```
(defdatatype ("X12-2.3")
("<0>[nN][0-9]Sa<~0>"   (x12-n-verification-generator))
("<0>[rR]<~0>"  (x12-r-verification-generator))
("<0>[iI][dD]<~0>")
("<0>[aA][nN]<~0>"  (x12-an-verification-generator))
("<0>[dD][tT]<~0>"
("<0>[0-9][0-9]((0(((13578](0[1-9]|[1-2][0-9]|30))|((469](0[1-9]|[1-2][0-9]|30))|(1(([02](0[1-9]|[12][0-9]|3[01]))|
[1-2][0-9])|3
])|(2(0[1-9]|[1-2][0-9])))|1(([02](0[1-9]|[12][0-9]|3[01]))|
(1(0[1-9]|[12]
9]|30))))<~0>"))
("<0>[tT][mM]<~0>"  ("<0>((01][0-9]|2(0-3])[0-5][0-9]<~0>"))
)

```
; edi810_32.e
; Jessica Yang
;
; Data file: B_810.b
; Version : 2.2
;
; Change: treetoedi --> write edi
; Also checks on mandatory and optional loops of edi standard
; with compliance check.
;
function the_date(m,d,y)
begin
    md=concat(m,d)
    mdy=concat(md,y)
    return mdy
end filemap invoice
begin
  loop
    5212 record person: tree\HEADING\H_LOOP_N1[1]\PER[1][1]="AD"
                       tree\HEADING\H_LOOP_N1[1]\PER[1][2]=p_name
                       print "person is: ", p_name record header: inv_date=the_date(mon,day,year)  5313
                       tree\HEADING\BIG[1][1]=inv_date    5314
                       tree\HEADING\BIG[1][2]=inv_num     5315
                       print "invoice number is: ",inv_num record names: tree\HEADING\H_LOOP_N1[1]\N1[1][1]="PE"
                       tree\HEADING\H_LOOP_N1[2]\N1[1][1]="SD"
                       tree\HEADING\H_LOOP_N1[1]\N2[1][1]=b_name
                       tree\HEADING\H_LOOP_N1[2]\N2[1][1]=s_name
```

FIG 13A

```
                    print "bill to: ",b_name
                    print "ship to: ",s_name record addrs:       tree\HEADING\H_LOOP_N1[1]\N3[1][1]=b_addr
                    tree\HEADING\H_LOOP_N1[2]\N3[1][1]=s_addr
                    print "bill to addr: ",b_addr
                    print "ship to addr: ",s_addr record locat:       tree\HEADING\H_LOOP_N1[1]\N4[1][1]=city
                    tree\HEADING\H_LOOP_N1[1]\N4[1][2]=state
                    tree\HEADING\H_LOOP_N1[1]\N4[1][3]=zip
                    tree\HEADING\H_LOOP_N1[2]\N4[1][1]=city1
                    tree\HEADING\H_LOOP_N1[2]\N4[1][2]=state1
                    tree\HEADING\H_LOOP_N1[2]\N4[1][3]=zip1 record unused:
loop                n=1
record items:       if dozens > 0 then
                        if unit > 0 then
                            num_of = dozens * 12 - unit
                        else
                            num_of = dozens * 12
                    else
                        num_of = unit total=num_of * price tree\DETAIL\D_LOOP_IT1[n]\IT1[1][1]=style
                    tree\DETAIL\D_LOOP_IT1[n]\IT1[1][2]=num_of
5211                tree\DETAIL\D_LOOP_IT1[n]\IT1[1][3]="UN"
                    tree\DETAIL\D_LOOP_IT1[n]\IT1[1][4]=price
                    tree\DETAIL\D_LOOP_IT1[n]\CTP[1][6]="SEL"
                    tree\DETAIL\D_LOOP_IT1[n]\CTP[1][7]=total tree\DETAIL\D_LOOP_IT1[n]\D_LOOP_SLN[1]\PID[1][1]="F"
                    tree\DETAIL\D_LOOP_IT1[n]\D_LOOP_SLN[1]\PID[1][5]=dimm
```

FIG 13B

```
              print "
              print "style is: ",style
              print "color is: ",color
              print "dimm is:  ",dimm
              print "num_of is: ",num_of
              print "price is: ",price
              print "total is" ",total
              n=n+1
      5211 ─┘
5210 ─┤  endloop record summy: inv_total = mer_total - non_total
                     tree\SUMMARY\TDS[1][1]=inv_total
                     tree\SUMMARY\TDS[1][2]=non_total
                     tree\SUMMARY\TDS[1][3]=mer_total
                     print "invoice total is: ",inv_total tree\SUMMARY\CTT[1][1]=1
            endlood
5200 ─┤  end record person
              begin
                  filler p_ic x(*)                      5311
                  filler p_ic x(4)     value is "MAIL"  5312
                  filler p_ic b(*)
                  p_name p_ic x(14)                     5313
                  filler p_ic x(*)                      5314
                  filler p_ic x(5)     value is "GROUN" 5315
       5310 ─┤ end
5300 ─┤  record header
```

FIG. 13C

```
begin
    filler pic b
    mon pic x(3)      5321
    filler pic b
    day pic x(2)      5323
    filler pic b
    year pic x(4)     5325
    filler pic b(*)
    inv_num pic x(*)  5327
    filler pic x                        value is "\n"
end record names
begin
    filler pic x(*)
    filler pic x(5)   value is "BILL "
    b_name pic x(25)
    filler pic b(*)
    filler pic x(5)   value is "SHIP "
    s_name pic x(9)
end record addrs
begin
    filler pic x(*)
    filler pic x(3)   value is "TO  "
    b_addr pic x(25)
    filler pic b(*)
    filler pic x(3)   value is "TO  "
    s_addr pic x(*)
    filler pic x      value is "\n"
end
```

FIG. 13D

```
record locat
begin
    filler  pic b(*)
    city    pic x(13)
    filler  pic b(*)
    state   pic x(2)
    filler  pic b(*)
    zip     pic x(5)
    filler  pic b(*)
    city1   pic x(11)
    filler  pic b(*)
    state1  pic x(2)
    filler  pic b(*)
    zip1    pic x(5)
    filler  pic b(*)
    filler  pic x            value is "\n"
end record unused
begin
    filler  pic x(*)
    filler  pic x(2)         value is "-\n"

record items
begin
    filler  pic b(*)
    style   pic x(8)
    filler  pic b(*)
    color   pic x(3)
    filler  pic b(*)
    dimm    pic x(1)
    filler  pic x(35)
    dozens  pic z
    filler  pic b
    unit    pic zz
```

FIG. 13E

```
            filler pic b(*)
            price pic z
            filler pic x(*)
            filler pic x(2)            value is ")\n"
        end
        record summy
        begin
            filler pic x(*)
            filler pic x(18)           value is "MERCHANDISE TOTAL-"
            filler pic b(*)
            mer_total pic zzz
            filler pic x(*)
            filler pic x(16)           value is "NON-MERCH TOTAL-"
            filler pic b(*)
            non_total pic z
            filler pic x(*)
            filler pic x              value is "\n"
        end begin
5400 ┌ 5410  tree=makedoc("810", "002002")
     │ 5420  mapfile(stdin,invoice)
     │ 5430  write edi tree element="*", segment="\n", subelement="@"
     └       end
```

FIG. 13F

13110   record header
        begin
                ehcusn pic x(5)
                ehedpo pic x(15)
                ehtrid pic x(9)
                ehedlk pic x(9)
                ehdppo pic x(10)
                ehname pic x(30)
                ehadd1 pic x(30)
                ehadd2 pic x(30)
                ehcity pic x(20)
                ehstcd pic x(2)
                ehzip  pic x(9)
                ehcnty pic x(16)
                ehedct pic x(15)
                ehedph pic x(15)
                ehcarn pic x(15)
                ehcust pic x(5)
                ehtord pic x(3)
                ehedpf pic x(2)
                eheddt pic x(4)
                ehedtm pic x(3)
                eherfd pic x(70)
                ehdcmd pic x(1)
                ehorc1 pic x(4)
                ehlmdt pic x(4)
                ehtyme pic x(4)
        end record note
        begin
                eicusn pic x(5)
                eiedpo pic x(15)
                eitrid pic x(9)
                eintqf pic x(3)
                eispis pic x(2)

FIG. 14A

```
        eispin pic x(50)
        eiorc1 pic x(4)
        eilmdt pic x(4)
        eityme pic x(4)
end record detail
begin
        edcusn pic x(5)
        ededpo pic x(15)
        edtrid pic x(9)
        edorc1 pic x(4)
        edlmdt pic x(4)
        edtyme pic x(4)
end record detail1
begin
        elcusn pic x(5)
        eledpo pic x(15)
        eltrid pic x(9)
        ellisq pic x(2)
        elitnb pic x(15)
        elorqt pic x(4)
        elorqu pic x(2)
        eledpr pic x(5
        eledpm pic x(2)
        elsprf pic x(10)
        elitds pic x(25)
        elrqdt pic x(4)
        elcspt pic x(15)
        elcarn pic x(15)
        elcsri pic x(3)
        elitcg pic x(2)
        eldivn pic x(4)
        elorc1 pic x(6)
```

FIG. 14B elprcd pic x(4)
ellmdt pic x(4)
eltyme pic x(4)

record detsin
begin
    escusn pic x(5)
    esedpo pic x(15)
    estrid pic x(9)
    eslisq pic x(2)
    esstsq pic x(2)
    esstqt pic x(4)
    esstqu pic x(2)
    esqf01 pic x(2)
    esfd01 pic x(30)
    esqf02 pic x(2)
    esfd02 pic x(30)
    esqf03 pic x(4)
    esfd03 pic x(4)
    esorc1 pic x(4)
    eslmdt pic x(4)
    estyme pic x(4)
end record detmea
    emcusn pic x(5)
    emedpo pic x(15)
    emtrid pic x(9)
    emlisq pic x(2)
    emmsrf pic x(2)
    emdmqf pic x(3)
    emdimu pic x(2)
    emdimd pic x(6)
    emdlmf pic x(5)
    emstsq pic x(2)
    emspis pic x(4)

FIG. 14C

```
            emorc1 pic x(4)
            emlmdt pic x(4)
            emtyme pic x(4)
        end record detnte
        begin
            eccusn pic x(5)
            ecedpo pic x(15)
            ectrid pic x(9)
            eclisq pic x(2)
            ecspis pic x(2)
            ecntqf pic x(3)
            ecspin pic x(50)
            ecorc1 pic x(4)
            eclmdt pic x(4)
            ectyme pic x(4)
        end begin
13200   read edi podoc 'Building first header record
            HEAD=PODOC\HEADINGd
13310        ehedpo=head\beg[1][3]
             ehdppo=head\ref[1][2]
             ehedct=head\per[1][2]
             ehedph=head\per[1][4]
             ehcarn=head\td5[1][5]
            NAM=PODOC\HEADING\N1LOOP[1]
             ehname=NAM\N1[1][2]
             ehcusn=NAM\N1[1][4]
             ehadd1=NAM\n3[1][1]
             ehadd2=NAM\n3[1][2]
             ehcity=NAM\n4[1][1]
             ehstcd=NAM\n4[1][2]
             ehzip=NAM\n4[1][3]
             ehcnty=NAM\n4[1][4]
```

FIG. 14D

```
                        ehcust=podoc\heading\n1loop[2]\n1[1][4]
13400                   putrec header 'Building second header for note segment
            eledpo=head\beg[1][3]
            elcusn=head\n1loop[1]\n1[1][4]
        putrec note 'Building first detail record
            FOREACH P1 IN PODOC\DETAIL\D_LOOP DO
            begin
                ededpo=head\beg[1][3]
                edcusn=head\n1loop[1]\n1[1][4]
                'Building second detail record
                eledpo=head\beg[1][3]
                elcusn=head\n1loop[1]\n1[1][4]
                p1=podoc\detail\d_loop[n]
                ellisq=p1\po1[1][1]
                elorqt=p1\po1[1][2]
                elorqu=p1\po1[1][3]
                elitnb=p1\po1[1][7]
                elitds=p1\po1[1][9]
                elcspt=p1\po1[1][11]
                eledpr=p1\ctp[1][3]
                eledpm=p1\ctp[1][5]
                elsprf=p1\ref[1][2]
                elrqdt=p1\dtm[1][2]
                elcarn=p1\td5[1][5]

'Building third detail record, mea segment
                FOR EACH S1 IN P1\SLN DO
                begin
                    esedpo=podoc\heading\beg[1][3]

escusn=podoc\heading\n1loop[1]\n1[1][4]
            eslisq=S1[1]
            esstsq=S1[2]
```

FIG. 14E

EDI TRANSLATION SYSTEM USING PLURALITY OF COMMUNICATION PROCESSES AND DE-ENVELOPING PROCEDURE CORRESPONDING TO TRANSMITTED COMMUNICATION PROCESS

BACKGROUND OF THE INVENTION

This invention relates generally to Electronic Data Interchange ("EDI") systems and more particularly to a novel EDI translation system.

EDI can be defined as the paperless, computer application to computer application, inter- and intra-organizational exchange of business documents, such as purchase orders and invoices, in a structured, application-processable form. An EDI document can be sent directly to a business partner's computer over a communication line. EDI provides many benefits, including: a) speed—documents are sent and received almost immediately; b) accuracy—documents are received as they were transmitted, eliminating manual rekeying of data and attendant errors; c) cost reduction—rapid document turnaround allows more accurate planning of inventory levels and reduces inventory reorder time; d) increased productivity—employees are freed from paperwork and available for other tasks; e) simplified broadcast communications to multiple trading partners (such as sending a request for proposal); f) directness of communication—data is routed directly from the person placing an order to the data processing system of the receiving organization; and g) data integration—data in documents can be integrated directly with existing business information and data processing systems.

EDI involves three essential components: a) EDI standards; b) communications means; and c) an EDI translation system. EDI standards can be divided into formatting standards, dictionary standards, and communications enveloping standards. Formatting standards govern: a) what documents can be communicated; b) what information is to be included; and c) how the information is to be sequenced and presented.

Dictionary standards specify the meaning of the various elements being combined by the formatting standard. Communications enveloping standards define how to group documents together into larger units. Communications enveloping saves on addressing by grouping a number of messages meant for the same destination from a specific source. The communications enveloping standard can also provide password security not present in paper forms of communication. Any of the standards can be proprietary standards (limited to one organization and its trading partners) or common EDI standards (adopted by industry-wide or cross-industry users).

EDI standard documents from and to which trading partner data is converted have detailed definitions in the pertinent EDI standard. EDI standards are maintained by various standards maintenance organizations. Examples of such standards (and maintenance organizations) are the ANSI X12 standard (developed by the American National Standards Institute's Accredited Standards Committee's X12 group), the UN-EDIFACT standard (Electronic Data Interchange for Administration, Commerce, and Transport, an international standard based on ANSI X12 and the Trade Data Interchange standards used in Europe), the Uniform Communications Standards ("UCS"), and TDCC (developed by the Transportation Data Coordinating Committee). The standards are not invariant —they continue to evolve to meet the changing needs of information transfer.

Standards may have different terminology. There are however, similarities in the meaning associated with the terms. Whether termed a transaction set (ANSI X12), a standard message (EDIFACT), or a document (UCS), there is an electronic representation of a paper business document. A unique identifier code is assigned in the standard for each type of business document. As an example, in the ANSI X12 standard an invoice is referred to as X12 document number X12.2, with a transaction set identification code of 810.

EDI standards are developed using a set of abstractions: a) there is a unit of data called a data element; b) data elements can be grouped into compound data elements; c) data elements and/or compound data elements are grouped into data segments; d) data segments can be grouped into loops; and e) loops and/or data segments are grouped into a business document.

The abstraction is based on an analogy to a paper document. Paper documents can be considered to have three distinct areas: the heading area, the detail area, and the summary area. In many cases the detail area consists of repeating groups of data elements. For example, in an invoice, the elements are the items being invoiced and are usually printed as lines in a columnar list. In the terminology used in the standards, these repeating groups are loops. Grouping data elements into loops proves unwieldy because of the number of data elements that must be considered. The standards therefore group data elements into data segments and compound data elements.

Transaction set standards specify whether data segments are mandatory, optional, or conditional and indicate whether, how many times, and in what order a particular data segment can be repeated. The transaction set standard does not specify the content of individual data segments. Instead, a segment directory identifies the specific data elements to be included in each data segment. The segment directory is composed of a series of data segment diagrams, each of which identifies the data elements to be included in a data segment, the sequence of the elements, whether each element is mandatory, optional, or conditional, and the form of each element in terms of the number of characters and whether the characters are numeric or alphabetic.

Data segment diagrams include the following components. The data segment identifier identifies the data segment being specified. The data element separator is a user-selected character that precedes each constituent data element and serves as a position marker. The data segment terminator is a user-selected character used to signify the end of the data element. Element diagrams describe individual data elements.

Depending on the standard, element diagrams can define an element's name, a reference designator, a data dictionary reference number specifying the location in a data dictionary where information on the data element can be found, a requirement designator (either mandatory, optional, or conditional), a type (such as numeric, decimal, or alphanumeric), and a length (minimum and maximum number of characters). A data element dictionary gives the content and meaning for each data element.

EDI standard documents are electronically packaged or "enveloped" for transmittal between trading partners. Enveloping can be at several levels. The first, or innermost, level of enveloping separates one document from another. This is accomplished by attaching transaction set headers and transaction set trailers to each transaction set, or document.

At a second level of enveloping, documents can be packaged together into groups known as functional groups. An example of a functional group is a purchase order and an invoice, which are often sent together in both the paper and EDI worlds. Each functional group is packaged with a functional group header at its beginning and a functional group trailer at its end. This second level of enveloping is an optional level in most standards.

At a third level of enveloping, all functional groups to be sent to a single trading partner can be packaged together. This enveloping consists of an interchange control header and an interchange control trailer bounding either the packaged functional groups and/or the document.

The second component of EDI is communications means. EDI standard documents are transmitted electronically between trading partners' computers. The transmittal can be directly between trading partners, via a direct private network in which the computers are linked directly. Direct networks become difficult to maintain with larger numbers of trading partners. The alternative is to use a third-party, or value-added network (VAN). A VAN maintains an electronic mailbox for each trading partner that can be accessed by each other partner (with appropriate security restrictions).

The standard does not specify a communications standard except to the extent to which it describes the enveloping standard and the way in which transmissions can be acknowledged. There are de-facto standards such as IBM 2780/3780 BSC protocols used as file transfer protocols. Virtually every EDI VAN supports these protocols because of their pervasive use.

The third component of EDI is the EDI translation system, which performs at least the functions of data communication and document translation. Document translation is the most significant function in this component, and is implemented through an EDI translation software.

In practice, participants in EDI select and agree to use a proper subset of the document standard. Such agreements among trading partners are too numerous to be included in an EDI translation software. The EDI translation therefore needs to provide a way for the user to express how to process or generate the EDI document in compliance with the agreement.

One example of the need for compliance with a trading partner agreement is when one trading partner is to automatically post an EDI document to a processing system. A purchase order received from a customer could be booked automatically through the recipient's order entry system. Since the agreement and the interface requirements to the order entry system are not defined in the EDI translation software, the user of the EDI translation software must specify how to perform the translation.

The EDI translation software must provide three functions in conjunction with giving the user a means of expression for performing the translation. First, the software must provide mechanisms to navigate and manipulate EDI documents. Second, the software must be able to produce the records that are to be interfaced with the order entry system. Third, the system must provide the user with means to express (using these primitives) a complete procedure for transforming an EDI document into something that is compatible with the user's interfacing requirements.

In some cases a user may find it advantageous to automatically print an EDI document on paper in a format that is familiar to the user. For example, it may be helpful to print an invoice because the accounts payable system is implemented manually. As in the discussion above, the translation software does not include a definition of the format in which the user expects the output. The user must therefore specify this information.

The development of prior EDI formatting or translation software can be traced through three generations—translation software of the invention represents the fourth generation. The first generation of software was developed in the late 1970s and early 1980s to support a variety of private formats. The private formats were developed by large corporations to allow them to exchange business documents with their trading partners. The formats did not conform to any industry standards. The software used in these systems resembled subsystems of existing general business applications.

These first generation systems typically involved the exchange of private-format data files and associated data processing programs. Trading partners typically communicated directly with each other over private networks. Examples of first generation systems include General Motors' and Ford's automotive "release" systems and retail industry order processing systems, such as those used by Sears, J.C. Penney, and K Mart.

The second generation was characterized by the introduction of variable length, hierarchical document standards such as TDCC (used in the transportation industry) and UCS (used in the grocery industry), which created a need for a more generalized approach to translating those standards into computer-processable business forms.

Translators of this generation typically employed fixed data files transferred to an intermediate process that translated the document into a form usable by host applications. The translator's primary task was to convert the records in the data files from variable length format to a fixed length format that could be processed by traditional batch applications. These translators were known colloquially as "asterisk strippers" because they had no capability to manipulate data between records or to change the placement of data within records.

A major shortcoming of these second generation translators was that a large amount of additional intermediate processing was required, typically involving programming tasks to integrate the EDI document into an application system. Networks and major trading partners tended to overlook this problem in their efforts to expand trading partner relationships. The dissatisfaction of end users with the high software maintenance demands of this post-translation processing requirement led to the development of the third generation of software.

The third, or current, generation of translation software attempts to provide higher levels of transform capability so that an EDI document can be put into a form closer to the input required by the user's integrated application software. These translators provide for table-driven systems and "dynamic mapping."

The translation software uses a table structure to perform the translation. The tables consist of the standard data dictionary and syntax rules for the data segments and elements of a given EDI transaction set. The software selects the appropriate table to perform the translation for a specified EDI transaction set to be generated.

Dynamic mapping allows the user to identify the relationship of elements within a segment to fields in an application input document and vice versa. Instead of fixing record lengths, the systems allow the user to put data elements into different data files in any location. Rather than being limited to a single fixed length file in a transaction set, the user can select data from multiple files, in any order within the file, and present the data to the translator.

The ACS Network Systems EDI 4XX product, available from ACS Network Systems of Concord, Calif., is typical of third generation software products. The data communication component of ACS 4XX provides the means to generate and maintain a communication line directly with a trading partner or to a third party data network and the means to control the process of sending and receiving documents to and from trading partners. The translation component of ACS 4XX translates incoming standard business documents from an EDI Standard format to a format usable by applications programs and reverses the process for outgoing data.

These third generation systems suffer from several problems. First, the dynamic links between fields in application databases and data elements in EDI documents are unconditional—the field mapping or linking is construed to be constant in any given application. The systems are therefore unable to represent the conditional expressions that appear as "notes" in almost all standards. For example, a segment definition may have a conditional note that specifies that either the second data element must be present or both the third and fourth elements must be present. Although some translators have attempted to comply with these notes through the actual translator software code, this technique has proven inadequate and difficult to maintain as standards and documents evolve. Further, the standards definitions employed by these systems have relied on a data base schema of the standards definition. This is a relatively inflexible approach that does not readily accomodate the continual evolution of the standards.

Second, these systems assume that EDI input will require non-EDI, or application, output. This prevents the systems from acting as true translators, capable of communicating any type of input and any type of output. Similarly, the communication components of such systems assume that their only interfaces would be with EDI-capable networks. This precludes straight file transfer capability between computers, and prevents the systems from acting in a terminal emulation mode to interface with other computers. Further, the communications interface does not provide the structure for unattended operation; the systems cannot act as passive communications systems for receiving calls from outside systems. There is also no method for allowing an outside application to send the system data for translation into EDI format.

Third, there can be structure or sequence clash between the EDI document and the application transaction's structure requirement. The previous generation systems provide a tool for specifying transformation of data through the use of a mapping program. The mapping program includes assumptions about the correspondence of structure and sequence between source data and target data. The tool therefore cannot be used to translate data with a structure or sequence clash between the source data and target data.

EDI documents are defined using a specification that prescribes a sequence and structure to the document. When the application transaction's structure and sequence differs from the corresponding EDI document specification, the user is required to develop a set of programs that deal with the structural or sequence difference to achieve a seamless interface to the application.

For example, a retail store may send to a manufacturer purchase orders with store distribution specifications attributed to each line item. If the manufacturer requires separate paperwork for each shipping location, the grouping of data as expressed by the EDI document clashes with the manufacturer interface requirement. The clash is caused by the different structure assumed when producing the EDI document (which specifies how to distribute the order for a specific item to multiple shipping locations) and the structure assumed by the order entry system (which assumes that an order document contains items for a specific shipping location).

Third generation systems do not attempt to address this problem. The general approach is to produce a file that contains the necessary data in a rigid, hierarchical structure and to force the user to develop a set of programs using whatever programming language and utilities are available to change the structure. Some of these programs can become very complicated.

Fourth, third generation translators generally have limited pattern matching capability. This reduces the scope of acceptable types of input. The pattern matching of application transaction files is very limited. Records are identified using a strictly specified value in a specific position in the record. Therefore, unless the application transaction file created from the computer application contains these very specific value(s) (i.e, H01, H02, D01, D02, etc.), an interface program must be developed to supply data to the translator.

Fifth, the current systems have strict one-to-one correspondence between source and target documents. The systems therefore cannot receive a document, such as a shipping notice, and generate multiple transactions, such as a receiving notice, an inspection notice, and an invoice notice.

Sixth, prior systems have limited capacity for evaluating performance errors. For example, a user who creates a mapping specification with a table driven or dynamic mapping scheme may find during operation that some of the data elements are output incorrectly—the value of a data element for one document may turn up in another document. It can be difficult for the user to find the source of the error because the systems provide no debugging mechanism for finding the problem. While a debugger capability could theoretically be added, it would be onerous to implement because the structure of the systems (being non-language based) is not susceptible to a debugging facility.

Finally, the third generation translators limit operations to simple assignment semantics. There is no provision for performing arithmetic operations on source data elements to produce a target data element. Performing logical operations or string manipulation are usually not provided.

SUMMARY OF THE INVENTION

The invention overcomes the problems with the prior generation systems with an EDI translation method that receives data from a source in one format, executes a script to translate the data into a second format, and transmits the data in another format to a destination. The system has the ability to transform input data from, and into, virtually any format and to produce more than one output for each input document. The system employs a tree data structure and a script of translation instructions to overcome the hierarchical data structure limitations imposed by the prior generation systems.

The system can pattern-recognize records that are not explicitly differentiated. It provides flexibility in using virtually any communication system to communicate EDI as well as non-EDI documents. The system employs a model that assumes that both input and output are to be communicated and is therefore not constrained for use with a particular processor, but can instead act as a true communication front end.

The system addresses the difficulty that prior systems had in expressing syntax notes associated with segments in relational terms. This is done by expressing the notes using language construction of logical operators on data elements. For example, the semantic expression "(-or 2 (-and 3 4))" means "either the second element or both the third and fourth elements must be present."

The system addresses the inability of prior systems to handle structure clash between an EDI document and an application's data structure requirement by providing data and control structures. The control structures include such basic structures as executing a series of commands while some predicate condition exists.

The system supports data structures such as multi-dimensional arrays and an EDI tree data structure. The EDI tree data structure represents an instance of an EDI document. The tree provides random access operation on the document allowing the user to specify the sequence in which access to the EDI document is to be made. The system further provides a set of access primitives. These two tools allow the user, for example, to read a document and process it repeatedly, once for each of several shipping locations.

The system facilitates support for relational level notation in EDI document definitions that specify hierarchical nesting, such as EDIFACT standard documents. It supports implicit as well as explicit notation in EDI document definitions. The tree access notation enables the EDI programmer to reference EDI data elements so that a language can support it as one of its data types. Without such a notation, support for EDI in a programming language would be difficult. Nesting and repetition of segments is discussed in ISO Publication 9735, pp. 6-9 (1988).

The system also overcomes the limited ability of prior systems to pattern match data by providing a pattern matching capability that can read a fairly large set of patterns that follow an LL(1) grammar (for a description of LL(1) grammar, see Aho, Sethi, & Ullman; *Compilers: Principle, Techniques and Tools*, pp. § 4.4 (Addison Westley 1986). The user can formulate a filemap definition and record definitions to express the expected pattern. The system also allows the user to generate as many target documents as required from a single source document.

The system also overcomes the failure of the prior systems to provide a debugging capability. Since the system is language based, a conventional debugging facility can be readily provided.

Finally, the system has a broader range of operations performed than the prior systems and provides expressions such as those involving logical and arithmetic operators and string manipulation. Data transformation is enabled by use of an assignment statement. The assignment statement accepts an expression on the right hand side as in:

$$a = b + c$$

This statement specifies that a is computed from b plus c. The elements a, b, and c could be elements from the source or target, although a is likely to be an element of the target and b and c are likely to be elements of the source. In this example, a "+" operation is used in the right hand side expression. The system supports many such operations including "substring" to extract a portion of a string. These operations are termed language "primitives". The set of language primitives depends on the nature of the problem. However, by employing a programming language implementation, the invention allows a user to combine these basic operations into complex expressions. This expressiveness allows the user to specify more complex transformations.

The system is organized into four component work centers: a) Communications Interface (having a communication session as its input work unit); b) De-enveloping (having an interchange as its input work unit); c) Translation (having a document as its input work unit); and d) Enveloping (having an enveloping request as its input work unit).

The communications interface work center uses a script to schedule a communication session and describe how to break up the contents of the communication into units of de-enveloping work.

The de-enveloping work center divides a communication interchange into its component documents. It also performs a routing function, routing documents to the required destination.

The translation work center manipulates an incoming document into the format that is expected by another system. It can convert EDI data to a format that can be printed or used by application programs and can convert a file created by an application program to a standard EDI format. It is implemented as an interpreter or compiler that understands translation primitives and can be used with a script to perform transformations on many kinds of data. In the illustrated embodiment, each of these work centers are implemented using a novel EDI programming language, referred to herein as the e-language.

BRIEF DESCRIPTION OF THE DRAWINGS

FIG. 3 is a sample communication script.

FIG. 4 is a sample EDI de-enveloping script.

FIGS. 5A, 5B, 5C, 5D and 5E are a sample application de-enveloping script.

FIG. 7 shows sample application data input for a translation operation.

FIG. 8 shows sample EDI output corresponding to the input of FIG. 7 as produced by the script shown in FIG. 13.

FIG. 9 is a document definition for an X12 810 invoice implemented in the e-language.

FIG. 10 shows two sample segment definitions implemented in the e-language.

FIG. 11 shows two sample element definitions implemented in the e-language.

FIG. 12 shows three sample data type definitions implemented in the e-language.

FIGS. 13A, 13B and 13C show a sample translation script for translating an application document to an EDI document.

FIGS. 14A, 14B, 14C, 14D and 14E show a sample translation script for translating an EDI document to an application document.

DETAILED DESCRIPTION

Figure 1:
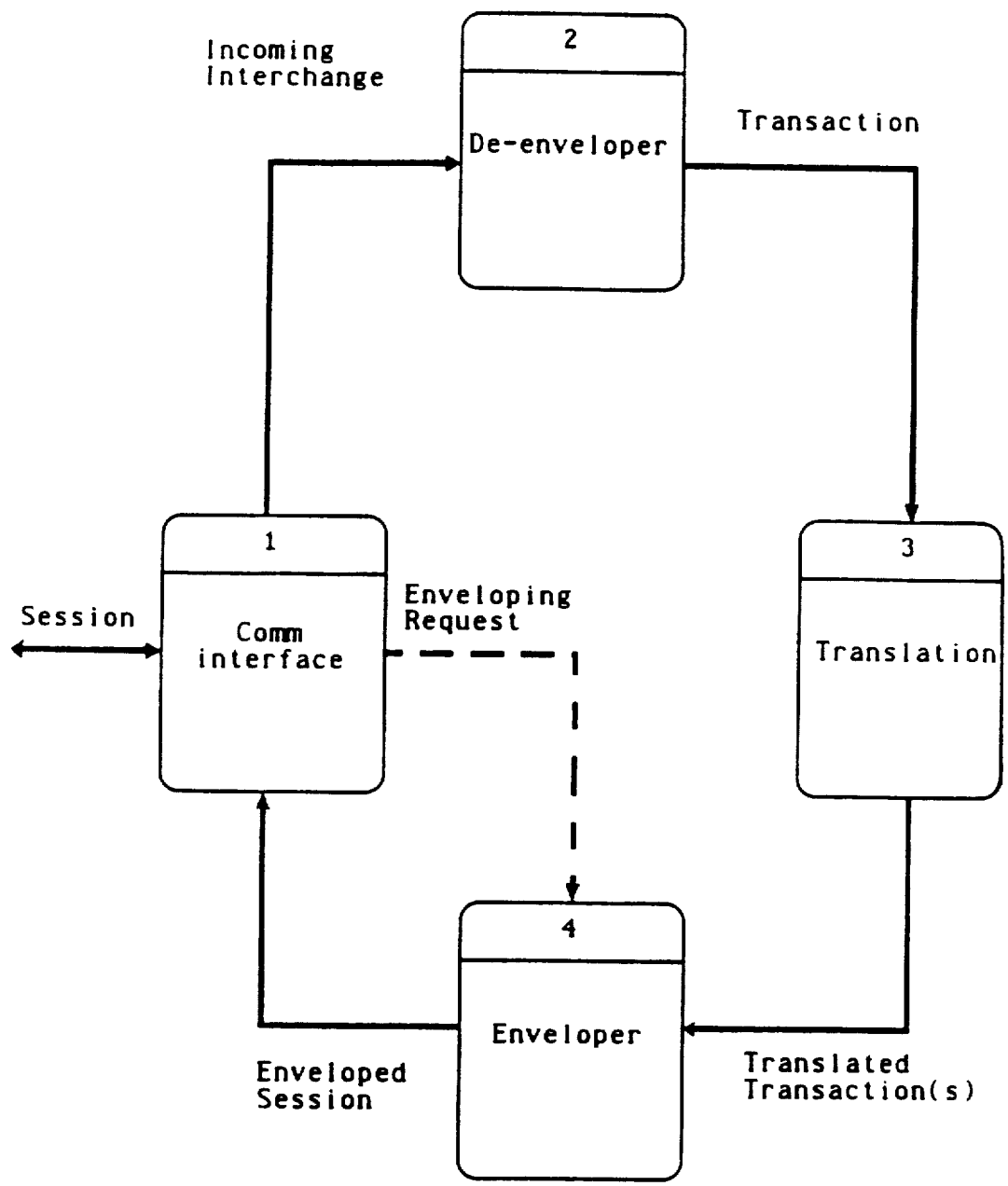
FIG. 1 is a block diagram of data flow through the EDI translation system.

The system is organized into four component work centers: a) Communications Interface; b) De-enveloping; c) Translation; and d) Enveloping. The flow of data through the system is illustrated in FIG. 1. Data flows into the system through communications interface 1. It then flows to the de-enveloper 2, to the translator 3, and to the enveloper 4. From the enveloper, the data flows back to the communications interface and thence out of the system.

In the illustrated embodiment, a data item flowing through the system can be considered conceptually as a package with a packing slip. As the data item is processed by each component of the system, some information is read from the packing slip, and additional information is written to the slip. The information that appears on the slip determines how the package will be processed. The system uses a "routing form" as an abstract representation of the packing slip. A routing form follows a data item through the system, and a component can both read from and write to the routing form. The behavior of a component may depend upon information that is read from the routing form.

The routing form provides for the following information: a) interchange sender; b) interchange receiver; c) functional group sender; d) functional group receiver; e) node (the network or application used); f) facility (the communication protocol); g) content type (EDI, application, or text); h) document type (transaction set identifier); i) translation script; j) functional group; k) error message; and l) functional acknowledgement flag. The information is placed in the routing form in the following order: a) in the communications interface—the node, facility, and content type; and b) in the de-enveloper—document type, senders, receivers, functional group, functional acknowledgement flag, and translation script. Error messages are written to the routing form by whichever module detects the error.

The EDI translation system can operate on a variety of hardware. In the illustrated embodiment, the system operates on a microcomputer having a 20 MHz Intel 80386 processor, 4–8 MB of RAM, one or more serial ports, a 100 MB fixed disk drive, a 2400 Baud modem with V.22 VIS/MSP protocol, and having a UNIX operating system. The system may also be operated on a local area network, with different machines implementing different functions of the system. For example, one machine can serve as the communications interface while another provides file storage.

Figure 2:
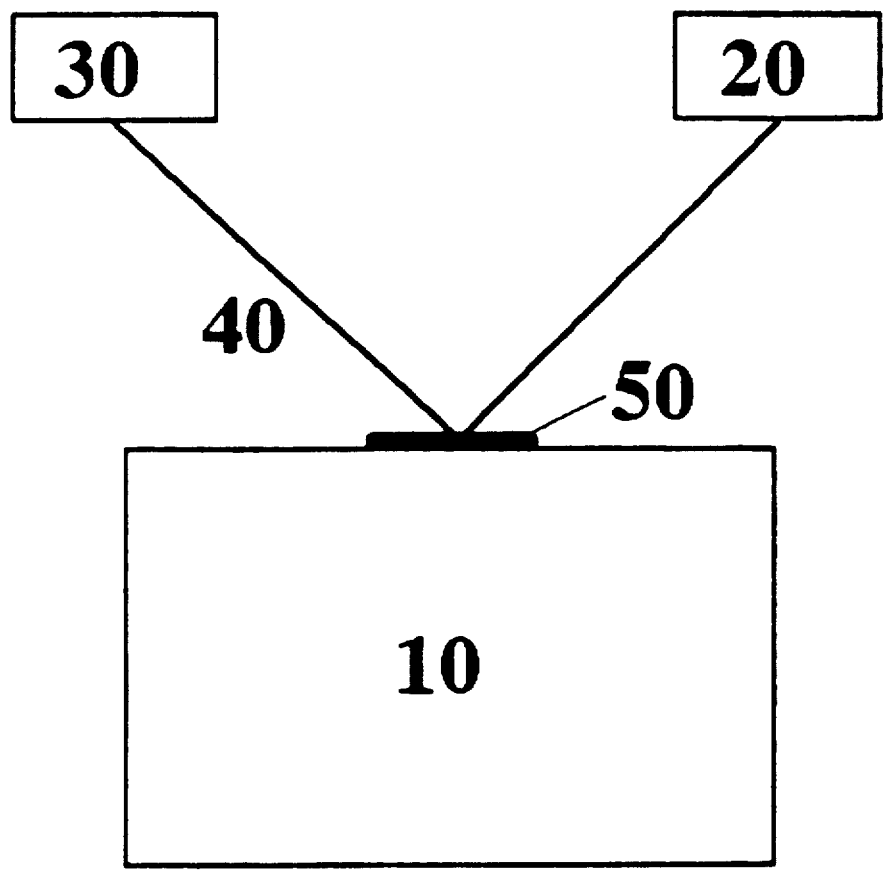
FIG. 2 is a block diagram of a hardware implementation of the invention.

As shown in FIG. 2, the system operates on microcomputer 10, which is connected to one or more EDI networks 20 and a host 30. The connection 40 between the system and the host is a synchronous connection such as a Bell 208A modem or another line driver. EDI data is transmitted to and from trading partners via the EDI networks, while application data is transmitted to and from applications operating on the host. All data transmission between the system and either the host or the EDI networks is routed through the communications interface work center, shown at 50.

In an alternate embodiment, the host on which the applications are operated and the microcomputer on which the EDI system operates are combined, so that applications are operated on the same machine as the system.

In the illustrated embodiment, each of the EDI system work centers is implemented in the e-language. Of course, the work centers could be implemented in other languages, such as Lisp or C++, although with greater difficulty. The e-language uses arithmetic, boolean, functional, and control structures similar to those in BASIC, Pascal, and COBOL. In addition, the e-language contains functions and data structures unique to EDI processing. These specialized functions include facilities for converting an EDI document to an EDI data tree and for performing the reverse operation. The e-language also contains commands to determine the status of various parts of the EDI system, and to perform low-level operations on these parts. These functions, and other aspects of the e-language, are described in the "e" Programmer's Reference Manual, attached as an Appendix hereto and being a part of the disclosure of this application.

The e-language allows the user to perform pattern-matching operations. For example, the e-language can be used to describe the format of an application file and to select the portions of the file to be used. This allows the production of a customized EDI document from an application file.

The e-language is structured in the manner described in the attached Appendix. The syntax of the e-language borrows some of the command names and clauses from BASIC and COBOL and general syntax structures from Pascal.

The system employs the concept of a data stream. A stream is a source of input or a destination of output. An input/output function generally takes a stream as one of its arguments. When a program is executed, a default input stream and a default output stream are created. Stream objects are bound to one or the other stream. Other streams can be opened during a program execution that can be bound to variables used in other runtime calls for input/output purposes.

COMMUNICATIONS INTERFACE

The communications interface has two parts: a) a scheduler; and b) a set of facilities drivers. The scheduler is a program that references a user-created table to determine when to communicate with sources of information (such as a trading partner or an application). The actual communication is done through a facility driver. All of the mechanics of transferring files via a given communication protocol are packaged in the facility driver, and are accessible to the user through a communication script. The script, which can be written in the e-language, specifies the procedures to be used to create a de-enveloping work unit.

The communications interface work center defines the concept of a logical connection to the outside world as a node. The logical implementation of the connection is a communications facility. Two kinds of nodes are defined: a) an EDI connection (or EDI network); and a non-EDI connection (or application). Thus, in FIG. 2, EDI network 20 and an application running on host 30 are each nodes. The node name is used to symbolize the network or application, binding the name to the specific communication facility that is used to execute the communication. In the illustrated embodiment, the system assumes that communication facilities exist in the form of hardware and software. These facilities are not part of the system; the system interfaces to the facilities through facility drivers, which are part of the system. The interface consists of a driver and a script. A driver is a program capable of communicating with the specific communication facility. This driver supports a set of primitives that is supported by the e-language. Communications packages usually have either a programming interface or a user interface. The driver must be interfaced to whichever interface the specific communication package has. A script is a program capable of configuring the communication package. This gives the system the ability to set up and use the proper script.

The different facilities to which the system could interface are numerous. It is therefore economical to have interfaces for common facilities such as Unix Mail, Unix File System, and Remote Job Entry. The operations provided by the interface depend on the capabilities of the facility, but as a minimum include send and receive primitives.

A facility client is capable of both sending and receiving files. The EDI translation system can be connected to a network node using a Binary Synchronous Remote Job Entry facility. The facility may be implemented by software such as the AT&T Synchronous Gateway. The gateway uses an account name to manage communication. When establishing communication with the network node in conjunction with the gateway, the network node is mapped to an account name, thus integrating the gateway communication software with the EDI system. A similar correspondence can be established between an application node and the gateway account. Other facility clients can include Unix Mail, X-MODEM, and the file system in the operating system.

Each node can also be assigned a schedule specifying the times when activity with the node is expected to occur. The schedules are derived from configuration specifications that users provide. The configuration specifications are configuration texts, rather than e-language scripts. Each schedule specifies the time and an associated script that is expected to be executed. The script, which, in the illustrated embodiment, is implemented in the e-language, contains details of how the communication is to be performed.

A sample communication script for a Unix Mail interface is shown in FIG. 3. The script embodies four primitives. The first, shown at 8110, is Envelope, which request that envelopes be made for data that is ready to be transmitted through the Unix Mail. The ATTMAIL parameter, 8120, identifies the network. The enveloped data is returned as a data stream. The second primitive is SendUnixMail, shown at 8210, which sends the enveloped mail messages in the stream out through the Unix Mail facility. Next, ReadUnixMail, shown at 8310, picks up from ATTMAIL any mail message, and develops a list of mail messages. Finally, MakeMail Interchange, shown at 8410, converts a mail message into an interchange.

This example illustrates the use of interface primitives that were developed as part of a Unix Mail driver. The example uses the Unix Mail facility to send and receive messages through the ATTMAIL network. If the pertinent parameter (such as 8120) were changed, the script could equally well use any other network. Scripts for simply reading mail without sending mail, or sending mail without reading mail, could also be developed and scheduled to execute at different times.

The scheduler is driven by a scheduler table, in which the rows are nodes and columns are facilities. Each cell in the table can contain a schedule instruction. The schedule instruction can specify that a communication should occur at a fixed interval or at a fixed time.

A facility is an interface with specific communication resources provided in the host machine. The facility includes information about how to use the communication resource. Because each facility is programmable, and therefore variable, a command must be issued to specify the communication script that the facility client should execute. The script is specified in the scheduler table.

Data received from a communication session is sent to the de-enveloper as a unit of work. The unit of work is assigned a script name, which identifies the de-enveloping procedure that will be used to divide the contents of the communication session.

The system also provides the structure for unattended operation, acting as a passive communications system for outside systems to call and to send it data for translation into EDI. The structure, based on the driver and configuration described above, allows the system to take advantage of existing communications packages. One of the standard facilities provided with the system is a file system communication facility. The facility consists of a listener that polls specified directories for files and a depositor that places enveloped data into a target file or separate files into a target directory. Files with specific names or files found in a specific directory are picked up by the system. The file name or the source directory determines the type of data and the requirements for de-enveloping.

The user can therefore use the file system communications facility in conjunction with any communication system that places incoming data into a specific directory to simulate incoming support. The user can also develop a program to transmit data deposited in a particular directory or file to the communication program.

These capabilities provide the tools for running unattended for communications initiated by another party. The system provides a scheduling mechanism for each network interface and application interface to allow the automatic scheduling of communications initiated by the system. The scheduling is done using a facility like timer services provided by some operating systems, such as the "cron" facility of the Unix operating system, which provides for the execution of specified commands according to a time schedule.

DE-ENVELOPING WORK CENTER

When incoming data contains multiple documents in one unit of work, the de-enveloping work center of the EDI system must break the work into single documents.

The de-enveloper has three purposes: a) to strip off the enveloping layer and divide a communication interchange into its component documents; b) to identify the sender, receiver, and transaction type; and c) based on that information, determine the type of transformation needed and the destination of the transformed document, saving the enveloping information as attributes of each document. The process is script driven. The content type and the de-enveloper script are determined by the communications process; the identity of the interface is known at the time the communications process located the data. If the data was located by a network interface, the content type is EDI and the EDI de-enveloper script is invoked for that network interface. If data from an application interface was located, the content type is application transaction and the application transaction de-enveloper script is invoked.

Script selection is performed through a table, the table having nodes as rows and the type of data as columns (being either EDI data, applications data, or text). In the case of EDI data, the de-enveloper work unit (an interchange) is de-enveloped into its component functional groups and then into transaction sets. Each individual transaction set is then considered a separate translation work unit. In the case of an application file, the report is divided into individual invoices. Each individual invoice is then considered a separate translation work unit. The system has the capability to handle text files, but performs no de-enveloping, translation, or enveloping on them.

The de-enveloping process is also script driven. Different scripts, and methods, are used depending on whether the data is EDI or non-EDI. The system gives the user the capability of defining each script to meet the user's particular requirements.

For an EDI input, the de-enveloping script uses the following general procedure. First, the start of the file is marked. Then, for each found interchange, the following steps are taken. First, data from the last mark to a position just prior to the interchange envelope is returned as a de-enveloper unit of work, considered an application transaction with the same name as the network interface. Second, the interchange envelope is read and an attribute list consisting of interchange values is populated. Third, for each functional group envelope found within the interchange envelope, the following steps are taken. First, the functional envelope is read and additional attributes are populated. Second, for each document envelope found within the functional group envelope, the following steps are taken. First, the document envelope is read and document attributes are populated. Second, a mark is set. Third, a translation unit of work is created using data from the mark to the end of the document. Fourth, additional document attributes are populated from the end of the document. When no additional documents envelopes are found, additional functional group attributes are populated from the end of the functional group. When no additional functional groups are found, a mark is set. The entire process above is repeated until no more interchange envelopes are found.

A sample de-enveloping script for EDI data is shown in FIG. 4. The primitive OpenInterchange, shown at 9120, specifies the types of interchange envelopes expected to be present in the data (ISA interchange envelope types in the example). The variable "cursor," shown at 9110, is used to point to the current position in the input/output stream. The primitive "Deenvelope,"

shown at 9210, extracts a document from a found envelope. The example script extracts documents from all envelopes that it finds.

The de-enveloper reads just enough of the interchange file to extract a transaction and then sends the data obtained to another work center for further routing through the system. In general, data is passed from one work center to another using queues. A configuration file is used by all the work centers to determine what work centers are available to the system.

The de-enveloper tracks the interchange and functional group information as it processes the interchange. Users can access the information through the element reference notation, as described below.

In the case of an application transaction, the de-enveloping process is different. The user must specify how the data is to be divided into individual transactions because the patterns that specify the boundaries between documents are not known. The user employs the pattern matching capability of a function termed SPLIT to split off the individual transactions. The pattern matcher is implemented in the e-language using a technique similar to the recursive descent LL(1) parsing technique, with backtracking to support optional constructions. The pattern matcher uses a specification termed a filemap to describe the structure of a file and a record specification to describe the structure of each type of record found in the filemap.

The filemap describes the order of records found in the incoming file. The record definition describes the structure of each record type. The language borrows from COBOL picture clauses for specifying the data type of each data element. The structure of the mapfile is shown below:

---

1. L_MAPFILE - primitive for 'e' mapfile intrinsic
   a. MATCH - high level match given a filemap
      i. MATCHPRIMITIVE - start of the primitive
         (1) MATCHRECORD - match the next record as specified
            (a) INITBINDINGS - initialize the connection with data elements
            (b) MATCHSIGNATURE - check if the record has the proper signature
               (i) PARSESIGNATURE - understand the signature specification
               (ii) DOMATCHSIGNATURE - apply the specification
                  1) EVALVALEXPR - evaluate the predicates
            (c) MATCHFIELD - match the specification of the next field
               (i) MATCHVALUEIS - match the user specified field value
            (d) MATCHSTARFIELD - special field matcher (varying length)
            (e) EXECUTEBINDINGS - connect data to symbol
         (2) EVALMATCHACTION - execute any action associated with matching the record
         (3) MATCHFILEMAP - if nested filemaps
            (a) MATCH - recursively match (to allow backtracking)
      ii. MATCHOPTIONAL - if the next construction is optional
         (1) MATCH - recursively match (to allow backtracking)
      iii. MATCHLOOP - if it is a loop
         (1) MATCH - recursively match (to allow -continued backtracking)

Using a filemap specification, a system user can specify both structure and sequence with minimum ambiguity.

The e-language includes three primitives used in dividing application documents from an application communication. The primitive used to split off documents is SPLIT <stream, filemap>, which reads the file and processes it using the filemap. Additional primitives MARK_END, DO_SPLIT and ROUTE_TO_xxx are used to do perform functions similar to those provided in the EDI de-enveloping procedure. These primitives are to be used in the actions associated with records matched by the filemap specification. MARK_END marks a possible end of a document. DO_SPLIT splits out the document identified with the beginning and end marks and places a new begin mark immediately following the previous end mark.

Application documents are separated by selective use of these primitives in the filemap. For example, a communication file may contain a set of invoice reports. These reports are printed a page at a time, but may be printed in multiple pages. The filemap specifies how to pattern recognize each page and to extract from each page the trading partner's identifier. A begin mark is set at the beginning of the first page and an end mark set at the end of each page. If more than one sequential page includes the same invoice identifier, the SPLIT continues to pattern match until it reaches a page for which the invoice identifier is different, then resets the end mark to be at the end of the last page of the group of pages with the same invoice identifier. The DO_SPLIT primitive is then used to divide out the invoice between the begin and end marks. A sample de-enveloping script for application data is shown in FIGS. 5A to 5E.

The script first identifies the filemap specification, "invoice" to be used, as shown at 10110. The "record [name]" commands, as at 10120, indicate that certain commands are to be executed when the named record is found in the input data stream. The "printf" commands shown, as at 10121, print out specified information for diagnostic purposes. As shown at 10300 in FIG. 5B, each time a record "total3" is found (10310), an end mark is set (10320). As shown at 10400, the script then splits the record with the DO_SPLIT command (10410). The script then determines at 10420 the receiver, using the data element "custnum" shown at 10121 in record "terms" at 10120. Then, in line 10430, the script resets the start marker. In the following steps, as at 10440, the format for each record to be read is defined.

At 10520 in FIG. 5E, the script directs that each invoice be split, keeping a list of items in the variable "vfl," using the filemap "invoice" and the data from the standard input stream "stdin." Finally, at 10600, for each item in the list "vfl", the item is routed to the translation work center (10640).

As noted in the preceding script, the de-enveloping work center also routes documents to the required destination. The routing function is controlled by a routing table. For an EDI document the following document elements determine how to process the document: a) sender, found from the interchange or functional group envelope; b) receiver, from the same source; and c) document type, which is from the document envelope. Sender and receiver may be known by different names from different sources. The system resolves the different aliases into a specific enterprise using an alias table. For an application transaction, the following data elements determine how to process the transaction: a) sender, derived from application interface profiles or from document scanning; b) receiver, from the same source; c) the application transaction, which comes from the document.

The user specifies how to process translation units of work by entering in the routing table the following information: a) script to be used in the translation; b) the destination network or an application transaction; and c) sender and receiver. This information is found in the routing slip for the work unit.

TRANSLATION WORK CENTER

The translation work center manipulates an incoming document into the format that is expected by another system. It can convert EDI data to a format that can be printed and/or used by applications and can convert a file created by an application to a standard EDI format. Unlike existing systems, there is complete flexibility in the ability to translate. It can convert from one EDI format to another or from one application format to another. In the illustrated embodiment, it is implemented as an interpreter that understands primitives of the e-language and is used with a script written in the e-language to perform transformations on many kinds of data. Although shown as implemented as an interpreter, implementation through use of a compiler is also possible.

The translation work center is explained in the context of a sample conversion. A sample input document, an invoice, will be converted from the application format shown in FIG. 7 to an EDI format, which is an EDI 810 document, as shown in FIG. 8. A document definition is created in the e-language that describes the structure of the document and a corresponding bare tree is constructed. Data is read from the input document and mapped onto the bare tree. The data is then mapped from the populated tree into the EDI 810 document format.

The EDI system manages an EDI data stream with an EDI reader and an EDI writer. The purpose of the EDI reader is to develop an EDI data tree from an EDI document expression. The e-language provides the capability to make a bare tree corresponding to a particular document and for creating an EDI tree from a virtual file whose body is a document.

Trees are one type of data variable used in the e-language. In turn, data variables are one type of e-language In turn, data variables are one type of e-language program element. The elements of a program written in the e-language are described below.

Lexical Elements—The e-language recognizes a character set that includes alphabetic characters, numerical characters, and special characters. Identifiers are names given to variables, functions, subroutines, patterns (records), and filemaps in the program. Constants can be string or numeric constants. Reserved words are words with special meanings in the e-language that cannot be used for program names or identifiers.

Variables—A variable is a name used to refer to objects in the system. The object may be a single element or multiple elements. The three variable types available in the e-language are arrays, records, and trees. Arrays are collections of data values whose individual members are accessed via a numeric index. A record is a compound data structure containing multiple values, or fields, of various types.

As described in more detail below, trees are composed of nodes, with an uppermost node called a root node (or root). Branches below a node are called the node's children or branches. The lowermost or outermost nodes (those with no children) are called leaf nodes or leaves.

The e-language provides the capability to make a bare tree appropriate for a particular document and to create an EDI tree from a virtual file whose body is an document. In both cases a pointer to the root of the tree is created; by assigning pointers, any node of the tree can be referenced.

Expressions/Operators—Expressions are constructs having a well-defined value in the context in which they appear. The simplest expressions in the e-language are identifiers, string constants, function calls, array references, and tree (or node) references. Operators are characters that designate mathematical or relational operations.

Statements—Statements are instructions to the computer to perform some sequence of operations. The types of statements available in the e-language include: a) assignment statements; b) conditional statements; c) iterative statements; d) IF statements; e) FOR statements; f) WHILE statements; and g) subroutine calls.

Functions—Functions are collections of instructions that return a value. Functions include multi-valued functions that return more than one value, subroutine definitions, and filemap definitions. Filemaps are function-like objects that perform pattern-matching on files. A filemap accepts as input a list of records and/or other filemaps, and matches items in the current virtual file with the given records or filemaps. Fields in a record that is successfully matched are bound to the items in the input file they match. The program can then access the values of the fields elsewhere.

Trees are information structures particularly well suited to the structure of documents. By representing documents as trees, the contents of the documents can be accessed in an expressive and convenient form. The tree is like a file buffer, with a definite structure, and in the e-language, a variable can be assigned to the tree.

Every node in an EDI tree can be classified as one of the following types. An area consists of a non-empty sequence of segment blocks and loop blocks. It can be considered as the root of an arbitrary subtree. Its subnodes are segment blocks and loop blocks. A segment block represents a block of repeated segments with identical segment identifiers. Its subnodes are segment bodies. A segment body represents a single segment within a segment block. Its subnodes are the elements of the segment. A loop block corresponds to one or more iterations of a loop. An iteration of a loop is the sequence of segment blocks for the segments marked as a loop in a standard document. The subnodes of loop blocks are loop bodies, analogous to segment blocks and segment bodies. A loop body is an iteration of a loop; its subnodes are segment blocks. An element has the same meaning for an EDI tree as it has for an EDI standard—it is the smallest logical portion of a segment. Some EDI standards also employs the concept of composite data elements, which have similar semantics and implementation to segments.

Any node in an EDI tree can be referenced by specifying its path. Symbols used in defining EDI documents are used to develop the path specification. Three operators are used: separator, selector, and arrow operators. Separator operators separate nodes in the tree, while selector operators select a loop body, segment body, or element in that node. An arrow operator points to an NTE segment or a subtree of a hierarchical level loop. An NTE segment is designated in the X12 standard as a floating segment, one that can appear anywhere within a document. Hierarchical levels, used in some EDI documents, show the relationships among different levels of detail in a shipment, such as pallets on a truck, part numbers on the pallet, cartons of a particular part number, etc. Such a notation is necessary because an NTE is considered an appendage to any segment body and an HL subtree is considered an appendix of an HL loop.

An EDI tree is constructed based on a document definition. A document definition for an X12 810 invoice transaction set, implemented in the e-language, is shown in FIG. 9. The definition is divided into a heading area 1100, a detail area 1200, and a summary area 1300. The heading area includes segments, such as segment ST, shown at 1101, and loops, such as loop_n1, shown at 1110. The document definition gives the "grammar" of an invoice document as agreed to by the X12 committee.

Segments and elements can also be defined as text files in the e-language. Two sample segment definitions are shown in FIG. 10, expressed in Lisp. These segment definitions are for the CUR segment (shown at 2100) and for the N1 segment (shown at 2200). Each segment definition identifies the name of the segment, such as N1 shown at 2205, and the title, such as "NAME," shown at 2210. It specifies a list of document definitions in which the segment is used, as shown at 2220. This line indicates that the N1 segment is used in the 810 document definition (indicated at 2225).

The segment definition next defines a syntax. The syntax definition is used to evaluate a particular segment expression to determine whether it complies with the standard. This addresses the shortcoming of prior generation translators in inadequately handling the conditional notes in segment definitions. For example, segment N1 may have a conditional note that either the second data element must exist or both the third and fourth data elements must exist. This note is implemented in the syntax shown for segment N1, shown at 2230. The conditional is expressed in the statement "((-or 2 (-and 3 4)))," where the numbers refer to the data elements.

Next, the segment definition specifies a list of elements, as shown at 2240 for the N1 segment. Each element is indicated as being either mandatory (M), optional (0), or conditional (C). This ties into the syntax. For example, since the syntax provided that either the second data element or the fourth and fifth data elements must exist, these data elements (element numbers 93, 66, and 67) are indicated as conditional. Element 98 is mandatory.

The position of an element in a segment is used in the e-language to refer to the data element. In this element reference notation, the path specified by "tree HEADING LOOP_N1[3]N1[2]" refers to the second element in the N1 segment, which means that element number 93 is being referenced.

Finally, the segment definition specifies the type and version of the EDI standard being used. As shown at 2250, the N1 segment definition is based on version 0.0 of the X12 standard.

The elements themselves can also be defined. Two sample data element definitions (also in Lisp) are shown in FIG. 11—element 93 is defined at 3100 and element 98 is defined at 3200. This definition allows the EDI system to verify whether the format of an input data element conforms to the data definition. The element definition includes the name of the element (e.g., 93, as shown at 3111), the data type (e.g., alpha-numeric, or AN, as shown at 3112), the minimum (3113) and maximum (3114) length, and the title (e.g., NAME, as shown in 3115). Next, the definition specifies the segments in which the element is used, as shown at 3120. Finally, the type and version of the EDI standard is specified in 3130.

As shown in the element definition for data element 98, a list of possible values, shown at 3220, can be included that is used to validate the data element values.

The e-language can be used to describe the document, segment, and element sets that make up EDI standards such as X12. New document, segment, or element types can be defined, or existing definitions can be modified. The e-language allows the user to express the description in a way resembling the descriptions given in the EDI X12 and TDCC Standards books. Each element definition includes a specified data type, such as the "AN" or alphanumeric data type specified for data element 93 at 3112 in FIG. 11. These data types are not hard coded in the e-language, but rather their format is defined by a regular expression, which is a notation well known in the art. Four sample data type definitions are shown in FIG. 12. The definition for a numeric data type with floating decimal is shown at 4100, the definition for a floating point decimal data type is shown at 4200, the definition for an alphanumeric data type is shown at 4300, and the definition for the different classes of data types found in a data element definition, and the verification generator associated with the class, is shown at 4400. For example, data types specified as "n2" will match the definition [nN][-9] at 4410. so that a pattern will be generated based on the X12-n-verification-generator. The verification generator accounts for the minimum and maximum lengths and scaling factors in developing the pattern. The generated pattern is later used to verify that data read from an EDI document matches the pattern.

These regular expressions are evaluated when the data element is read or assigned to a tree. This means that new data types defined by EDI standard-setting organizations can be incorporated into the system with little difficulty. Further, a sufficiently sophisticated user could introduce new data types.

An EDI tree can be constructed based on the document definition using one of two e-language primitives, READ EDI (or EDITOTREE) and MAKEDOC. Both primitives are based on the document definition as specified by its document identifier (such as 810), by the standard (such as X12), and by the version of the standard (such as version 2.2). The EDI system uses a hunt sequence associated with the version to resolve the appropriate segment and element definitions. This is a technique that reduces the amount of space required to store various versions of the standards. It is a defaulting scheme used so that standard specifications that remain unchanged from version to version are stored only once.

The READ EDI primitive reads a data stream according to a specified standard and document definition, constructs an EDI data tree structure, and populates the tree from the data stream so that it can be accessed using the EDI tree path notation. The MAKEDOC primitive prepares an empty EDI data tree structure based on a specified standard and document definition. As explained below, this empty tree can later be filled with assignment statements in a filemap structure. MAKEDOC creates the minimum bare tree corresponding to the specified document definition. However, additional nodes or intermediate branches may be needed to contain the data. When an assignment statement is executed, if the required intermediate branch or node does not yet exist in the tree, it is created by the assignment. Another primitive, WRITE EDI (or TREETOEDI) writes data that has been structured in an EDI data tree structure to an output stream in an EDI document format.

These primitives are implemented in the dynamic creation of data structures as specified by the standards. The document tree contains areas, which contain loop blocks or segment blocks, loop blocks in turn contain loop bodies or segment blocks, segment blocks contain segment bodies, and segment bodies contain data elements. To allow an NTE segment to float, any segment body can be given an NTE property. The user can refer to and manipulate the contents of the tree by using the flexible notation referred to above. A tree can have multiple occurrences of loops or segments. In traversing a tree, the specific occurrence required must be referred to. For example, in the 810 document definition shown in FIG. 9, there is a LOOP_N1 1110 defined in the HEADING area 1100 that can occur between 1 and 200 times. Inside the loop is an optional segment N2, shown at 1111, that can occur up to two times. To refer to the second occurrence of the N2 segment in the third occurrence of LOOP_N1, the tree path specification would be "tree HEADING LOOP_[3] N2[2]."

These primitives can be used to take data from an input stream in either EDI or application format and put data into an output stream in either format. In the sample translation illustrated below, application input data is converted to EDI output data.

The translation of the sample invoice document shown in FIG. 7 to the EDI 810 format shown in FIG. 8 is implemented with a translation script. The EDI translation script used with these two documents is shown in FIGS. 13A to 13C.

This script illustrates the structure of an e-language program. A program written in the e-language consists of a series of program statements stored in a file with a structure similar to a Pascal program. The program can begin with array declarations, which can be one-dimensional or multi-dimensional. None are defined in this example. Next is the definitions section, in which functions, subroutines, records, and filemaps are defined. The function "the_date" is defined at 5110 in FIG. 13A, a filemap is defined at 5200 in FIGS. 13A and 13B, and several records are defined at 5300 in FIGS. 13B and 13C, with an individual record shown at 5310. The executable commands and statements follow, bounded by a BEGIN statement and an END statement, as shown at 5400 in FIG. 13C.

The FILEMAP statement, shown at 5200, maps the input data stream to a set of record assignments. These record assignments are listed in nested loops 5210 and 5211. Each record assignment assigns variables to tree path specifications. For example, in the "person" record assignment 5212, variable "p_name" is assigned to the tree path "tree HEADING LOO_P N1[1] PER[1][2]."

Following the filemap definition is a set of record definitions, shown at 5220. These definitions pattern match the data from the input file and assign them to the variables that have been assigned to tree paths in the record definition statements. In the command section 5400, a bare tree is created using the MAKEDOC function in line 5410, which specifies that the tree is to be an X12 810 invoice, using version 2.2 of X12. The bare tree is then populated from the standard input stream, STDIN, with the pattern-matched data in line 5420 using the MAPFILE function. Finally, in line 5430, data from the tree is output in EDI X12 format using the TREETOEDI function, using an "*" as an element separator, a " n" as a segment separator, and an "@" as a subelement separator.

The operation of this script is illustrated with the sample input shown in FIG. 7 and the sample EDI output shown in FIG. 8. In record definition 5310, a search is conducted for the string "MAIL" by 5311 and 5312. This is found in the input document at 6110. Having found MAIL, the blanks following MAIL are skipped by line 5313. Then, the following fourteen characters of data, which in this case will include "Perry Lawrence," are read and assigned to the variable p_name in line 5314.

Line 5315 then searches for "GROUN." Then, the month ("NOV," read by line 5321), day ("27," read by line 5323), and year ("1989," read by line 5325) are read and assigned to the variables "mon," "day," and "year." These are concatenated by the function "the-date" defined at 5100 in FIG. 13, which in turn was assigned to the variable "inv_date" in line 5313. Variable "inv_date" in turn is mapped to tree HEADING BIG[1][1-]in line 5314 (i.e., the first element in the first occurrence of the BIG segment).

Although the ST (transaction set header) and SE (transaction set trailer) segments (shown at 1101 and 1321, respectively, in the document definition shown in FIG. 9) are mandatory because they envelope the document, they are not put into the EDI output document at this point in the process because they are not yet determined. Enveloping segments typically contain control information, which cannot be resolved until the translation step is completed. For example, the SE segment includes the number of segments in the document, which is not known until the document is finished.

As shown at 7111 in FIG. 8, the data is then output as "NOV271989" following the BIG segment identification. Similarly, line 5327 of FIG. 13 reads in the inventory number, 101903, assigning it to the variable "inv_num," which in turn is mapped by line 5315 to tree HEADING BIG[1][2], from which it is output at 7112. This process is followed to read the remainder of the required information from the input document and map it to the tree and thence to the output document.

The inverse of the above operation can also be performed. An EDI document can be converted into data records in a format readable by an application. In such a translation, a tree corresponding to the EDI invoice is created and populated using the READ EDI primitive. A series of assignment statements are used to assign data from the tree to fields in data records. When a data record is completed, it is output to the application by the PUTREC command. A sample of a script for translating an EDI document into an application document is shown in FIGS. 14A to 14E.

In the commands in FIGS. 14A to 14C, such as "record header" at 13110, the fields for each record of data required by the application are defined with picture statements. At 13200 in FIG. 14C, the READ EDI primitive is used to read the document "podoc" (purchase order document) and create a tree structure populated with the data from the EDI document in the input data stream. The script next includes a series of assignment statements, as at 13310, in which data from nodes of the tree are assigned to the fields. When the fields in a record are filled, the record is output to the output stream with the PUTREC command, as at 13400. This process continues for each of the records.

A translation from one EDI format to another EDI format can be performed as follows. First, READ EDI is used to create and populate a first tree corresponding to the input document. MAKEDOC is used to create a bare second tree corresponding to the desired output document. A series of assignment statements are then used to populate the bare second tree with data from the first tree. WRITE EDI then creates an EDI document from the populated second tree.

Similarly, the system can translate a document from a first application format to a second application format. An intermediate tree structure may not be used in this case. The document is first pattern recognized. The pattern recognized data is then assigned to the appropriate records for the second document format, and the records output to the second application using PUTREC. A tree may also be used to represent application transactions.

ENVELOPING WORK CENTER

Outbound EDI documents are created by the translator process. These documents are usually created as a result of processing an inbound application transaction. Although the outbound document contains a complete address, the facility used for communicating the document may not be ready. There is therefore a need to hold these documents until the communication facility is ready. The process of grouping EDI documents into a "package" that is to be sent through an EDI communication facility is termed "enveloping."

As described above, the EDI enveloping scheme employs the concept of an interchange, which is a unit of communication from a given sender to a specific receiver comprising a package of mail containing multiple functional groups. A functional group is a grouping of EDI documents that correspond to a theoretical organizational function, such as the purchasing department. Each document is a single business document expressed in EDI.

The system uses a hierarchical file structure to store the EDI documents that are ready to be communicated. The structure closely follows the EDI enveloping scheme. The hierarchy runs from communication facility as the highest level, to network interface, receiver, sender, functional group, and document. This hierarchical structure is also used to store application transactions. Outbound application transactions are stored in a similar hierarchy, with communication facility at the top, followed by application interface and application transaction.

Thus, a file produced by the translator and its accompanying routing form is moved into a depository where the enveloper can find the file when required. The translator uses the node, file type (EDI, non-EDI, or text) network or application interface, and other information on the routing form to determine where a file should be placed. It also consults a table that indicates what sort of interchange is used for a given trading partner, functional group, and node. This file structure, corresponding to the hierarchy described above, is shown graphically in FIG. 6. TP denotes a trading partner, INT interchange method, and FG functional group. In the illustrated embodiment, the file is physically located on the fixed disk of the microcomputer on which the system is operated.

When the communication facility is ready, it makes a request to the enveloper specifying the communication facility and either the application interface or the network interface. A network interface is an interface to an EDI transfer or user agent. This means that the packages communicated through this interface must follow the EDI packaging scheme described above. An application interface is an application transfer or user agent. This means that the packages communicated through this interface pertains to a more simplified packaging. The procedure is to concatenate all transactions and present them for transmission. Optionally, the transactions may also be surrounded by job control language to create a job stream to be transmitted to a host.

When it receives a request from a facility client, the enveloper takes files from the directories into which they were placed by the depositor. The enveloper locates the appropriate directory based on the identity of the node and facility being served and the type of file content. Files within a given functional group directory are wrapped in a functional group envelope, which is in turn wrapped in an interchange envelope. Values for data elements in the functional group and interchange envelopes are obtained or generated. When the interchange is complete, it is sent to the facility client in the communications interface.

For application data files output by the translation work center, the enveloper first batches together the documents into a single set for use by the pertinent application. In the illustrated embodiment, the enveloper packages the data for the host (attaching job control language, for example) and transmits the packaged data through the communications interface to the job entry system of the host. In an alternate embodiment where the application and the EDI translation system operate on the same machine, the documents are grouped into a single file and placed in a file location agreed to by the application and EDI system, and the application is then triggered to execute the file.

Text files are sent directly to the facility client without processing. Sender and receiver data are embedded in application files. This makes the information available to the receiver and to the user's enveloping script.

EDI/e™

"e" Programmer's Reference Manual

PREMENOS CORPORATION

Contents

PREFACE

1  GENERAL INTRODUCTION

2  FUTURE DIRECTIONS

3  "e" LANGUAGE COMPONENTS

4  ROUTING DEFINITIONS

5  MANUAL PAGES

FEEDBACK FORM

Document Title:     "e" Programmer's Manual
Document Number:
Issue Number:
Publication Date:    July 1990

Note to readers:

Your feedback on this document is welcome. Your feedback will aid Premenos in improving the quality and usefulness of Premenos customer documentation. When commenting on specific items within this document, please give the page numbers in question. A Premenos representative will attempt to respond to all written comments.

Comments:

_____

_____

_____

_____

_____

_____

_____

Submitted by (optional):

Name:
Company:
Address:
Telephone Number:
Date:

Return to:

Name:           Premenos
                Information Development
Address:        1000 Burnett, Suite 200, Concord, CA 94520

1 GENERAL INTRODUCTION

| | |
|---|---|
| GENERAL INTRODUCTION | 1-1 |
| AUDIENCE AND PURPOSE | 1-1 |
| STRUCTURE AND CONTENT | 1-1 |
| CONVENTIONS USED | 1-1 |
| HOW TO COMMENT ON THIS MANUAL | 1-2 |

PREFACE

What is the "e" Language?

"e" is a complete programming language tailored specifically to the EDI environment. "e" includes variables, procedures and a full set of control structures similar to those found in BASIC, Pascal and COBOL. In addition, the "e" language provides functions and data structures unique to EDI processing. These specialized functions include facilities for converting the text of an EDI document to an EDI "tree," for performing the reverse tree-to-text operation, and for conveniently accessing the contents of a tree. The "e" language also provides functions to determine the status of various parts of the EDI/e system, and to perform low-level operations on these parts.

"e" provides a powerful pattern-matching facility that enables you to describe the layout of the data files produced by other application programs. Using this description, the EDI/e system can read and understand your invoice, purchase order, and other data files. You can then program EDI/e to produce a customized EDI text from your application files.

Why "e"?

The "e" language lies at the heart of the EDI/e system. "e" describes both the EDI standard and the document translation process typically referred to as *mapping*.

The mapping capability of previous generation EDI systems allowed users to link fields within an application to elements in a standard document. However, this linking relationship was unconditional, that is, constant. "e", on the other hand, allows you to construct conditional mapping statements. For example, you can tell the system to place a particular document element into a mapped field *if* a certain condition such as the presence of some other piece of data exists.

GENERAL INTRODUCTION

AUDIENCE AND PURPOSE

This manual is a reference for the "e" language. Its aim is to provide a complete description of the language and its components. In addition, each "e" command is presented in reference format where you can look up the correct command syntax, description and examples.

This manual is intended for people who want to program in the "e" language. Some elementary programming knowledge on the user's part is assumed, as is an understanding of how EDI documents are constructed.

STRUCTURE AND CONTENT

This manual is organized into the following chapters:

- Future Directions
  This chapter describes "e" language features that are still under development.

- "e" Language Components
  This chapter describes the elements of the "e" language, such as identifiers, expressions, statements and functions.

- Routing Definitions
  This chapter provides you with a general overview of the process known to the EDI/e system as *routing*. It also describes the "e" programs and tables you must create for the routing process.

- Manual Pages
  This is the reference chapter where you can find the formal "e" definitions. It describes the syntax and semantics of every statement and run-time function available in "e", in alphabetical order.

- Appendix A, "List of Keywords"
  Appendix A gives you an alphabetical list of all the keywords in the "e" language.

Conventions Used

Keywords and special functions appear in bold face type. Examples appear in monospace type.

The following conventions are used in the Manual Pages when defining "e" language statements and run-time functions. All entries appear in the following format, though not all of these headings apply to each entry:

GENERAL INTRODUCTION

- NAME: gives the name (and an alternative name, where appropriate) of the statement or function, and briefly describes its purpose.

- SYNOPSIS: describes the usage/syntax of the command. The following conventions apply:

Keywords appear in bold face type.

You supply items in angle brackets < >.

Items in square brackets [ ] are optional.

Parentheses, colons, and semi-colons are required where shown.

Ellipses ... show that the previous argument can be repeated.

A vertical bar | separates alternative choices. Where an alternative can, but need not, be used, it is enclosed in [ ] square brackets. Where an alternative must be used, it is enclosed in curly brackets { }.

- DESCRIPTION: tells how to use the command.

- EXAMPLE: example(s) are given where appropriate.

- NOTES: gives information that may be helpful under the circumstances described.

- SEE ALSO: refers you to related commands.

HOW TO COMMENT ON THIS MANUAL

To suggest changes to this publication, or to notify the authors of any errors, please submit a feedback form. The feedback form is located at the beginning of this manual, immediately after the title page. If the feedback form is missing, send your comments and/or recommendations for changes to:

Premenos Corporation
1000 Burnett, Suite 200
Concord, CA 94520
ATTN: Information Development

2 FUTURE DIRECTIONS

| FUTURE DIRECTIONS | 2-1 |
|---|---|
| PIC Clauses | 2-1 |
| PRINT Statement | 2-1 |
| Arrays | 2-1 |
| String Manipulation Function | 2-1 |
| Error Messages | 2-1 |
| Interactive Debugger | 2-1 |
| Demand Loading | 2-1 |
| List of Values for ID Elements | 2-2 |
| Application Records Field Names | 2-2 |
| Program Generator | 2-2 |

FUTURE DIRECTIONS

The following material addresses some features of the "e" programming language that are scheduled for implementation:

PIC Clauses

The "e" language will support new extensions to the pic clause, including a date format specification extension.

PRINT Statement

The print statement will be extended to allow you to introduce formatting specifications.

Arrays

Associative arrays (arrays that can be indexed by strings) will be introduced. This feature could be utilized to associate schemes for issuing queries to external files or data bases, and would be useful, for example, as a means of translating codes for trading partners with different coding schemes.

Error Messages

The following enhancements for dealing with error messages will be introduced:

- The capability to produce user-generated error messages
- Improved mechanisms in "e" for handling run-time error conditions.

Interactive Debugger

The "e" interpreter will include an interactive debugger.

Demand Loading

To ensure sufficient storage space when new versions of standards are loaded, the "e" language will provide a mechanism for automatically removing standards versions that have not been used recently.

List of Values for ID Elements

EDI/e will provide the capability to access an externally maintained list of all possible values that can be contained in each ID element.

FUTURE DIRECTIONS

Application Records Field Names

Currently, EDI/e field names are globally defined. Future versions of EDI/e will permit the use of record names as qualifiers for field names.

Program Generator

A graphical programming interface will be provided as an aid to developing translation programs. This graphical interface will enable you to express mapping by matching loops and specifying the needed operations to map the output from the source. This program generator will be able to produce an "e" program for most straightforward mapping problems so that you do not have to write any "e" code yourself.

3  "e" LANGUAGE COMPONENTS

| "e" LANGUAGE COMPONENTS | 3-1 |
|---|---|
| OVERVIEW | 3-1 |
| LEXICAL ELEMENTS | 3-1 |
| ■ Character Set | 3-1 |
| ■ Comments | 3-2 |
| ■ Reserved Words | 3-2 |
| ■ Identifiers | 3-2 |
| ■ Constants | 3-2 |
| ◻ String Constants | 3-2 |
| ◻ Numeric Constants | 3-3 |
| VARIABLES | 3-3 |
| ■ Data Structures | 3-3 |
| ◻ Arrays | 3-3 |
| ◻ Record Definitions | 3-4 |
| EDI TREES AND SPECIAL FUNCTIONS | 3-5 |
| ■ EDI Nodes | 3-8 |
| ■ Referencing Nodes | 3-8 |
| ■ NTE Segments | 3-9 |
| ■ Loops | 3-9 |
| ■ Hierarchical Levels | 3-10 |
| EXPRESSIONS/OPERATORS | 3-11 |
| ■ Arithmetic Operators | 3-11 |
| ■ String Operators | 3-11 |
| ■ Relational Operators | 3-12 |
| ■ Logical Operators | 3-12 |
| ■ Precedence and Associativity | 3-13 |
| STATEMENTS | 3-13 |
| ■ Assignment Statement | 3-14 |
| ■ Conditional Statements | 3-14 |
| ◻ IF Statement | 3-14 |
| ◻ SELECT Statement | 3-14 |
| ■ Iterative Statements | 3-15 |
| ◻ WHILE Statement | 3-15 |
| ◻ FOR Statement | 3-15 |
| ◻ FOREACH Statement | 3-16 |
| ■ RETURN Statement | 3-16 |
| ■ Subroutine CALL | 3-16 |

Table of Contents

| | |
|---|---|
| FUNCTIONS | 3-17 |
| ■ Multi-valued Functions | 3-17 |
| ■ Subroutine Definitions | 3-17 |
| ■ Filemap Definitions | 3-18 |
| ■ Sample Filemap | 3-20 |
| DEFINING YOUR OWN DOCUMENT, SEGMENT AND ELEMENT SETS | 3-21 |
| ■ Element Definitions | 3-21 |
| ■ Segment Definitions | 3-22 |
| ■ Document Definitions | 3-25 |
| SAMPLE X.12 810 DOCUMENT DEFINITION | 3-26 |
| ■ Notes on Composite Elements | 3-28 |
| STRUCTURE OF AN "●" LANGUAGE PROGRAM | 3-28 |
| RUN-TIME LIBRARY | 3-28 |
| ■ Summary of Intrinsic Functions | 3-28 |

"e" LANGUAGE COMPONENTS

OVERVIEW

This chapter contains information on the various elements of the "e" language. These elements are described in the following "bottom-up" order:

- 1. Lexical Elements
- 2. Variables
- 3. Expressions/Operators
- 4. Statements
- 5. Functions
- 6. Program Structure
- 7. Run-time Library For more information on the syntax and usage of "e" statements and functions, see the "Manual Pages."

LEXICAL ELEMENTS

This section describes the lexical structure of the "e" language, that is, the symbols you can use in an "e" source program.

Character Set

The character set that the "e" language recognizes includes alphabetic characters, numeric characters and special characters.

The alphabetic characters recognized are the upper and lowercase letters of the alphabet. The numeric characters are the decimal digits 0 through 9.

The "e" language permits the following escape character sequences (character combinations representing keystrokes that cannot otherwise be duplicated in a program):

| | |
|---|---|
| \b | Blank Space |
| \n | Newline (Linefeed) |
| \r | Carriage Return |
| \t | Tab |
| \" | Imbedded Quote |
| \\ | Imbedded Slash |

When the "e" interpreter encounters these characters, it "escapes" from its normal functioning and translates them accordingly.

Where appropriate, this chapter describes other special characters you can use in "e".

"e" LANGUAGE COMPONENTS

Comments

You can indicate a comment in the "e" language with either an apostrophe (') character or the rem statement. You can place a comment anywhere on a statement line or on a line by itself. The "e" interpreter ignores everything that follows the ' or the keyword rem.

Keywords

A keyword is a word that has a well defined meaning in a certain context to the "e" language. (See Appendix A for a complete list.) The "e" language allows you to type keywords any way you like, using any combination of upper or lower case letters. For instance, you can type the keyword for as "for," "For," or "FOR." You should avoid using keywords for identifiers or program names.

Identifiers

Identifiers are the names you give to variables, functions, subroutines, patterns (records) and filemaps in your program. (These items are explained later.)

When naming identifiers, follow these rules:

- The first character must be either a letter or an underscore (_). The remaining characters may be letters, numbers or underscores. You cannot use a hyphen (-) in an identifier name.

- You can use both upper and lower case letters. For example, you can represent the identifier "PO_TOTAL" as "po_total," "Po_total," or "Po_Total."

- Identifier names can be of any length.

Constants

Constants are the actual values that "e" uses during execution. The two types of constants are string constants (characters), and numeric constants.

String Constants

A string constant is a sequence of characters (possibly even blanks) enclosed in double quotes. To put a double quote mark inside a string, precede the quote mark with a \. Some examples follow:

```
"This is a string"
"THIS IS A STRING"
"S12.25/Box"
"v"
"\"This string prints in quotation marks.\""
""""    (This string consists of one double quote mark.)
```

"e" LANGUAGE COMPONENTS

Numeric Constants

A numeric constant is a number, either positive or negative. Unless you specify a minus sign (-), the "e" interpreter assumes a number is positive. Numeric constants fall into two groups:

- Integer: positive or negative whole numbers (no decimal points allowed)

- Floating-point: positive or negative real numbers (numbers that do contain decimal points).

VARIABLES

A variable is a name that identifies a single value to be used in an "e" program. You assign values to variables using the assignment statement (explained in the "Statements" section). The "Identifiers" section above explains the rules for naming variables.

Data Structures

Data structures enable you to organize multiple data values by a single aggregate value. The three data structures available in the "e" language are *arrays*, *records* and *trees*. (See "EDI Trees and Special Functions" below for a discussion of trees.)

Arrays

An array is a collection of data values whose individual members you access via a numeric index. If you use arrays, you must declare them at the beginning of your program. The "e" language uses a BASIC-like array declaration, with added flexibility in initializing array values.

The syntax for declaring an array is:

```
dim <array name>(<subscripts>)[=<constant>]
```

If you do not explicitly initialize an array, all of its entries are set equal to zero (the default value). The smallest subscript that you can use when referencing an array element is 1. You cannot reference an undefined array entry.

The following examples show how to use the array statement:

```
dim a(5,20) = 1
dim b(200)
dim str(55) = ""
```

The first statement declares a two-dimensional array a, with 5 rows and 20 columns. It initializes all of its entries to 1. The second statement declares an array b with 200 entries. Since it is not explicitly initialized, all of its entries have no value. The third statement sets all 55 entries in array str equal to an empty string.

3-3

"e" LANGUAGE COMPONENTS

Record Definitions

A record is a compound data structure containing multiple values of various types. You can use record definitions to describe text patterns to extract strings from a text file for use in an "e" program, and to access data in a program-generated file.

You define records using a syntax similar to COBOL:

```
record <record name>
begin
  <field definitions>
end
```

Field definitions use a picture clause construction, also similar to COBOL:

```
<field name> pic <string descriptor> [usage is <usage clause>]
                                     [value is <value clause>]
...
```

The pic clause that follows the field name specifies the kind of data the field contains, and the field length. For example, pic 9(5) means the field is numeric and five characters long; pic X(15) means the field is alphanumeric and 15 characters long.

If your fields require a certain starting or constant value, use the value is clause. For example,

```
package-code pic XX value is "DZ"
``` assigns a value of DZ to the package-code field.

Though not necessary, the usage is clause allows you to indicate the form in which the computer stores a field of data. Computers normally store data in one way as text and in another way when used in arithmetic operations. These two forms are display and computational (abbreviated as comp). The display form stores one character of data in each storage position, that is, in text-readable form. The comp form applies only to numeric fields: it stores more than one digit of a number in a single storage position. If your application program uses comp form in its data files, you must specify usage is comp in your "e" program. This allows EDI/e to read and produce these files correctly.

If you omit the usage is clause, the default value is display. Storing text this way makes your files easy to understand, but it takes up more storage space than is strictly necessary. You can save space by specifying comp for your numeric fields. Whatever method you use, be sure to use the same usage is clause on the same data item, both when you read and write the item. Otherwise, your program will not work properly.

The following examples show you how to create fixed- and variable-length fields.

Example 1

This example specifies a fixed-length record. None of the fields are variable-length.

```
record A
begin
   filler   pic x(12)     value is "*header*"
   fld2     pic 9(2)      value is 12
end
```

3-4

Example 2

This example specifies a variable-length record. You indicate a variable-length field (fld2 in this example) with a pic clause of x(*). This tells the "e" interpreter to skip to the next pic clause (fld3, pic $999.99) and ignore all the characters in between. If you describe a record with a variable-length field, you must follow it with at least one fixed-length field.

```
record B
begin
   fld1      pic 9(12)      ' name
   fld2      pic x(*)       '
   fld3      pic $999.99    ' amount
end
```

A record can contain more than one variable-length field, but you must separate the fields with at least one fixed-length field. A record cannot have more than 256 fields. The maximum field width is 1024 characters.

EDI TREES AND SPECIAL FUNCTIONS

Trees are a kind of information structure important in all types of computer language processing. For example, you may be familiar with the following approach to diagramming English sentences with trees:

Figure 3-1: Tree Diagram

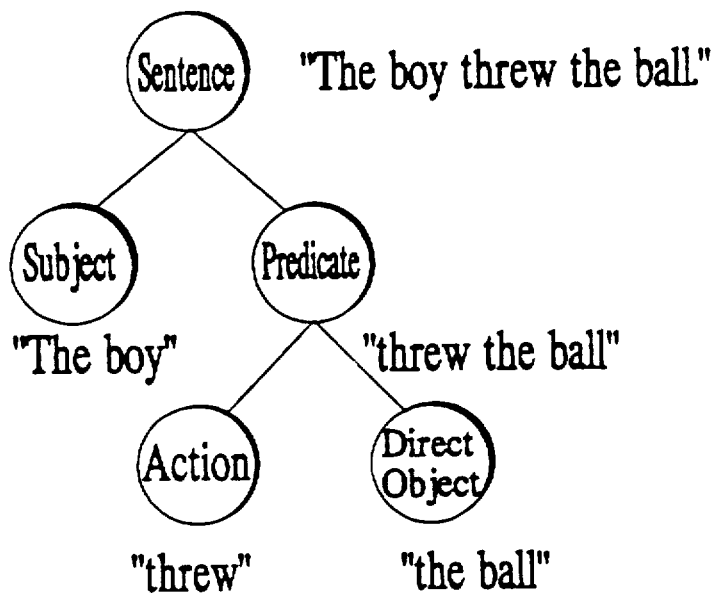

"e" LANGUAGE COMPONENTS

The developers of EDI/e observed that trees perfectly reflect the structure of EDI documents. By representing documents as trees, "e" lets you access the contents of the documents in an expressive and convenient to use form.

The circles in the above diagram are called *nodes*. The uppermost node is called the *root node* (or simply the *root*) of the tree. The nodes connected immediately below a given node are called the node's *children* or *branches*. Nodes with no children - the lowermost or outermost nodes in the tree - are called *leaf nodes* or *leaves*.

In "e", you create EDI trees using two special "e" functions, makedoc and read edi. Function makedoc creates a "bare tree" appropriate for a particular type and version of EDI document, say an 810 document. Function read edi takes a virtual file whose body is an EDI document and creates a read-only EDI tree from it. Both of these functions return a pointer to the root of the tree created. By assigning pointers, you can reference any node of the tree.

NOTE: A virtual file has two parts: a header and a body. The header is like a packing slip; the body is like the associated package. The header contains information about the document's sender, the time of transmission, and how EDI/e should process it. The body contains the actual document.

To show how EDI/e represents an EDI document, first consider figure 3-2, a typical invoice in the X12 Standards 810 transaction set format:

---

Figure 3-2: EDI Document Example

```
1    ST*810*90001
2    BIG*890317*91116*890302*1466  NL
3    PER*IC*JOHN CRAIG *TE*(415)238-7637  NL
4    PER*NT*JUDY BARRET *TE*(415)238-7633  NL
5    N1*BT*WORLD BANK  NL
6    N2*MAIL OFFICE  NL
7    N3*333 MARKET STREET  NL
8    N4*SAN FRANCISCO*CA*941053111  NL
9    N1*SE*ABC OFFICE SUPPLIES CO.  NL
10   N2*ACCOUNTS RECEIVABLE  NL
11   N3*6789 CENTER ROAD  NL
12   N3*554 MAIN STREET NL
13   N4*LOS ANGELES*CA*910667722  NL
14   IT1**60*DZ*6.25**UP*120018955  NL
15   PID*FOP3M POST-IT NOTE PAD #656  NL
16   TDS*59250  NL
17   CAD*U****UPS  NL
18   CTT*2*90  NL
19   SE*24*90001  NL
```

---

NOTE: The numbers displayed in the left column are for reference purposes only. They cor- "e" LANGUAGE COMPONENTS
respond to the numbers inside the nodes in figure 3-3.
Figure 3-3 illustrates how EDI/e represents the same document as a tree:
Figure 3-3: Document Tree Diagram
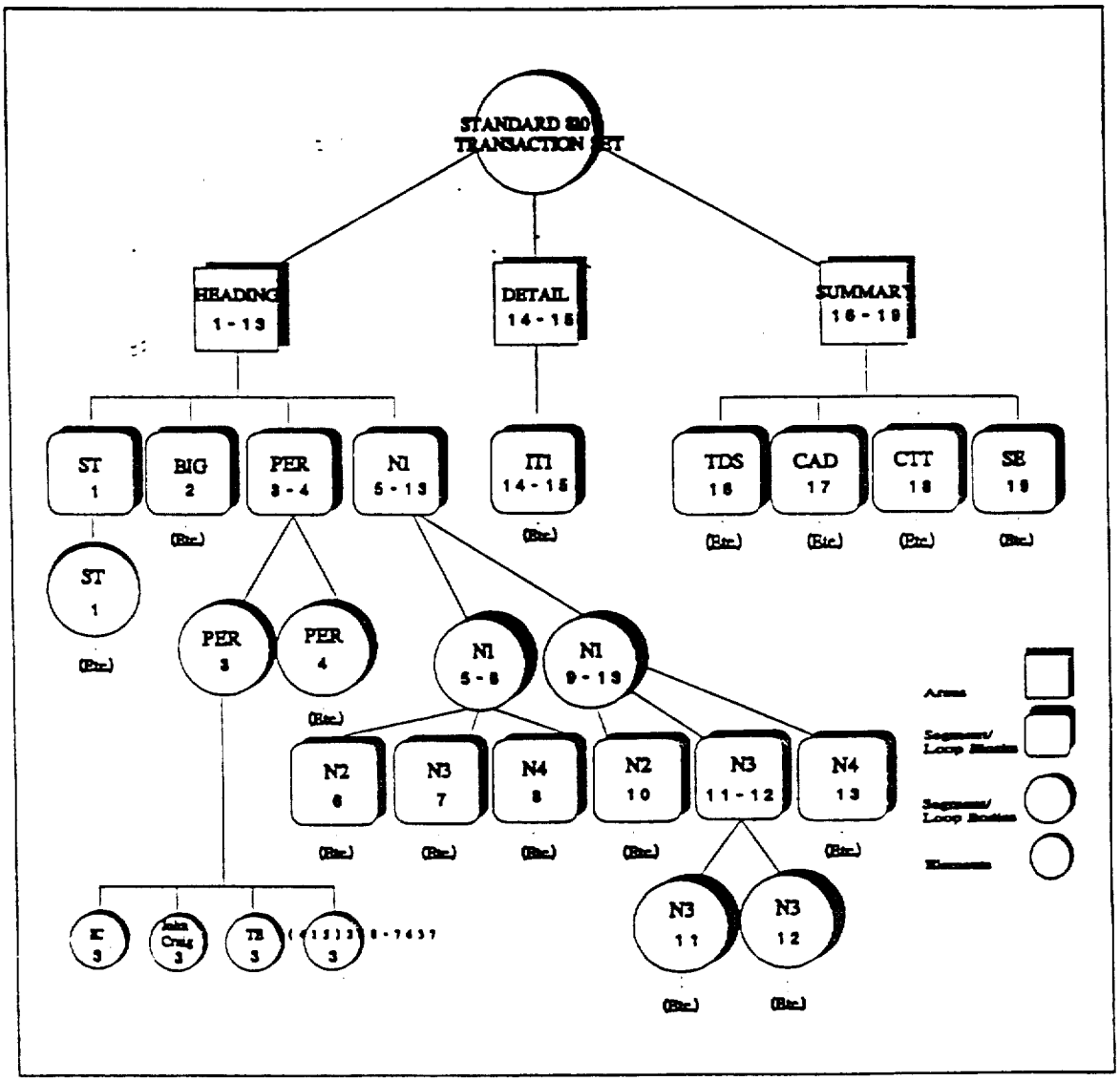
The following section explains figure 3-3 in more detail.

"e" LANGUAGE COMPONENTS

EDI Nodes

EDI/e classifies each node of a tree as one of the following:

- Area : Each area consists of a sequence of segment blocks and loop blocks whose components are segment bodies and loop bodies. You can also think of an area node as the root of an arbitrary subtree, whose subnodes are segment blocks and loop blocks. The tree in figure 3-3 illustrates three area nodes: the heading area, the detail area and the summary area.

- Segment Block: The *EDI X12 Standards* book defines most segments as repeating. For instance, the PER segment is defined with a maximum repeat count of 50. A segment block (or segblock) node represents a block of repeated segments with the same segment identifiers. Its subnodes are segment bodies, which represent the individual segments making up the segment block node. Note that it is possible for a segment block to have a single segment body subnode. This happens when a segment occurs only once. Figure 3-3 illustrates several examples of segment block nodes. The PER segment block in the heading area is an example of a segment block with two segment body subnodes. The ST segment block, also in the heading, is an example of a segment block with a single segment body subnode.

- Segment Body: A segment body (or segbody) node represents a single segment within the segment block. Its subnodes are the elements from the segment. These elements are raw data items such as numbers, symbols and strings. The PER segment block in figure 3-3 illustrates an example of a segment body and its element subnodes.

- Loop Block: A loop block node corresponds to one or more iterations of a loop. An iteration of a loop is the sequence of segment blocks for the segments marked as a loop in the *EDI X12 Standards* book. The subnodes of loop blocks are loop bodies, analogous to segment blocks and segment bodies; each loop body represents one loop iteration. Figure 3-3 illustrates an example of an N1 loop block.

- Loop Body: The loop body is one iteration of a loop; its subnodes are segment blocks. The N1 loop block illustrated in figure 3-3 contains two N1 loop bodies.

- Element: An element has the same meaning for an EDI/e tree as it does for the EDI standard: it is the smallest logical portion of a segment body. An EDI/e tree represents elements as subnodes of segment bodies. Figure 3-3 illustrates four elements which are subnodes of a PER segment body.

Referencing Nodes

Once you have constructed an EDI tree, you can reference any part of it by specifying a path. You construct a path using the following operators:

- \ (backslash) *separator operator*

- [n] (square brackets) *selector operator*, where "n" is an integer-valued expression

- -> (hyphen greater than sign) *arrow operator*.

"e" LANGUAGE COMPONENTS

NOTE: You can also use ! (exclamation point) in place of \, and ?( ?) in place of [ ].

The separator operator separates nodes in the tree, while the selector operator selects a loop body, segment body or an element in that node. You specify the loop, segment, or element you want with a value that evaluates to an integer-valued expression. The arrow operator points to an NTE segment or a subtree of an HL loop (see "NTE Segments" and "Hierarchical Levels" below for more information).

For example, the following path references the PER segment block node within the heading area of the document tree illustrated in figure 3-3:

```
tree\HEADING\PER
```

This example starts at the root node of an arbitrarily defined tree. It references the PER segment block node within the heading.

The next example references the first PER segment body node in the PER segment block by using the [ ] selector:

```
tree\HEADING\PER[1]
```

Finally, to reference the first element (that is, element IC) in the first PER segment body:

```
tree\HEADING\PER[1][1]
```

NOTES: The path reference does not contain any blank spaces. If a segment block is mandatory but occurs only once, you must still use the selector [1].

NTE Segments

The *EDI X12 Standard* designates an NTE segment as a *floating* segment. This means that it can appear anywhere within a document. It must appear after the ST segment (and the beginning segment, if applicable) and before the SE segment. In "e", blocks of floating segments are stored in a document's tree structure by attaching them to the normal (that is, non-floating) segment body that precedes them. You access an NTE segment with the -> operator. For example,

```
tree\HEADING\BSN[1]->NTE
``` finds the NTE segment block node that is attached to the first BSN segment body in the heading area. To specify the NTE segment body, you apply the [ ] operator:

```
tree\HEADING\BSN[1]->NTE[3]
```

This example references the third NTE segment in the specified path.

Finally, to reference an element in the NTE segment, the same rules apply as above. For example, to specify the second element in this NTE segment,

```
tree\HEADING\BSN[1]->NTE[3][2]
```

Loops

A loop is a recurring segment or series of segments in a standard format. An example is the N1 loop, which contains several segments of name, address, and contact information. On a purchase order, you might want to repeat this loop for each ship-to and bill-to name associated with the 3-9

"e" LANGUAGE COMPONENTS

PO. You construct a loop block with the following convention:

`<area-designator>_loop_<name>` where `<area-designator>` can be the letter H, D, or S depending on the area in which the loop occurs. H, D, and S stand for heading, detail, and summary, respectively.

Thus, to reference the N1 loop block illustrated in the heading area of figure 3-3:

`tree\HEADING\H_LOOP_N1`

To reference the second loop body within this loop block, you use the [ ] operator as above:

`tree\HEADING\H_LOOP_N1[2]`

When referencing loops, you can simplify your program by saving a loop block path to a variable and then applying selectors to this variable. The following example illustrates this point:

```
loopblock = tree\HEADING\H_LOOP_N1  ' assign node ref to variable "loopblock"
for k=1 to loopsize(loopblock)  ' for each loop in the loop block
   loopbody = loopblock[k]       ' get occurrence #k of this loop
   ' statements that refer to the loop body can be put here
next k
```

This block of code assigns the path reference `tree\HEADING\H_LOOP_N1` to a variable named `loopblock`. The first time through the `for` statement, the variable counter k is equal to 1, and the program extracts the first N1 loop (the first loop body in the loop block). (The function loopsize determines how many occurrences there are in the node reference you specify.) The program then performs some action on this loop body, adds 1 to the counter variable k, and tests for more loop bodies. This process continues for each loop body in the loop block.

You can also perform a "qualified search" of the children of a node. This means you can select from a given node a subnode that contains a data value that you specify, even if you do not know ahead of time which subnode contains this value.

For example, suppose you want to find the loop in the header of a document that applies to the party you are billing. That is, you want to find the loop whose N1[1][1] element has the value BT (for "Bill To"). The following example shows how to do this:

```
nd=tree\HEADING\H_LOOP_N1(N1[1][1]="BT")
' nd now refers to the occurrence of LOOP_N1 for which N1[1][1]
' is equal to "BT". The name of this party can be obtained by
' looking at element #2 of this same segment:
btname=nd\N1[1][2]    'name of the party being billed
```

You can also perform the qualification and selection in one statement. Thus, the above example becomes:

`btname=tree\HEADING\H_LOOP_N1(N1[1][1]="BT")\N1[1][2]`

Hierarchical Levels

The ANSI Standard documents that use hierarchical levels are 856, 869, and 870. Hierarchical levels show the relationships among different levels of detail in a shipment. They enable you to work with such items as pallets on a truck, part numbers on the pallet, cartons of a part number, etc. To specify HL levels, you use the arrow operator -> and the hl_loop and hl_subtree constructions.

For example,

```
tree\DETAIL\D_LOOP_HL[2]->HL_SUBTREE[2]\LIN[1][2]
``` references the second subtree (second HL level) of the second HL loop in the detail area. Within that subtree, specifically, it references the second element in the LIN segment. When specifying the subtree, you do not need an area designator.

You can nest hierarchical levels to any level. Refer to the *EDI X12 Standards* book for more information on hierarchical levels.

EXPRESSIONS/OPERATORS

Expressions are constructs that have a well-defined value in the context in which they appear. The simplest sorts of expressions in "e" are identifiers, string constants, function calls, array references and tree (node) references.

Operators are characters that designate mathematical or relational operations.

Arithmetic Operators

You can use the following arithmetic operators to perform arithmetic operations (addition, subtraction, etc.) in "e":

Figure 3-4: Arithmetic Operators in "e"

| Arithmetic Operation | "e" Operator | Example |
|---|---|---|
| Unary Minus | - | -A |
| Addition | + | A+B |
| Subtraction | - | A-B |
| Multiplication | * | A*B |
| Division | / | A/B |

String Operators

You can combine string-valued expressions using cat (the concatenation operator). In addition, you can get a substring of a string with the substr function. See the "Manual Pages" for more information on these functions.

Relational Operators

The operators =, <, >, <=, =>, and <> compare two values. The values must be either both numeric or both string. The comparison results in either "true" or "false." Based on this result, the program can decide what to do next.

The operator = tests for "is equal to"; < tests for the relationship "is less than"; > tests for "is greater than"; <= tests for "is less than or equal to"; => tests for "is greater than or equal to"; and <> tests for "is not equal to." All of these operators have the same precedence.

NOTE: You also use the equal sign (=) to assign a value to a variable.

When you combine arithmetic and relational operators in one expression, the "e" interpreter always performs the arithmetic first. For example, the expression

```
A + B<=(3 - Y)/C
``` is true if the value of A plus B is less than the value of 3-Y divided by C.

In string comparisons, one string is less than another if the first string comes before the other one alphabetically. Lower case letters are greater than their upper case counterparts. Numbers are less than letters.

Logical Operators

Logical operators perform logical (also called *Boolean*) operations on truth values. Logical operators return a true or false value to be used in a decision. The logical operators defined in "e" are not, and, and or. Of these three operators, not has the highest precedence, and is next, and or has the lowest precedence. A logical operator expression consists of two or more expressions separated by one of the logical operators. For example,

```
not x=2 and y=3 or z="stuff"
```

The "e" interpreter translates this as

```
not ((x=2 and y=3) or z="stuff")
```

You can use parentheses to change the order of precedence of the Boolean operators. For instance, if you write the above example as

```
not x=2 and (y=3 or z="stuff")
``` the result is true only if the expression meets two conditions:

1. y equals 3 or z equals the string "stuff", and 2. x does not equal 2.

If you are not sure how your program will interpret a complicated conditional, use parentheses to be safe.

NOTE: In compound expressions, if you want the expression on the right of the equal sign to be Boolean-valued, and the expression does not contain and or or operators, you must use parenthesis.

For example, you could not have x = y = 3

You must write this as x = (y = 3)

Precedence and Associativity

In the table below, operators within a group have equal precedence. Groups of operators higher in the chart have higher precedence. Without explicit parentheses, use left-to-right associativity. Relational operators are not associative.

Figure 3-5: Precedence and Associativity of "e" operators

| Operator | Function |
|---|---|
| - | Unary Minus |
| * | Multiply |
| / | Divide |
| + | Add |
| - | Subtract |
| cat | String Concatenator |
| < | Less Than |
| <= | Less Than or Equal |
| > | Greater Than |
| => | Greater Than or Equal |
| <> | Not Equal |
| = | Equal |
| not | Logical not |
| and | Logical and |
| or | Logical or |
| implies | (see figure 3.9) |
| iff | (see figure 3.9) |

STATEMENTS

A statement is an instruction to the computer to perform some sequence of operations. Printing a value and making a conditional assignment are examples of statements. The following kinds of statements are available in the "e" language.

3-13

"e" LANGUAGE COMPONENTS

Assignment Statement

The assignment statement has the following syntax:

`<value> = <expression>` where <value> can be an identifier, an array reference, or a node-valued expression. For more information on <expression>, refer to the "Expressions/Operators" section.

NOTE: If you assign an element value into an EDI tree that does not agree with the standard, that is, a value that is non-compliant, you receive an error.

Conditional Statements

Conditional statements use a condition to select or reject a particular course of action. The "e" language supports two types of conditional statements:

- the if statement, which makes a decision about program flow by evaluating conditions as true or false

- the select/case statement, which enables the program to choose one alternative out of a set of choices that are mutually exclusive.

IF Statement

The format of the if statement is:

`if <condition> then <statement list> [else <statement list>]`

If <condition> is true, the program executes statements following then. If <condition> is false, the program ignores statements following then and executes statements following else. If no else is present, program execution continues with the next executable statement.

SELECT Statement

The format of the select statement is:

```
select <expression> from
    case <expression1> : <statement list>
    case <expression2> : <statement list>
    ...
```

When a program executes the select/case statement, <expression> in the select clause is evaluated. This value is tested against the values of the expressions in the case clauses. When one of these tests finds a match, the program executes the corresponding statements in <statement list>. If no match is found, no action occurs and program execution returns to the next executable statement.

3-14

Iterative Statements

The "e" language supports three iteration statements: while, for and foreach. These statements result in the repeated execution of a delimited block of statements. The while statement tests an exit condition before each execution of a statement. By contrast, the for statement initializes and updates a control variable, and tests for an exit condition. The foreach statement sequentially selects all specified items in an expression, and then executes statements in a statement list.

WHILE Statement

The while statement has the following syntax:

```
while <condition>
    <statement list>
wend
```

If <condition> is true, the program executes statements in <statement list> until it finds wend. The program then returns to the while statement and checks <condition>. If it is still true, the process repeats. If false, program execution continues with the next executable statement after wend.

You can nest while/wend loops to any level, as long as you match each while with a corresponding wend.

FOR Statement

The for statement has the following syntax:

```
for <ident> = <startval> to <endval> [step <stepval>]
    <statement list>
next <ident>
```

The quantities <startval>, <endval> and <stepval> are numeric expressions.

When the program executes the for statement, it sets the value of <ident> equal to <startval> and executes each statement in <statement list> until it finds next. The program then adds the value of <stepval> to the loop variable <startval>, and checks if the value of <ident> is greater than <endval>. If it is not greater, looping continues and the program executes statements in <statement list>. If it is greater, program execution continues with the next executable statement after the next statement.

If the value of <stepval> is negative, looping continues if the value of <startval> is greater than or equal to <endval>. In either case, the final value of <ident> (the value that did not satisfy the comparison) is available after the for statement ends.

You can nest for/next loops, as long as you give each <ident> a unique name.

NOTE: You must use the same identifier after the keywords next and for.

3-15

FOREACH Statement

The syntax of the foreach statement is:

```
foreach <ident> in <expression> do
    begin
        <statement list>
    end
```

The foreach statement has particular application for tree nodes. You can use foreach to select each child of the node described by the <expression>, assign the result to the identifier <ident>, and execute all statements in <statement list> for each such assignment. You can use the foreach statement to visit all the iterations of a loop, or all the segments in a multiple-occurring segment.

You also use foreach with the deenvelope function to return an array of virtual files from one virtual file. See chapter 4, "Routing Definitions" for more information on foreach used in this way.

These are just two examples of how to use the foreach statement. You can use foreach with any "e" expression.

RETURN Statement

The syntax of the return statement is:

```
return <expression>
```

When a program executes a return statement, it stops the execution of the current function. It then transfers program control to the caller of the function at the point immediately following the call, and <expression> becomes the value of the function call.

Subroutine CALL

You call a subroutine by preceding the name of the subroutine with the keyword call. You can also just use the subroutine name. Thus, the following two statements are equivalent:

```
call subr2(x,y)
subr2(x,y)
```

You can call a subroutine without arguments in any of the following four ways:

```
call noargs()
call noargs
noargs()
noargs
```

NOTE: You can also invoke functions that do not take arguments in the same way, with or without parentheses.

"e" LANGUAGE COMPONENTS

FUNCTIONS

Functions are collections of instructions that return a single value. The syntax for a function is:

```
function <function name> [(<parameter list>)]
[local <identifier list>]
begin
    <statement list>
end
```

The identifier list following the keyword local is optional. You can only access the values of variables described in this list within the body of the function. If your program contains a global variable with the same name as a local variable, you cannot reference the global variable within the function.

You can declare local arrays by following an identifier with a parenthesized list of constants, and an optional initialization, as the following example shows:

```
local x,y,arr(5,20),arr2(50)= ""
```

The parameters passed to a function must represent simple variables; they cannot be arrays, functions, subroutines, filemaps or records. All parameters are passed to functions by value. Parameters cannot be passed by reference. This means that a function can never change the values of its arguments.

A function may refer to other functions in its statement list, if you have defined these functions prior to their point of reference. Trying to call a function that you have not yet defined causes an error.

The "e" language also contains built-in special functions, such as read edi and makedoc, that you can call anywhere in your "e" programs. See the "Manual Pages" for more information.

A function returns a value via the return statement. (See the "Statements" section for more information.)

Multi-valued Functions

The "e" language enables you to define functions that return more than one value. The syntax for a multi-valued function is:

```
multivalued function <function name> [(<parameter list>)] returns <var list>
[local <identifier list>]
begin
    <statement list>
end
```

A value is returned by a multi-valued function to <var list> following the returns statement. You set these variables equal to expressions in <statement list>. The same rules for functions apply to multi-valued functions.

To call the multi-valued function, you use the following syntax:

3-17

"e" LANGUAGE COMPONENTS

```
values of <multi-valued function name> [parameter list]
begin
   <statement list>
end
```

<statement list> may contain statements that reference any or all of the returned values from the multi-valued function, as well as any other "e" statements itself.

Subroutine Definitions

The "e" language enables you to define subroutines. The same rules for functions also apply to subroutines. The only difference between the two is that a subroutine cannot return a value, so it cannot contain a return statement. The syntax for a subroutine is:

```
subroutine <subroutine name> (<optional parameter list>)
[local <identifier list>]
begin
    <statement list>
end
```

Filemap Definitions

Filemaps are function-like objects that work with the mapfile function to pattern-match files. Filemaps allow you to map items in an application file to nodes in an EDI tree. You can then use the write edi function to create an EDI text from the tree. This gives you a way of automatically generating EDI text from an application file.

Though confusing at first, think of filemaps as roadmaps of your file formats. Just as a roadmap tells a driver what to expect to get from point A to point B, a filemap tells the mapfile function what kind of input data to expect when pattern-matching. When mapfile matches input data to a filemap record definition, it binds the fields in the record to the matched input items. Your "e" program can then access the values of these fields elsewhere.

Earlier, we defined record definitions. Their purpose becomes clear when you consider filemaps. Record definitions describe text patterns on a character-by-character basis. Filemaps refer to record definitions to describe situations in which text patterns can be repeated a variable number of times. (See "Records" on the next page.)

The syntax for a filemap is:

```
filemap <map name>
begin
   [start: <statement list>]
     <patterns>
   [stop: <statement list>]
end
```

The optional start clause executes statements in <statement list> before the filemap attempts to match any records. The optional stop clause executes statements in <statement list> after the program has matched the last described pattern as fully as possible.

<patterns> can consist of records, loops, optional clauses and other filemaps. You can use any 3-18 combination of patterns you want, nesting them to any level. No matter what pattern type you use, they always reference the current input file. The following describes each pattern type.

Records

The format for a record reference is:

```
record <record name>:
  [<statement list>]
```

`<record name>` references a record that you have defined elsewhere in the program with pic clauses. `<statement list>` is optional. If you include statements after the record reference, the program executes them only if the record matches items at the current file pointer.

Loops

The format for a loop definition is:

```
loop
  <patterns>
endloop
```

A loop statement maps `<patterns>` as many times as possible. `<patterns>` can be other loops, records, filemaps and optional clauses. The program exits the loop as soon as a match fails and executes the next item following the loop.

Optional Clauses

The format for an optional clause is:

```
optional
  <patterns>
endop
```

You can declare parts of your filemap as optional. When your program does not find a match in an optional clause, it returns to the current record and continues.

Filemaps

You can nest filemaps within one another. Refer to the syntax given above.

Filemap Rules

"e" allows you great flexibility in constructing filemaps. The only rules you need follow are:

- The first record in a loop must be distinct from the record following the loop
- The first item in an optional clause must be different from the first record following the optional clause
- The first record in a loop cannot be optional 3-19

"e" LANGUAGE COMPONENTS

Sample Filemap

The following sample illustrates the use of the filemap statement and patterns.

Figure 3-6: Sample Filemap

```
filemap invoice
begin
  loop
    record header:
            tree\HEADING\LOOP_N1[1]\PER[1][2] = contact
            tree\HEADING\LOOP_N1[1]\PER[1][1] = "AD"
    record info:
            tree\HEADING\BIG[1][4] = ponum
            tree\HEADING\BIG[1][2] = invnum
            tree\HEADING\BIG[1][1] = 060690
    record terms:
                print "cust. number:", custnum, "terms:",termper,"%",termdays
    record names:
            tree\HEADING\H_LOOP_N1[1]\N1[1][1] = "BT"
            tree\HEADING\H_LOOP_N1[2]\N1[1][1] = "ST"
            tree\HEADING\H_LOOP_N1[1]\N1[1][2] = billname
            tree\HEADING\H_LOOP_N1[2]\N1[1][2] = shipname
    record streets:
             tree\HEADING\H_LOOP_N1[2]\N3[1][1] = shipstrt
             tree\HEADING\H_LOOP_N1[1]\N3[1][1] = billstrt
    record csz:
                print "city,state,zip: ", billcsz
    loop
       record detail:
                if dozens > 0 then
                   itemun = dozens * units
                else
                   itemun = units
                   tree\DETAIL\D_LOOP_IT1[n]\IT1[1][7] = item
                   tree\DETAIL\D_LOOP_IT1[n]\IT1[1][6] = "ST"
                   tree\DETAIL\D_LOOP_IT1[n]\IT1[1][2] = itemun
                   tree\DETAIL\D_LOOP_IT1[n]\IT1[1][4] = price
                   tree\DETAIL\D_LOOP_IT1[n]\IT1[1][3] = "UN"
    endloop
    record total1: print merchtot
    record total2: print nontot
    record total3: print tottot - nontot
            tree\SUMMARY\TDS[1][1] = tottot
            tree\SUMMARY\TDS[1][2] = tottot - nontot
            tree\SUMMARY\TDS[1][3] = merchtot * termper / 100
  endloop
end
```

Defining Your Own Document, Segment and Element Sets

In addition to translation programs, EDI/e uses the "e" language to describe the document, segment and element sets that make up EDI standards such as X12. You can define your own new document, segment and element types, or modify existing definitions, using the features described in this section. The "e" language enables you to express these descriptions in a natural way that closely resembles the descriptions given in the *EDI X12* and *TDCC Standards* books.

Element Definitions:

An element definition must contain the following information:

- the element name (data dictionary reference)
- the version
- the data type of the element (numeric, alphanumeric, etc.)
- the minimum and maximum length of the element (if the minimum is equal to the maximum, you can enter a fixed length).

An element definition may contain the following information:

- a documentation clause, useful for describing the element
- a values clause, if the element can contain predefined values
- a used in clause that shows which segments use the element.

The syntax for an element definition is:

```
define element <element name> version "<version #>"
    [documentation "<description>"]
    type <type>
    length ( <min,max> | <fixed length> )
    [values "<val>", ...
     end values]
    [used in <segment>, ...]
end element <element name>
```

Some examples follow.

Example 1

```
DEFINE ELEMENT 65 VERSION "TDCC-1.5"
  DOCUMENTATION "HEIGHT"
  TYPE N2
  LENGTH 2,6
  USED IN "G39", "G55", "L4", "N5", "N7", "P04"
END ELEMENT
```

Example 2

```
DEFINE ELEMENT 66 VERSION "TDCC-1.5"
  DOCUMENTATION "IDENTIFICATION CODE QUALIFIER"
  TYPE ID
  LENGTH 1,2
  VALUES "A", "ZZ", "01", "02", "03", "04", "05", "07", "08",
         "09", "1", "10", "11", "12", "13", "14", "15", "16", "17",
         "18", "19", "2", "21", "22", "23", "24", "25", "3",
         "4", "5", "6", "7", "8", "9", "91", "92"
  END VALUES
  USED IN "C1", "C2", "D1", "D5", "E1", "F01", "F08", "F09", "F1", "F11",
          "F5", "N1", "PSA", "PWK", "Q4", "SDQ", "S1", "S8", "TD5", "U1",
          "U5"
END ELEMENT 66
```

NOTE: Separate items in double quotes with commas. The "e" interpreter will ignore all blank space between quoted items.

Segment Definitions

A segment definition must contain the following information:

- the segment identifier (name)

- the version

- a list of elements in the segment, along with their requirement designators. The requirement designator for an element can be "m" (mandatory), "o" (optional), "c" (conditional), "o(c)" (defined in the standard as optional but treated by the interpreter as conditional), or "c(o)" (defined in the standard as conditional but treated by the interpreter as optional). The (element name)/(requirement designator) pairs are separated by commas. A conditional element implies the existence of a syntax clause.

- a syntax clause which describes restrictions on the presence or absence of elements. You must include the syntax clause if the segment contains conditional elements. You do not need to include the syntax field if the segment has no conditional elements.

A segment definition may contain the following information:

- a documentation clause, useful for describing the segment

- a comments clause, useful for explaining conditions that occur in the segment. Anything you type here is not compliance checked.

- a used in field that shows which document types use the segment.

The syntax for a segment definition is:

```
define segment <segment name> version "<version #>"
    [documentation "<description>"]
    elements
        <req. designator> <element>, ...
    end elements
    [<syntax
        <condition>, ...]
    [comments
        <comment>, ...]
    [<used in "<document name>", ...]
end segment <segment name>
```

The syntax clause consists of one or more conditions, separated by commas. Conditions are necessary when the presence of a data element is dependent on the value or presence of other data elements. You indicate conditions with the following codes, patterned after the proposed ANSI X12 2.5 standard:

Figure 3-7: Syntax Clause Conditional Codes

| Code | Definition | Example | Result |
|------|------------|---------|--------|
| P | Paired | P(1,2) | If any is present, then all must be present |
| R | Required | R(1,2) | At least one must be present |
| E | Exclusion | E(1,2) | Only one may be present (or none) |
| C | Conditional | C(1,2) | If the first is present, then all must be present. Any element following the first may be used without the first being present. |
| L | List Conditional | L(1,2) | If the first is present, then at least one of the remaining elements must be used. Any element following the first may be used without the first being present. |

The following example illustrates the use of these operators:

```
syntax
    p(elt1, elt2),
    r(elt3, elt4, elt9),
    e(elt2, elt7),
    c(elt5, elt6, elt8)
```

This example says that if element 1 or 2 is present, then they both must be present; that at least one of elements 3, 4 or 9 must be present (all may be present); that if either element 2 or 7 is present, the other cannot be; and that if element 5 is present, elements 6 and 8 must also be (though if element 5 is not present, elements 6 or 8 could be).

"e" LANGUAGE COMPONENTS

Some other examples follow.

Example 1

```
DEFINE SEGMENT BFR VERSION "X12-2.2"
   DOCUMENTATION "BEGINNING SEGMENT FOR PLANNING SCHEDULE"
   ELEMENTS
       M 353,
       C 127,
       C 328,
       M 675,
       M 676,
       M 373,
       M 373,
       M 373,
       C 373,
       O 367,
       O 324
   END ELEMENTS
   SYNTAX
       R(2,3)
   COMMENTS
       C(1 = "04", 9)
   USED IN "830"
END SEGMENT BFR
```

Example 2

```
DEFINE SEGMENT G38 VERSION "X12-2.3"
   DOCUMENTATION "LINE ITEM DETAIL"
   ELEMENTS
       M 355,
       C 438,
       C 235,
       C 234,
       O(C) 235,
       C 234,
       M 356,
       M 357,
       M 355,
       O 397,
       O 448
   END ELEMENTS
   SYNTAX
      R(2,3),
      P(3,4),
      P(5,6)
END SEGMENT G38
```

Note that in example 2, the fifth element is defined as O(C). This says that the "e" interpreter will treat the element as conditional, but that the standard defines it as optional. This seeming contradiction arises from the standard defining the element as conditional or optional, without specifying why it is conditional or optional.

You can also define data element relational conditions that appear in the syntax clause with the following operators:

Figure 3-8: Syntax Clause Operators

| Operator | Example | Result |
|---|---|---|
| and | elt(1) and elt(2) | Both must be present |
| or | elt(1) or elt(2) | At least one must be present |
| not | elt(1) not elt(2) | If the first is present the other must not be present |
| implies | elt(1) implies elt(2) | If the first is present the other must be present |
| iff | elt(1) iff elt(2) | If either is present the other is required |
| = | elt(1) = "BS" | The element is equal to a string constant |
| | elt(2) = 12 | The element is equal to a numeric constant |
| | elt(3) = elt(4) | The first element is equal to the second |

The following example illustrates the use of these operators:

```
syntax
       elt(2) or elt(5) implies elt(8),
       elt(3) or elt(4) or elt(9)implies elt(3) and elt(4) and elt(9),
       elt(2) iff elt(7)
       elt(10) = "LB"
```

This example says that if element 2 or 5 is present, then element 8 must be present; that if any one of elements 3, 4 or 9 are present, then all three must be present; that if either element 2 or 7 is present, the other must be also; and that element 10 is equal to the string constant "LB".

Using these operators, the syntax and comments clauses from example 1 on the previous page would look like this:

```
SYNTAX
    2 OR 3
COMMENTS
    1 = "04" IMPLIES 9
```

Similarly, the syntax clause from example 2 would look like this:

```
SYNTAX
    2 OR 3,
    3 IFF 4,
    5 IFF 6
```

When using syntax clauses, it is recommended that you use the ANSI X12 2.3-like condition codes. You can use these codes together with the "e" logical syntax clause operators as long as you do not mix them within the same line. Some conditions may only be definable using the "e" syntax clause operators.

Document Definitions

The "e" language allows you to define your own documents. You describe the structure of an

"e" LANGUAGE COMPONENTS

EDI document by listing the areas, loops and segments in the document. A loop, in the simplest case, is an ordered sequence of segments that can occur multiple times. Loops may also occur within loops to create a tree-like structure. An area is an ordered sequence of loops and segments that can occur only once. Typically, an area represents the heading, detail or summary part of a document.

Document Definitions

You define a document using the syntax:

```
define document "<document name>" version "<version #>"
    using dictionary "<dictionary name>"
    { versions | version } "<version 1>", ...
    <area, loop and segment definitions>
end document "<document name>"
```

Area Definitions

You define areas that make up a document with the following syntax:

```
area <area name>
    <loop and segment definitions>
end area <area name>
```

Loop Definitions

You describe loops by listing the loops and segments that make up the loop. The syntax for a loop definition is:

```
<area-designator>_loop_<name> <min occurrences> <max occurrences>
  [delimited [by] <segment 1> <segment 2>]
  <segments>
end loop <name>
``` where `<area-designator>` can be the letter H, D, or S depending on the area in which the loop occurs. H, D, and S stand for heading, detail, and summary, respectively. `<name>` is loop name which typically comes from the first loop segment, that is, HL, N1, etc. You can use the optional delimited by clause to define a loop that is bound by certain segments. The TDCC Standard defines loops in this manner.

Segment References

You reference the segments that make up a document using the following syntax:

```
segment <segment name> <requirement designator> <max occurrences>
```

For example,

```
segment REF o 12
``` describes an optional segment named REF, that can occur a maximum of 12 times.

Sample X12 810 Document Definition

The sample X12 810 document definition on the next page shows how you can define a document in the "e" language.

Figure 3-9: Sample Document Definition

```
DEFINE DOCUMENT "810" VERSION "002002"
USING DICTIONARY "X12" VERSIONS
"X12-2.2","TDCC-2.6","TDCC-2.5",
"X12-2.1","TDCC-2.4","TDCC-2.3",
"TDCC-2.2","X12-2.0","TDCC-2.1",
"TDCC-1.5","X12-0.0"
    AREA HEADING
        SEGMENT ST: M 1
        SEGMENT BSN: M 1
        SEGMENT NTE: F 100
        SEGMENT DTM: O 10
    END AREA HEADING
    AREA DETAIL
        LOOP D_LOOP_HL 1 99999
            SEGMENT HL M 1
            SEGMENT LIN O 1
            SEGMENT SLN O 1
            SEGMENT PRF O 1
            SEGMENT PO4 O 1
            SEGMENT PID O 200
            SEGMENT MEA O 40
            SEGMENT PWK O 25
            SEGMENT TD1 O 20
            SEGMENT TD5 O 12
            SEGMENT TD3 O 12
            SEGMENT TD4 O 5
            SEGMENT REF O 200
            SEGMENT PER O 1
            LOOP D_LOOP_CLD 1 8
                SEGMENT CLD O 1
                SEGMENT REF O 200
            END LOOP D_LOOP_CLD
            SEGMENT MAN O 10
            SEGMENT DTM O 10
            SEGMENT FOB O 1
            LOOP D_LOOP_N1 1 200
                SEGMENT N1 O 1
                SEGMENT N2 O 2
                SEGMENT N3 O 2
                SEGMENT N4 O 1
                SEGMENT REF O 12
                SEGMENT PER O 3
                SEGMENT FOB O 1
            END LOOP D_LOOP_N1
            SEGMENT SDQ O 50
            SEGMENT ETD O 1
            SEGMENT CUR O 1
            SEGMENT ITA O 10
        END LOOP D_LOOP_HL
    END AREA DETAIL
    AREA SUMMARY
        SEGMENT CTT M1
        SEGMENT SE M 1
    END AREA SUMMARY
END DOCUMENT "856"
```

"e" LANGUAGE COMPONENTS

Notes on Composite Elements

The ANSI X12, EDIFACT and ODETTE standards allow for composite elements, that is, elements that are composed of subelements. The syntax for defining composite elements and subelements is similar to that for defining segments. The definition for a composite element begins with define composite instead of define segment. The syntax for the remainder of the composite element definition is the same as for a segment definition:

```
define composite <segment name> version "<version #>"
     [documentation "<description>"]
     elements
         <req. designator> <element>, ...
     end elements
     [<syntax
         <condition>, ...]
     [comments
         <comment>, ...]
     [<used in "<document name>", ...]
end composite <segment name>
```

STRUCTURE OF AN "e" LANGUAGE PROGRAM

An "e" program consists of a series of program statements stored in a file, with a structure resembling that found in Pascal.

An "e" program has the following structure:

```
<array declarations>
<definitions section>
begin
   <statement list>
end
```

The program begins with *array declarations*. You can use one-dimensional or multi-dimensional arrays.

The *definitions section* follows the array declarations. This is where you define functions, subroutines, records and filemaps. These definitions can appear in any order.

The *executable commands* and *statements* of your "e" program follow the definitions section. These appear between a begin and an end statement. Every program must end with an end statement.

RUN-TIME LIBRARY

This section describes the functionality provided for in the "e" run-time library and the interpreter.

Summary of Intrinsic Functions

The "e" run-time library contains built-in functions that help you with routing, file handling and

"e" LANGUAGE COMPONENTS string manipulation tasks. These special functions are grouped as follows:

ROUTING

| | | |
|---|---|---|
| dir | putdir | set_app_normal_receiver |
| deenvelope | route_app_to_translator | set_app_normal_sender |
| do_split | route_edi_to_translator | set_edi_normal_receiver |
| get_envelope | route_to_deenv | set_edi_normal_sender |
| mark_end | setattr | split |
| mark_start | | |

TRANSLATION

| | | |
|---|---|---|
| loopsize | nullelt | putrec |
| makedoc | nullseg | read edi |
| mapfile | ppeditree | write edi |

MISCELLANEOUS

| | | |
|---|---|---|
| close | inputfile | subdirs |
| concat | makevf | substr |
| getc | newstdout | system |
| getdigits | open | trim |
| getenv | putc | |

Routing functions enable you to route a data item (that is, EDI or non-EDI text) for processing through the EDI/e system. For more information on routing, see chapter 4, "Routing Definitions." You use translation functions at the time a data item enters the EDI/e translator. Various components of the EDI/e system use the miscellaneous functions.

For specific information on the syntax and description of these functions, see the "Manual Pages."

4. ROUTING DEFINITIONS

| | |
|---|---|
| ROUTING DEFINITIONS | 4-1 |
| INTRODUCTION TO THE EDI/e SYSTEM | 4-1 |
| ∎ Communications | 4-1 |
| ∎ De-enveloper | 4-2 |
| ∎ Translator | 4-2 |
| ∎ Depositor | 4-2 |
| ∎ Enveloper | 4-2 |
| ROUTING FILES | 4-3 |
| ∎ Non-EDI to EDI Routing | 4-3 |
| ∎ Routing Overview | 4-3 |
| ∎ Scheduler Table | 4-4 |
| ∎ "e" Communications Script: non-EDI | 4-4 |
| ∎ De-enveloper Table: non-EDI | 4-5 |
| ∎ "e" De-enveloping Script: non-EDI | 4-6 |
| ∎ Application Profile Table | 4-7 |
| ∎ Application Routing Table | 4-8 |
| ∎ Application Script Selection Table | 4-9 |
| ∎ EDI to Non-EDI Routing | 4-10 |
| ∎ "e" Communications Script: EDI | 4-10 |
| ∎ Alias Tables | 4-10 |
| ∎ De-enveloping Table: EDI | 4-11 |
| ∎ "e" De-enveloping Script: EDI | 4-12 |
| ∎ EDI Routing Table | 4-12 |
| ∎ EDI Script Table | 4-14 |

ROUTING DEFINITIONS

This chapter describes the "e" programs you need to write and the tables you need to create to process data through the EDI/e system. To do so, you must first have an understanding of the system itself.

INTRODUCTION TO THE EDI/e SYSTEM

The following components make up the EDI/e system:

- communications (composed of a scheduler and communications clients)
- de-enveloper
- translator
- depositor
- enveloper The way in which EDI/e works with data is called *routing*. A data item enters the EDI/e system through the communications component and is passed on, or routed, to the other components for processing. You control each component via programs (also called *scripts*) that you write in the "e" language.

The EDI/e system treats a data item very much like a package with a packing slip. As the data item moves through the system, each component reads from and writes information to the packing slip. This information determines how the system processes the "package."

In EDI/e, the term *routing form* represents the packing slip. EDI/e assigns a routing form to each data item when it enters the system. Based on the routing slip information, a component knows what action to take. For instance, when a data item arrives at the de-enveloper, the de-enveloper knows how to de-envelope the item based on information filled in on the routing slip by the communications component.

The following sections describe each component of the EDI/e system.

Communications

The communications component has two parts: a *scheduler* and a set of *communications clients*. The scheduler is a program that references a user-created table to determine when to start up a communications client. The communications client is the program that handles the actual communications between EDI/e and your trading partners. A communications client can both send and receive files. Communications clients include UNIX mail, RJE, UUCP, ASYNC, BISYNC, and file (for example, the UNIX file system). You control how the communications client sends and receives files through "e" language functions.

After receiving a file, a communications client deposits it in a file directory of your choice. An "e" communications script that you write removes any envelopes that have been added to the file during the communications transfer. Working with a UUCP file, for instance, the script removes the mail header. For an EDI file, the script removes the interchange envelope. What remains is an EDI document, an application file, or a text file such as a network report.

ROUTING DEFINITIONS

The communications component next attaches a routing form to the file, and enters the file type (either EDI, application, or text) on the form. Having completed its job for the moment, the communications component routes the file to the de-enveloper.

A communications client can both receive and send files during a communications session. To send files, the communications client asks the enveloper component to check the node that the communications client is servicing. The enveloper first finds all files that fit the node specification. It then wraps them in envelopes and sends the interchange(s) back to the communications client. The communications client wraps node-specific envelopes around the interchange and sends out the session data.

De-enveloper

The *de-enveloper* component breaks a document interchange, either EDI or non-EDI, into separate documents. The de-enveloper also finds out the document sender and receiver, and the document transaction type.

For an EDI interchange, the de-enveloper:

- reads and removes the enveloping segments
- breaks the interchange into one or more files
- sets most of the routing form fields.

For a non-EDI interchange, the de-enveloper:

- breaks the interchange into one or more files
- reads the contents of each file to determine routing information
- sets most of the routing form fields.

Translator

The *translator* component reads and transforms the text of a data item/message. It does not enter any new information on the routing slip. When the translator finishes its job, it passes the transformed text, and the unaltered routing form, to the depositor.

Depositor

The sole responsibility of the *depositor* is to move a file to a depository. A depository is a directory you set up on your computer. When the communications client requests an outgoing session, the enveloper looks for it in this directory.

Enveloper

The *enveloper* component begins its work when it receives a request from a communications

ROUTING DEFINITIONS client. It first checks to see if it has any files for that client. If so, it wraps the files in envelopes that are appropriate to the functional group, standard and version. It then routes the resulting files to the communications client for transmission.

ROUTING FILES

The EDI/e system views incoming files as either non-EDI or EDI. Thus, the two types of routing are:

- non-EDI document to EDI document

- EDI document to non-EDI document.

Routing Overview

The EDI/e scheduler looks in the scheduler table for a time to start a communications client and for an "e" communications script to run. The "e" communications script tells the communications client to look for a session from the node you specify. When the client receives data, it fills in the necessary attributes on the routing form and sends the session to the de-enveloper.

As necessary, the "e" de-enveloper program sets some of the attributes on each document in the file interchange. Next, it references a series of tables to fill in such items on the routing slip as the "e" translation script. Once this is done, the information on each of the separated documents is complete. The documents flow to the translator, which translates and routes them to the depositor. The depositor deposits the documents in a directory specified by the routing slip.

When called to do so, the communications module starts up again, and the communication client asks the enveloper for a session. The enveloper picks up the files from the depository, wraps them in envelopes, and sends the session to the communications client for transmission.

Non-EDI to EDI Routing

You need to create the following "e" scripts and tables to route a non-EDI data item through EDI/e and produce an EDI data item:

- scheduler table

- "e" language communications script

- "e" language de-enveloper script

- de-enveloper table

- application profile table

- application/EDI routing table

- application/EDI script table

- "e" language translation script 4-3

Scheduler Table

The scheduler table that you create contains the following information:

- node: tells the scheduler where to look for files

- facility: tells the scheduler what type of communications client to use

- time: tells the scheduler when to start the communications client and what "e" communications script to run.

A scheduler table resembles the following:

---

Figure 4-1: Sample Scheduler Table

```
;sched.tab
node: "home"
facility: "filesys"
time: "every 1 min sync run mfgcomm.e"
```

---

The key to this table is (node, facility). Using this table, the scheduler program knows the communications client (facility) to start and the time at which to start it. This table also tells the communications client what "e" communications script to use.

In this example, the time attribute starts the client every minute and specifies "mfgcomm.e" as the "e" communications script. (A sample "e" communications script appears below.) When the scheduler program starts up a communications client, it passes the node and facility values to the communications client.

"e" Communications Script: non-EDI

To move files in and out of the EDI/e system, you need to write an "e" communications script. This script identifies incoming data items then routes them to the de-enveloper component. It also stores and envelopes outbound data items in a user-specified directory until the communications client transmits them.

The "e" language provides you with built-in functions for programming the EDI/e communications component. A sample "e" communications script for a non-EDI file looks like this:

ROUTING DEFINITIONS

Figure 4-2: Sample "e" Communications Script, non-EDI

```
begin
    'check for incoming non-edi message for the mfg application
    vflist = dir ("mfg")
    foreach vf in vflist do begin
        setattr (vf, "Content-Type" "nonedi")
        setattr (vf, "Application-Id" "mfg")
        print "comm: routing to deenv\n")
        route_to_deenv(vf)
    end
     'now check for items to send out.  first check for the GEISCO node
    session = get_envelope("geisco")
    if session then begin
        putdir(session, "out", "geisco")
    end
     'now check for items for FORD node
     session = get_envelope("ford")
    if session then begin
        putdir(session, "out", "ford")
    end
end
```

In this example, the dir function looks in the "mfg" directory for files, changes the files into virtual files, and returns them as a list of virtual file objects. (As defined in chapter 3, a virtual file has a header and a body. The header contains information about where the document came from and how EDI/e should process it. The body contains the actual document.) Next, the foreach/end loop says for each of the virtual files in the virtual file list do the following:

- Set the Content-Type attribute with the setattr function. The possible values are "EDI," "NONEDI," and "TEXT." The communications script must set this attribute for a non-EDI to EDI translation. In this example, Content-Type is "non-edi."

- Set the Application-Id attribute with the setattr function. This indicates where the file came from. The communications script must set the Application-Id attribute for a non-EDI to EDI translation. In this example, Application-Id is "mfg."

- Route the virtual file to the de-enveloper with the route_to_deenv function. You must call this function to continue the routing process.

Content-Type and Application-ID, along with the node and facility information passed to the communications client by the scheduler, determine the de-enveloping script.

De-enveloper Table: non-EDI

De-enveloping is the process of stripping enveloping information from an interchange and dividing it into a set of documents. The de-enveloping script that is indicated in the de-enveloper table

ROUTING DEFINITIONS drives this process. The de-enveloper reads the routing slip and references the de-enveloper table. Based on the key information, it knows what de-enveloping script to run.

The de-enveloper table you create contains the following information:

- node: tells the de-enveloper what node to use
- facility: tells the de-enveloper the communications client to use
- content type: tells the de-enveloper the file type
- application ID: tells the de-enveloper the application where the file originated
- "e" de-enveloping script: tells the de-enveloper what "e" script to call for de-enveloping.

A de-enveloping table resembles the following:

Figure 4-3: Sample De-enveloping Table, non-EDI

```
;deenv.tab
node: "home"
facility: "filesys"
contentType: "mfg"
appId: "mfg"
deenv_script: "mfgdeenv.e"
```

The key to the de-enveloping table is (node, facility, contentType, appId). Knowing this information enables the de-enveloper to select the correct "e" de-enveloping script. The communications program and the setattr functions have already set the key information.

NOTE: The communications client looks up the de-enveloper table before the virtual file arrives at the de-enveloper.

"e" De-enveloping Script: non-EDI

To de-envelope documents, you must write an "e" de-enveloping script. A de-enveloping script looks like the following:

ROUTING DEFINITIONS

Figure 4-4: Sample "e" De-enveloping Script, non-EDI

```
filemap invoice
begin
  loop
    (pattern-matching information goes here)
            mark_end()
            doc = doc_split()
            set_app_normal_receiver(vf,custnum)
            mark_start
  endloop
end
(record information goes here)
' what follows is the main program
begin
  mark_start()
  doclist = split(stdin,invoice)
  foreach doc in doclist do begin
    print "deenv: routing to translator"
    route_app_to_translator(vf)
  end
end
```

The "e" de-enveloping script uses a filemap construction to pattern-match and separate the file interchange into individual documents. Note that this filemap is the same one used in your "e" translation script.

The main body of this program marks the start of a single document. The split function takes the file interchange and, based on the filemap specified (invoice in the example), does pattern-matching. When the pattern-matching finishes on this individual document, the mark_end function marks the end of the file. The doc_split function splits off the document from the others and returns a virtual file to the variable "doc." The beginning of the next file is set with mark_start and the program executes the filemap loop again. When the last document has been split, the foreach/end loop in the main body of the program routes the application files to the translator.

Application Profile Table

The de-enveloping script also sets the *normalized* name of the sender and the receiver for the interchange. That is, if the non-EDI file is using a sender or receiver ID that does not exactly correspond to IDs of the receiving system, they can be set by an "e" function. For example, you may refer to your company by your company name, but a trading partner refers to you with a numeric ID.

You set the normalized/receiver with the set_app_normal_sender and set_app_normal_receiver calls. If you do not make these calls, the system uses the default normal sender and normal receiver value for APP_ID. The application profile table (app_prof.tab) stores this information (application ID, normal sender, and normal receiver). An application profile table looks like this:

4-7

ROUTING DEFINITIONS

Figure 4-5: Sample Application Profile Table

```
;app.prof tab
AppId: "mfg"
NormSend: "mfg"
NormRec: "ge"
```

Based on the key(AppId), the system knows the normal sender and receiver for the document.

Looking again at figure 4-4, the last action performed by the de-enveloping script is the route_app_to_translator call. This call fills in the routing slip and routes the virtual file to the translator. The two tables used in filling out the routing slip are the application routing table and the application script table.

Application Routing Table

The application routing table contains the following information:

- application ID: the application where the file originated
- normal sender: normalized sender of the file
- normal receiver: normalized receiver of the file
- outbound interchange sender: the sender value for the outgoing interchange
- outbound interchange receiver: the receiver value for the outgoing interchange
- outbound interchange type: the type of the outgoing interchange, e.g. ISA
- outbound group sender: the sender value for the outgoing functional group
- outbound group receiver: the receiver value for the outgoing functional group
- outbound group type: functional group type for outgoing group
- destination node: node you want this to end up at
- destination facility: communications facility (client) on the receiving end.

The key to this table is (AppId, NormSend, NormRec). This table contains information that tells the depositor where to deposit the document, and the communications client how/where to send the file.

Figure 6:
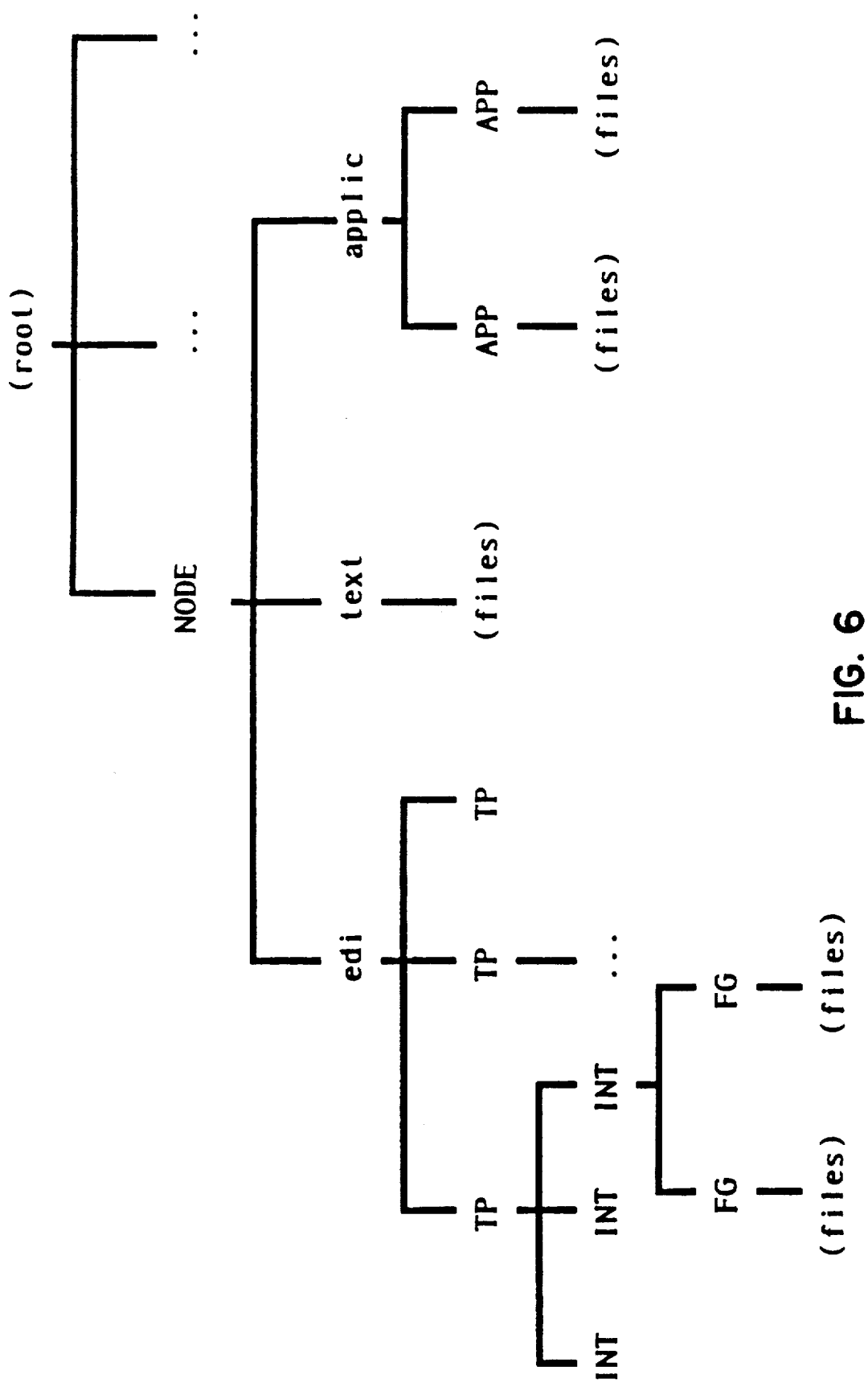
FIG. 6 is a graphic representation of the organizational structure in which files are stored before enveloping.

An application routing table looks like this:

Figure 4-6: Sample Application Routing Table

```
;app.rte.tab
AppId: "mfg"
NormSend: "mfg"
NormRec: "ge"
OutInterSend: "1234"
OutInterRec: "4321"
OutInterType: "ISA"
OutGroupSend: "1234"
OutGroupRec: "4321"
OutGroupType: "IN"
DestNode: "ford"
DestFacility: "filesys"
```

Application Script Selection Table

The application script selection table determines that translation program to run. It contains the following information:

- application ID
- normal sender
- normal receiver
- run program

An application script selection table looks like this:

Figure 4-7: Sample Application Script Selection Table

```
AppId: "mfg"
NormSend: "mfg"
NormRec: "ge"
RunScript: "trans.e"
```

The key to this table is again (AppId, NormSend, NormRec). After the system has entered this information into the virtual file header, it sends the virtual file to the translator. Usually, the translator does not alter the routing form. When done with translation, the translator sends the file to the depositor. The translated file is now ready for transmission.

4-9

ROUTING DEFINITIONS

EDI To Non-EDI Routing

The following section describes the necessary scripts and tables for EDI to non-EDI routing. These scripts and tables are similar to those for non-EDI routing.

An EDI document comes into the system wrapped in an interchange envelope. The interchange envelope contains information that helps route the documents in the interchange. In addition, the interchange envelope has information about communications clients, de-enveloping, translation, and depositing.

"e" Communications Script: EDI

The "e" communications script that you write for EDI to Non-EDI translation resembles the following:

Figure 4-8: Sample "e" Communications Script, EDI

```
begin
    'check for incoming edi messages
    vflist = dir ("edi")
    foreach vf in vflist do begin
      setattr (vf,"Content-Type:","edi")
      setattr (vf,"Application-Id:","edi")
      print "comm: routing to deenv\n"
      route_to_deenv(vf)
    end
end
```

This "e" communications script for this routing differs from the communications script for non-EDI routing in that the Content-Type and Application-Id attributes contain the value "edi." This is a predefined value identifying the document as an EDI document.

Alias Tables

Alias tables translate the sender and receiver information encoded in the envelopes into the normalized sender and receiver. Alias tables contain the following information:

- alias: defines the alias name

- normal: defines the normal name

Alias tables look like this:

4-10

ROUTING DEFINITIONS

Figure 4-9: Sample Alias Tables

```
;is_alias.tab
alias: "123456789"
normal: "ge"

;ir_alias.tab
alias: "789456123"
normal: "premenos"

;gs_alias.tab
alias: "123456789"
normal: "ge"

;gr_alias.tab
alias: "789456123"
normal: "premenos"
```

The key to this table is (alias). Its value comes from respectively the ISA06 (your Network ID) and ISA08 (your trading partner's Network ID) elements of the ISA segment, and the GS02 (your Network ID) and GS03 (your trading partner's Network ID) elements of the GS segment.

De-enveloping Table: EDI

The de-enveloping table for EDI routing is similar to the de-enveloping table for non-EDI routing. The de-enveloping table contains the following information:

- node: tells the de-enveloper what node to use

- facility: tells the de-enveloper what type of communications client to use

- content type: tells the de-enveloper the file type (EDI)

- application ID: tells the de-enveloper the application ID (EDI)

- "e" de-enveloping script: tells the de-enveloper the "e" de-enveloping script to run.

A de-enveloping table looks like this:

4-11

ROUTING DEFINITIONS

Figure 4-10: Sample De-enveloping Table, EDI

```
;deenv.tab
node: "home"
facility: "filesys"
contentType: "edi"
appId: "edi"
deenv_script: "edideenv.e"
```

The key to this table (node, facility, contentType, appID). Based on this information, the de-enveloper knows what de-enveloping script to use.

"e" De-enveloping Script: EDI

An "e" de-enveloping script for EDI routing looks like this:

Figure 4-11: Sample "e" De-enveloping Script, EDI

```
begin
    vflist = deenvelope(stdin,"X12")
    foreach vf in vflist do begin
        set_edi_normal_sender(stdin,"mfg")
        set_edi_normal_receiver(stdin,"ge")
        print "deenv: routing to translator\n"
        route_edi_to_translator(vf)
    end
```

The information in either the ISA or GS elements sets the normalized sender/receiver information. To use the ISA information, the second argument of the set_edi_normal_sender/receiver function should be "interchange." To specify use of the GS information, the second argument should be "fg." The system uses alias tables to translate the encoded information to the normalized information.

The de-enveloper also performs the routing and "e" translation script selection. The relevant tables are the EDI routing table and the EDI script table.

EDI Routing Table

The EDI routing table contains the following information:

ROUTING DEFINITIONS

- document type: the document set identifier for the document, for example, 810
- standard version: the standard version of the interchange, taken from the ISA segment
- normal sender: the normalized sender of the document
- normal receiver: the normalized receiver of the document
- application ID: the name of the application to which the translated document is routed
- application sender alias: the name known to the application of the original sender of the document
- application receiver alias: the name known to the application of the final destination of the document
- destination node: the node through which to send the document to its destination
- destination facility: the facility used together with destination node.

All of these fields are used by the depositor and by the communications client at the other end.

An EDI routing table looks like this:

---

Figure 4-12: Sample EDI Routing Table

```
;edi_rte.tab
DocType: "810"
StdVer: "00200"
NorSend: "ge"
NorRec: "premenos"
AppId: "accounting"
AppSendAlias: "ge1"
AppRecAlias: "us"
DestNode: "home"
DestFacility: "filesys"
```

---

The key to this table is (DocType, StdVer, NorSend, NorRec). NorSend and NorRec are the normal sender and receiver. DocType is the document set identifier for the document. The de-enveloper enters this information into the virtual file header of an de-enveloped document. It comes from the ST segment of the envelope. StdVer is the standard version of the interchange, and it comes from the ISA segment. Thus you can see that a set of documents with the same document set identifier, normal sender and normal receiver can have different "e" scripts if the standards versions are different.

EDI Script Table

The last table is the EDI script table, which contains the following information:

- document type: the document set identifier for the document, for example, 810
- standard version: the standard version of the interchange, taken from the ISA segment
- normal sender: the normalized sender of the document
- normal receiver: he normalized receiver of the document
- run script: "e" translation script An EDI script table looks like this:

---

Figure 4-12: Sample EDI Script Table

```
DocType: "810"
StdVer: "00200"
NorSend: "ge"
NorRec: "premenos"
RunScript: "transl.e"
```

---

This table is similar to the application script selection table for non-EDI routing. The key is (DocType, StdVer, NorSend, NorRec). This information determines the "e" translation script.

After translation, routing continues as outlined above for non-EDI documents. The system deposits the documents in a directory where they wait for transmission by the communications client. Usually, their outbound destination is an application system.

MANUAL PAGES
area

NAME area - defines an area

SYNOPSIS

```
area <area name>
    <loop and segment definitions>
end area <area name>
```

DESCRIPTION

The area/end area statements define an area in an EDI document.

EXAMPLE

```
area summary
    segment ctt m 1
    segment se m 1
end area summary
```

NOTES

The area statement is used only within document definitions. (See the section called "Defining Your Own Document, Segment and Element Sets" in chapter 3.)

SEE ALSO define document, loop, segment

NAME the assignment statement assigns the value of an expression to a variable

SYNOPSIS

```
<variable> = <expression>
```

DESCRIPTION

<variable> can be an identifier, array reference, node reference, or constant.
<expression> can be any "e" expression as described in chapter 3.

EXAMPLES

1.

```
invdate = "08/12/90"
```

This example assigns the string literal "08/12/90" to the variable "invdate."

2.

```
bs = tree\heading\BIG[1]
```

This example assigns a node reference to the variable "bs."

NAME begin - mark the beginning of a block of statements

SYNOPSIS begin

DESCRIPTION

The begin statement marks the beginning of a block of statements. It is used in conjunction with the if and foreach statements, in functions or subroutines, and in filemaps or record definitions.

SEE ALSO end, if.

call                                            call

NAME call - call a subroutine

SYNOPSIS

```
call <subroutine> (<argument list>)
```

DESCRIPTION

You can call a subroutine with the reserved word call, or with just the subroutine name.

The following statements are equivalent:

```
call sbr(a,b,c)
sbr(a,b,c)
```

If a subroutine has no arguments, you can call it in any of the following ways:

```
call noargs()
call noargs
noargs()
noargs
```

EXAMPLE

```
call sub(x+2, z/3, "08/06/60")
```

NOTES

Arguments in <argument list> are expressions separated by commas.

SEE ALSO function, return, subroutine.

NAME cat - combine two string-valued expressions

SYNOPSIS

```
<string 1> cat <string 2>
```

DESCRIPTION cat is a string concatenator operator that returns a string result.

EXAMPLES

1.

```
"x = " cat 3 + 4
```

This example yields the string "x = 7".

2.

```
3 cat 4
```

This example yields the string "3 4".

SEE ALSO substr.

NAME close - close a stream

SYNOPSIS close (<stream>)

DESCRIPTION

This function closes a stream. <stream> is the stream object to be closed.

SEE ALSO open.

NAME datetime - return the system date and time

SYNOPSIS datetime()

DESCRIPTION

This is a multi-valued function that returns the system date and time, in a variety of formats. It takes no parameters. The return values are:

```
YEAR       1900-19XX
MONTH      1-12        January = 1
DOW        1-7,        Sunday = 1
DOM        1-31,       First day of the month = 1
DOY        1-366,      January 1 = 1
HOUR12     0-11        Midnight = 0
HOUR24     0-23        Midnight = 0
MINUTES    0-59,       Minutes past the hour
SECONDS    0-59,       Seconds past the minute
AMPM       "AM" or "PM"
```

All return values are integer, except ampm, which is character.

EXAMPLE

You might call this function as follows:

```
begin
  values of datetime()
    begin
      print "YEAR = ", year
      print "MONTH = ", month
      print "MINUTES = ", minutes
      print "SECONDS =", seconds
    end
end
```

SEE ALSO multivalued function.

NAME deenvelope - separate an interchange into a group of documents

SYNOPSIS deenvelope (<stream>,"<standard>")

DESCRIPTION

This function interprets a given stream as one or more interchanges. It breaks apart the interchange(s) into documents, separates them by ST and SE segments and returns an array of virtual files which represent the individual documents. The ST and SE segments are *not* part of the individual document. The various element information contained in the ISA, GS and ST segments is stored in the produced document as attributes of the virtual file.

<stream> is the stream to be read. <standard> is an EDI standard (X12, EDIFACT, etc.) supported.

EXAMPLE

```
begin
  vflist = deenvelope(stdin,"X12")
  foreach vf in vlist do begin
    route_app_to_translator(vf)
  end
end
```

In this example, deenvelope expects input from stdin in the form of an X12 Standard. Each document in the interchange is separated, then routed to the EDI/e translator by the route_app_to_translator function.

NOTES

You use this function in your de-enveloping script for EDI files.

SEE ALSO chapter 4, route_app_to_translator.

define composite

NAME define composite - define a composite segment

SYNOPSIS

```
define composite <segment name> version "<version #>
    [documentation "<description>"]
    elements
        <req. designator> <element>, ...
    end elements
    [syntax
        <condition>, ...]
    [comments
        <comment>, ...]
    [used in "<document name>", ...]
end segment <segment name>
```

DEFINITION

The define composite statement enables you to define the segment name, version, and a list of elements in the composite segment along with their requirement designators; and, optionally, to describe the element, place restrictions on the presence or absence of elements, and show which segments use the element.

<segment name> is the composite segment you are defining. <version #> is the version of the standard.

The optional documentation clause enables you to describe the element by entering a string value in "<description>". You can enter more than one description string as long as you separate them with commas.

The elements/ end elements statements enclose the elements that can appear in the composite segment. <requirement designator> can be "m" (mandatory), "o" (optional), "c" (conditional), "o(c)" (defined in the standard as optional but treated by the compiler as conditional), or "c(o)" (defined in the standard as conditional but treated by the compiler as optional). <element> is the element identifier. Requirement designator/element pairs are separated by commas. A conditional element implies the existence of a syntax clause.

The syntax clause consists of one or more conditions, separated by commas. Conditions are necessary when the presence of a data element is dependent on the value or presence of other data elements. Weight and its unit of measure is an example of a condition that determines the presence of other data elements.

define composite                              define composite

You indicate conditions with the following codes, patterned after the proposed ANSI X12 2.5 standard:

| Code | Definition | Example | Result |
|---|---|---|---|
| P | Paired | P(1,2) | If any is present, then all must be present |
| R | Required | R(1,2) | At least one must be present |
| E | Exclusion | E(1,2) | Only one may be present (or none) |
| C | Conditional | C(1,2) | If the first is present, then all must be present. Any element following the first may be used without the first being present. |
| L | List Conditional | L(1,2) | If the first is present, then at least one of the remaining elements must be used. Any element following the first may be used without the first being present. |

The following example illustrates the use of these operators:

```
syntax
        p(elt1, elt2),
        r(elt3, elt4, elt9),
        e(elt2, elt7),
        c(elt5, elt6, elt8)
```

This example says that if element 1 or 2 is present, then they both must be present; that at least one of elements 3, 4 or 9 must be present (all may be present); that if either element 2 or 7 is present, the other cannot be; and that if element 5 is present, elements 6 and 8 must also be (though if element 5 is not present, elements 6 or 8 could be).

You can also define data element relational conditions that appear in the syntax clause with the following operators:

| Operator | Example | Result |
|---|---|---|
| and | elt(1) and elt(2) | Both must be present |
| or | elt(1) or elt(2) | At least one must be present |
| not | elt(1) not elt(2) | If the first is present the other must not be present |
| implies | elt(1) implies elt(2) | If the first is present the other must be present |
| iff | elt(1) iff elt(2) | If either is present the other is required |
| = | elt(1) = "BS" | The element is equal to a string constant |
|   | elt(2) = 12 | The element is equal to a numeric constant |
|   | elt(3) = elt(4) | The first element is equal to the second | define composite

The following example illustrates the use of these operators:

```
syntax
        elt(2) or elt(5) implies elt(8),
        elt(3) or elt(4) or elt(9) implies elt(3) and elt(4) and elt(9),
        elt(2) iff elt(7)
        elt(10) = "LB"
```

The expression elt (n) indicates the condition for element n for the segment being defined. This example says that if element 2 or 5 is present, then element 8 must be present; that if any one of elements 3, 4 or 9 are present, then all three must be present; that if either element 2 or 7 is present, the other must be also; and that element 10 is equal to the string constant "LB".

SEE ALSO define segment.

NAME define document - define an EDI document

SYNOPSIS

```
define document "<document name>" "<version #>"
  using dictionary "<dictionary name>"
  ( versions | version ) "<dict. version>", ...
     <area, loop and segment definitions>
end document "<document name>"
```

DESCRIPTION

You describe the structure of an EDI document type by listing its areas, loops and segments in the define/end document statements.

<document name> is the document you are defining. <version #> is the version of the standard.

The using dictionary clause identifies the standard itself, where <dictionary name> is X12, EDIFACT, etc. The versions clause enables you to use compliance checking for versions beside <version #>. If you only have one version, you can use version instead of versions. "<dict. version>" is the additional version to be checked. You may include as many of these as are necessary as long as you separate them with commas.

EXAMPLE

See figure 3-9 in chapter 3.

NOTES

EDI/e uses the descriptions supplied by define document statements to represent document structures as tree structures. You can then access the contents of the tree structures as described in chapter 3.

Though you use the define document statement to define a document, the actual segment and element definitions are maintained separately.

SEE ALSO area, chapter 3, loop, segment.

define element

NAME define element - define an element

SYNOPSIS

```
define element <element name> version "<version #>"
   [documentation "<description>"]
   type <type>
   length { <min,max> | <fixed length> }
   [values "<val>", ...
    end values]
   [used in <segment>, ...]
end element <element name>
```

DESCRIPTION

The define element statement allows you to define the element name, version, type (numeric, alphanumeric, etc.), and the minimum and maximum length; and optionally, to describe the element, enter a list of predefined values and list the segments where the element appears.

<element name> is the element you are defining. <version #> is the version of the standard.

The optional documentation clause enables you to describe the element by entering a string value in "<description>".

<type> is the data type of the element, as defined by the standard.

<min,max> is a pair of numbers separated by a comma that defines the element minimum and maximum length. If the element length is fixed, you can enter a single value.

If the element can contain predefined values, you can use the optional values clause. If you list more than one value, separate them with commas.

If you want to identify the segments in which the element occurs, you can use the optional used in clause. If you list more than one segment, separate them with commas.

EXAMPLES

1.

```
define element 67 version "tdcc-1.5"
   documentation "identification code"
   type an
   length 2,17
   used in "c1", "c2", "d1", "d5", "e1", "f01", "f06", "f08", "f09",
           "f1", "f11", "f5", "n1", "psa", "pwk", "q4", "sdq", "s1",
           "s8", "td5", "u1", "u5"
end element
``` define element

2.

```
define element 90 version "X.12-2.2"
  documentation "measurement unit qualifier"
  type id
  length 1
  values "c", "n"
  used in "14"
end element 90
```

NOTES

Separate items in double quotes with commas. The "e" interpreter ignores all other blank space between quoted items.

SEE ALSO define segment.

NAME define segment - define a segment

SYNOPSIS

```
define segment <segment name> version "<version #>
    [documentation "<description>"]
    elements
        <req.'designator> <element>, ...
    end elements
    [syntax
        <condition>, ...]
    [comments
        <comment>, ...]
    [used in "<document name>", ...]
end segment <segment name>
```

DEFINITION

The define segment statement enables you to define the segment name, version, and a list of elements in the segment along with their requirement designators; and, optionally, to describe the element, place restrictions on the presence or absence of elements, and show what segments use the element.

<segment name> is the segment you are defining. <version #> is the version of the standard.

The optional documentation clause enables you to describe the element by entering a string value in "<description>". You can enter more than one description string as long as you separate them with commas.

The elements/ end elements statements enclose the elements that can appear in the segment. <requirement designator> can be "m" (mandatory), "o" (optional), "c" (conditional), "o(c)" (defined in the standard as optional but treated by the compiler as conditional), or "c(o)" (defined in the standard as conditional but treated by the compiler as optional). <element> is the element identifier. Requirement designator/element pairs are separated by commas. A conditional element implies the existence of a syntax clause.

The syntax clause consists of one or more conditions, separated by commas. Conditions are necessary when the presence of a data element is dependent on the value or presence of other data elements. Weight and its unit of measure is an example of a condition that determines the presence of other data elements.

You indicate conditions with the following codes, patterned after the proposed ANSI X12 2.5 standard:

| Code | Definition | Example | Result |
|---|---|---|---|
| P | Paired | P(1,2) | If any is present, then all must be present |
| R | Required | R(1,2) | At least one must be present |
| E | Exclusion | E(1,2) | Only one may be present (or none) |
| C | Conditional | C(1,2) | If the first is present, then all must be present. Any element following the first may be used without the first being present. |
| L | List Conditional | L(1,2) | If the first is present, then at least one of the remaining elements must be used. Any element following the first may be used without the first being present. |

The following example illustrates the use of these operators:

```
syntax
        p(elt1, elt2),
        r(elt3, elt4, elt9),
        e(elt2, elt7),
        c(elt5, elt6, elt8)
```

This example says that if element 1 or 2 is present, then they both must be present; that at least one of elements 3, 4 or 9 must be present (all may be present); that if either element 2 or 7 is present, the other cannot be; and that if element 5 is present, elements 6 and 8 must also be (though if element 5 is not present, elements 6 or 8 could be).

You can also define data element relational conditions that appear in the syntax clause with the following operators:

define segment

| Operator | Example | Result |
|---|---|---|
| and | elt(1) and elt(2) | Both must be present |
| or | elt(1) or elt(2) | At least one must be present |
| not | elt(1) not elt(2) | If the first is present the other must not be present |
| implies | elt(1) implies elt(2) | If the first is present the other must be present |
| iff | elt(1) iff elt(2) | If either is present the other is required |
| = | elt(1) = "BS" | The element is equal to a string constant |
|   | elt(2) = 12 | The element is equal to a numeric constant |
|   | elt(3) = elt(4) | The first element is equal to the second |

The following example illustrates the use of these operators:

```
syntax
    elt(2) or elt(5) implies elt(8),
    elt(3) or elt(4) or elt(9) implies elt(3) and elt(4) and elt(9),
    elt(2) iff elt(7)
    elt(10) = "LB"
```

The expression elt(n) indicates the condition for element n for the segment being defined. This example says that if element 2 or 5 is present, then element 8 must be present; that if any one of elements 3, 4 or 9 are present, then all three must be present; that if either element 2 or 7 is present, the other must be also; and that element 10 is equal to the string constant "LB".

EXAMPLES

1.

```
define segment g41 version "x12-2.3"
    documentation "allowance/charge"
    elements
        m 340
        m 359
        m 355
        c(o) 369
    end elements
end segment g41
```

Note how this example defines the fourth element as c(o). The "e" interpreter will treat the element as optional, even though the standard defines it as conditional. This occurs because the standard defines an element as conditional or optional without specifying why.

define segment

2.

```
define segment IT3 version "x12-002002"
    documentation "additional item data"
    elements
        c 382,
        c 355,
        c 368,
        c 383,
        c 371
    syntax
        1 implies 2,
        1 or 3 or 4
    used in "810", "850"
end segment it3
```

The syntax clause in this example says that if element 1 is present, 2 must also be; and that at least one of elements 1, 2 or 3 must be present.

3.

```
define segment pad version "x12-2.3"
    documentation "product adjustment detail"
    elements
        c 350,
        c 521,
        o 670,
        c(o) 648,
        o 649
    end elements
    syntax
        r(1,2)
    used in "844", "845"
end segment pad
```

NOTES

Separate items in double quotes with commas. The "e" interpreter ignores all other blank space between quoted items.

SEE ALSO define composite, define element.

NAME dim - define and allocate space for an array

SYNOPSIS

```
dim <array name> (<subscripts>) [= <initializer>]
```

DESCRIPTION

The dim statement allocates space for an array. Optionally, you can also initialize the array.

Subscripts are positive numbers. If you enter more than one subscript, separate them with commas. If you use an initializer, then the value of each array entry is set equal to this value. If you do not initialize the array, all its entries are set equal to zero.

EXAMPLES

```
dim a(10,5)
dim b(25)="bcd"
dim c(30)=1.23
```

NAME dir - make a virtual file for each file in a directory

SYNOPSIS dir("<path>")

DESCRIPTION

The dir function makes a virtual file for each file found in the directory specified by `<path>`. It returns an array containing virtual files.

EXAMPLE vflist = dir("/usr/spool/mail")

This example illustrates the use of the dir function for mail messages sent via UUCP. It changes all the files in the "/usr/spool/mail" directory into a list of virtual files and returns the list to the variable "vflist."

NOTES

You use this command in your communications script to check for incoming files.

SEE ALSO chapter 4.

do_split

NAME do_split - make a virtual file from items delimited by mark_start and mark_end

SYNOPSIS do_split()

DESCRIPTION

The do_split function is used in conjunction with the mark_start and mark_end functions to make a virtual file. Everything contained between mark_start and mark_end is split off and returned as a virtual file.

This function does not take any arguments.

EXAMPLE

```
filemap invoice
begin
  loop
  record header:
            tree\HEADING\LOOP_N1\PER[1][2]=contact
            tree\HEADING\LOOP_N1\PER[1][1]="AD"
  record info:
            tree\HEADING\BIG[1][4]=ponum
            tree\HEADING\BIG[1][2]=invnum
            tree\HEADING\BIG[1][1]="900101"   endloop
end record header
begin
  filler pic x(*)
  filler pic x(4)    value is "MAIL"
  filler pic b(5)
  contact pic x(15)
  filler pic x(*)
  filler pic x(9)    value is "INVOICE #"
  filler pic x       value is "\n"
end record info
begin
  ponum pic x(6)
  filler pic x(33)
  invnum pic x(*)
  filler pic x       value is "\n"
end mark_end()
``` do_split                                                                             do_split

```
            doc = do_split()
            set_app_normal_receiver(vf,custnum)
            mark_start()
    end
' what follows is the main program
begin
  mark_start()
  doclist = split(stdin,invoice)
  end
end
```

In this example, the main program marks the start of a document. The split function then calls the filemap invoice which does pattern-matching on a file bound to stdin. The end of a document is marked, and do_split returns a virtual file for the document to the variable "doc." This process continues in a loop until all documents have been split.

NOTES

You use this function in your de-enveloping script for non-EDI files. After a filemap performs pattern-matching on a single document in a virtual file list, the mark_end function sets an end-of-file marker for that document. do_split breaks off the document and returns a virtual file. You reset the file marker for the next document with the mark_start function.

SEE ALSO chapter 4, filemap, mark_end, mark_start.

end

NAME end - end a block of statements

SYNOPSIS end

DESCRIPTION

This command ends a block of statements that started with a begin statement.

SEE ALSO begin.

NAME filemap - perform pattern-matching on files

SYNOPSIS

```
filemap <name>
begin
  [start: <statement list>]
    <patterns>
  [stop: <statement list>]
end
```

DESCRIPTION

Filemaps are function-like objects that work with the mapfile function to pattern-match files. Filemaps allow you to map items in an application file to nodes in an EDI tree. You can then use the write edi function to create an EDI text from the tree. This gives you a way of automatically generating EDI text from an application file.

The optional start clause executes statements in <statement list> before the filemap attempts to match any records. The optional stop clause executes statements in <statement list> after the program has matched the last described pattern as fully as possible.

<patterns> can consist of records, loops, optional clauses and other filemaps. You can use any combination of patterns you want, nesting them to any level. No matter what pattern type you use, they always reference the current input file. The following describes each pattern type.

Record References:

```
record <record name>:
  [<statement list>]
```

<record name> refers to a record definition elsewhere in the program. <statement list> is optional. If you include statements after the record, the program executes them only if the record matches items at the current file pointer.

Loop Definitions:

```
loop
  <patterns>
endloop
```

A loop statement maps <patterns> as many times as possible. <patterns> can be other loops, records, filemaps and optional clauses. The program exits the loop as soon as a match fails and executes the next item following the loop.

Optional Clauses:

```
optional
  <patterns>
endop
```

You can declare parts of your filemap as optional. When your program does not find a match in an optional clause, it returns to the current record and continues.

Filemaps:

You can nest filemaps within one another. Refer to the syntax given above.

EXAMPLE

```
filemap fmap
  begin
    record r1: print "successful match on record r1"
    filemap ff: print "successful match on filemap ff"
  end
```

NOTES

Follow these rules when constructing filemaps:

- The first record in a loop must be distinct from the record following the loop
- The first item in an optional clause must be different from the first record following the optional clause
- The first record in a loop cannot be optional

SEE ALSO figure 3-6, mapfile, write edi.

NAME for - execute program instructions in a loop

SYNOPSIS

```
for <ident> = <startval> to <endval> [step <stepval>]
    <statement list>
next <ident>
```

DESCRIPTION

The for and next statements perform a series of instructions in a loop a given number of times.

When the for statement is executed, the value of <ident> is set equal to <startval>, and each statement in <statement list> is executed until the next statement is encountered. The value of <stepval> is then added to the loop variable <ident>. A comparison is made between the value of <ident> and <endval>. Looping continues under the following circumstances:

- If <stepval> is positive and the value of <ident> is less than or equal to <endval>, the loop is repeated.

- If <stepval> is negative and the value of <startval> is greater than or equal to <endval>, the loop is repeated.

In both cases, the final value of <ident> (the value that did not satisfy the comparison) is available after the for statement finishes. The quantities <startval>, <endval> and <stepval> can be any expressions that evaluate to numbers. The identifier following next is required, and must be the same as the identifier following for.

foreach

NAME foreach - visit all children of a node in an EDI tree

SYNOPSIS

```
foreach <ident> in <expression> do
begin
   <statement list>
end
```

DESCRIPTION

The foreach statement sequentially selects all of a particular item in <expression>, and then executes all statements in <statement list>. For instance, the foreach statement can sequentially select each child of the node described by a node-valued expression, assign the result to the identifier <ident>, and execute all statements in the statement list for each such assignment. You can use the foreach statement to visit all the iterations of a loop, or all segments in a multiple-occurring segment. <expression> can be any "e" language expression.

EXAMPLE

```
begin
    read edi on stdin tree
    detail = tree\DETAIL\D_LOOP_PO1
    for k=1 to loopsize(detail)
        po1 = detail[k]PO1
        counter=1
        foreach occurrence in po1
        begin
            if not nullelt( po1[counter] )
            then
            begin
                print on stdout po1[counter]
            end
            counter = counter + 1
        end
    next k
end
```

To see how this program works, consider the following as the input file:

```
BEG*00SA1028****30890
ITD*14*4*****30 days
DTM*002*31090
TD3*PU
N1*BY*LOGICAL DESIGNS CORPORATION
N3*12345 BURNSIDE CT.
N4*WALNUT CREEK*CA*94678
N1*SE*OFFICE CLUB
N3*8976 DIAMOND BLVD.
N4*CONCORD*CA*94111
N1*ST*PREMENOS CORPORATION
N3*3344 ENEA CT.
N4*CONCORD*CA*94520
PO1**100*UN*0.15
PID*F****INDEX TABS
PO1**1*UN*10
PID*F****DELIVERY
CTT*3*79.00
```

The output from the example filemap would then be:

```
100
UN
0.15
27
UN
2
1
UN
10
```

SEE ALSO de_envelope.

NAME function - define a function returning a single value

SYNOPSIS

```
function <name> [(parameter list)]
[local <identifier list>]
begin
  <statement list>
end
```

DESCRIPTION

This statement defines and names a function.

Optionally, you can include a list of local identifiers with the reserved word local. This list describes those variables whose values can be accessed only within the body of the function. A global variable with the same name as a local variable cannot be referenced within the function. Local arrays can be declared by following an identifier with a parenthesized list of constants, and an optional initialization:

```
local x,y,arr(5,20),arr2(50)=""
```

You return a value from a function call by putting a return statement inside the statement list.

EXAMPLE

```
function max(a,b)
begin
  if a<b then
      return b
  else
      return a
end
```

This example function returns the maximum of its two arguments.

SEE ALSO multivalued function.

NAME get_envelope - get an enveloped EDI interchange

SYNOPSIS

```
get_envelope("<node name>")
```

DESCRIPTION

The get_envelope function retrieves an enveloped EDI interchange from <node name> where it is stored. It returns a virtual file.

EXAMPLE

```
session = get_envelope("geisco")
if session then begin
   putdir(session,"out","geisco")
end
```

In this example, if the get_envelope function finds any files in the "geisco" node, it assigns them to the variable "session." They are then transferred to a directory ("out") and file ("geisco") by the putdir function.

NOTES

You use this function in your communications script to ask the EDI/e enveloper for a session, that is, if any files have been enveloped and are ready to send.

SEE ALSO chapter 4, putdir.

NAME getc - read a character from a stream

SYNOPSIS

```
getc (<stream>)
```

DESCRIPTION

This function reads a character from <stream>. It returns a "-1" when the end of file is reached, otherwise it returns the byte value of the character as an integer.

NAME getdigits - return the digits of a number

SYNOPSIS getdigits(n)

DESCRIPTION

The getdigits function takes a number as its only argument and returns the digits of the number. If the number contains a minus sign or a decimal point, they are dropped.

EXAMPLE

```
getdigits(-2.4)
```

In this example, getdigits returns 24.

NOTES getdigits allows you to compute X12 Standard hash totals. The X12 Standard defines a segment (CTT) to contain a hash total of a specified data element. All values in the data element are summed without regard to decimal points (explicit or implicit) or signs. If the sum is greater than the maximum size of the hash total of the data element, truncation occurs on the leftmost digits.

For example, suppose you had the following values you wanted to hash total:

```
-.0055
  .55
 5.5
 5500
```

The hash total prior to truncation is 5665, and after truncation to a three-digit field is 665.

getenv

NAME getenv - return the value of an environment variable

SYNOPSIS

```
getenv("<environment variable>")
```

DESCRIPTION

The getenv function returns a string containing the value of <environment variable>.

EXAMPLES

```
p1 = getenv("PATH")
```

This example returns the value of the UNIX environment variable PATH to p1.

```
path = getenv("PATH")
if not path then
    print "No environment variable named PATH"
```

This example tests for the existence of the environment variable PATH. If it does not exist, getenv returns a logical false.

NAME if - make a program decision based on a true-false condition

SYNOPSIS if <condition> then <statement list> [else <statement list>]

DESCRIPTION

The if statement allows you to express conditional choice among different courses of action.

You can use a list of statements for <statement> as long as they are enclosed with begin and end statements.

If <condition> evaluates to true, the statements in the then clause are executed. If <condition> is false and an else clause is present, the statements in the else clause are executed.

EXAMPLE

```
if month< 0 OR month>12
then print "Not a valid month"
else print "Value of month is",month
```

NAME loop - define a loop

SYNOPSIS

```
<area-designator>_loop_<name> <min occurrences> <max occurrences>
  [delimited [by] <segment 1> <segment 2>]
  <segments>
end loop <name>
```

DESCRIPTION

A loop, in the simplest case, is an ordered sequence of segments that can occur multiple times. The loop/end loop construction describes a loop by listing its minimum and maximum number of occurrences, and the segments it can contain. It is only used inside document definitions.

<area-designator> can be the letter H, D, or S depending on the area in which the loop occurs. H, D, and S stand for heading, detail, and summary, respectively. <name> is loop name which typically comes from the first loop segment, that is, HL, N1, etc. You can use the optional delimited by clause to define a loop that is bound by two segments. The TDCC Standard defines loops in this manner.

EXAMPLE

```
d_loop_cld 1 8
  segment cld: o 1
  segment ref: o 200
end loop d_loop_cld
```

SEE ALSO area, define document, segment

NAME loopsize - get the size of a segment body or loop body

SYNOPSIS

```
loopsize(<node reference>)
```

DESCRIPTION

The function loopsize determines how many occurrences of a segment body or loop body exist in the node reference you specify. <node reference> represents an EDI tree path.

EXAMPLE

When referencing loops, you can simplify your script by saving a loop block path to a variable and then applying selectors to this variable. The following example illustrates this point:

```
loopblock = tree\H_LOOP_N1
for a=1 to loopsize(loopblock)
  loopbody = loopblock[a]
  ' statements that refer to the loop body
next a
```

This block of code assigns the path reference "tree\H_LOOP_N1" to a variable named "loopblock." The first time through the for statement, the variable counter a is equal to 1, and the program extracts the first N1 loop (the first loop body in the loop block). The program then performs some action on this loop body, adds 1 to the counter variable k, and tests for more loop bodies. This process continues until no more loop bodies are found.

NAME makedoc - make an empty EDI tree

SYNOPSIS

```
makedoc("<doctype>","<version>")
```

DESCRIPTION

The function makedoc returns an empty EDI tree with structure appropriate for the document type. <doctype> is a string that describes a standard EDI document. <version> is a string that describes the document version.

EXAMPLE

```
makedoc("810","002002")
```

This example makes an empty EDI tree for an X12 810 document, version 2 release 2.

SEE ALSO mapfile.

NAME mapfile - apply a filemap to a stream.

SYNOPSIS mapfile(<stream>, <name>)

DESCRIPTION

The mapfile subroutine applies a filemap to a character stream.

A filemap is a pairing of text patterns and actions. You use mapfile with the makedoc function to create an EDI tree from EDI text.

EXAMPLE

```
mapfile (fp,inv)
```

In this example, "inv" is a filemap describing the structure of an invoice transaction set, and "fp" is a string pointer. The mapfile subroutine attempts to match the structure described by "inv" against the character stream that "fp" points to. If the pattern matches succeed, any actions specified in the filemap "inv" are executed. If the pattern matches do not all succeed (i.e. if a record referenced in the filemap does not match the input) the call to mapfile is aborted. Should an abort take place, any actions executed in previous successful matches are not affected.

mark_end                                                                            mark_end

NAME mark_end - mark the end of a document

SYNOPSIS mark_end ()

DESCRIPTION

The mark_end function is used in conjunction with the do_split function to set the end marker of a document.

This function does not take any arguments.

EXAMPLE

See the example under do_split.

NOTES

You use this function along with mark_start to mark off items for do_split. Its specific application is in your de-enveloping script for non-EDI files.

SEE ALSO chapter 4, do_split, filemap, mark_start.

NAME mark_start - mark the start of a document

SYNOPSIS mark_start ( )

DESCRIPTION

The mark_start function is used in conjunction with the do_split function to set the beginning marker of a document.

This function does not take any arguments.

EXAMPLE

See the example under do_split.

NOTES

You use this function along with mark_end to mark off items for do_split. Its specific application is in your de-enveloping script for non-EDI files.

SEE ALSO chapter 4, do_split, filemap, mark_end.

NAME multivalued function - define a function that returns more than one value

SYNOPSIS

```
multivalued function <function name> [(parameter list)]
returns <var list>
[local <identifier list>]
begin
    <statement list>
end
```

DESCRIPTION

This function enables multiple values to be returned from a single function call. Values are returned to the variables <var list> following the returns statement. The same rules for functions apply to multi-valued functions. To call the multi-valued function, you use the following syntax:

```
values of <multi-valued function name> [(parameter list)]
begin
   <statement list>
end
```

<statement list> may contain statements that reference any or all of the returned values from the multi-valued function, as well as any other "e" statements.

EXAMPLE

```
multivalued function f1(a,b) returns x,y,z
   local c=1, d
   begin
     print "In f1"
     d = a+b
     x = a
     y = d/b
     z = d*a
   end
```

To call these values in your program, you would use the following:

```
values of f1(2,3)
    begin
      v1 = x
      v2 = z
      print  "Values of f1"
      print "    v1 = ", v1;
      print "    v2 = ", v2
    end
```

SEE ALSO function.

NAME newstdout - creates a virtual file as stdout

SYNOPSIS newstdout

DESCRIPTION

This function closes the current stdout, sends the virtual file, and creates another virtual file as stdout.

NAME nullelt - determine if an EDI document element has been assigned a value

SYNOPSIS nullelt(<element name>)

DESCRIPTION

The nullelt function determines if an element in an EDI document has been assigned a value. It returns true if the element has no value, and returns false otherwise.

EXAMPLE

```
bss = doc\HEADING_AREA\BSS     'get a BSS segblock
if not nullelt(bss[1][9])
  print "contract number is ",bss[1][9]
```

This example prints the value of the ninth element of the BSS segment, provided that the element has been assigned a value.

NAME nullseg - determine if an EDI document segment has been defined

SYNOPSIS

```
nullseg(<segment>)
```

DESCRIPTION

The nullseg function returns true if the segment has not been defined, and returns false otherwise.

EXAMPLE

```
if not nullseg(DTM)
   print "date/time qualifier is ",DTM[1][1]
```

This example checks that the Date/Time Reference segment DTM has been defined, and if so, prints out the first element of this segment.

NAME open - open a file and return a stream object to it

SYNOPSIS open ("<filename>", "<mode>")

DESCRIPTION

This function opens the specified file and returns a stream object to it. <filename> can be either a virtual file object (created by the deenvelope function), or a string specifying the path of a file.

<mode> is a string, either "r" for read, or "w" for write.

SEE ALSO close.

NAME - note: doc changes to pic not yet incorporated pic, picture - define a pattern of text

SYNOPSIS

```
pic <text pattern> [usage is <usage clause>]
                   [value is <value clause>]
```

DESCRIPTION

The syntax for pic statements resembles that in COBOL. A pic statement can only appear within a record definition.

The pic clause that follows the field name gives the kind of data the field contains, and the field length.

If your fields require a certain starting or constant value, use the value is clause.

Though not necessary, the usage is clause allows you to indicate the form in which a field of data is stored. This can affect the efficiency of the compiled program. Data is normally stored in one way when it is not involved in arithmetic operations and in another way when it is. These two forms are display and computational. The display form stores one character of data in each storage position. The computational form applies only to numeric fields: it stores more than one digit of a number in a single storage position. You can abbreviate computational as comp.

EXAMPLE

```
pic $$$z99.99
```

This pattern matches strings such as "$23849.17" and "$234.56."

SEE ALSO record.

NAME ppeditree - write a pretty-printed EDI tree

SYNOPSIS ppeditree (<tree>, <stream> [, all])

DESCRIPTION

Given an EDI tree, the ppeditree function writes a *pretty-printed* representation of the EDI tree to <stream>. If it encounters an interior node that is not part of a document, area, loop block, loop body, segment block or segment body, the interpreter printer is called to display the object.

<tree> is an EDI tree. <stream> is the stream that the pretty-printed output is sent to. The default is stdout. Normally, ppeditree suppresses missing data elements and childless segment blocks form its output. If you specify all and it is not nil, ppeditree does not suppress the missing data elements and childless segment blocks.

print

NAME print - write data to a stream

SYNOPSIS

```
print [on <stream>] <expression list> [;]
```

DESCRIPTION

The print statement prints data to a stream. The default stream is stdout. To print to a different stream, use on <stream>.

The <expression list> consists of string and/or numeric expressions separated by commas. The value of each expression in the list is printed without intervening spaces. Any string constants in the list must be enclosed in double quotes. A semi-colon at the end of the line causes the next print statement to begin its output on the same line.

EXAMPLE

```
print "x=",x,"y=",y;
print "z=",z
print "w=",w
```

This example would yield output resembling the following:

```
x=2 y=5 z=9
w=10
``` putc

NAME putc - write an integer to a stream

SYNOPSIS

```
putc ("<i>", <stream>)
```

DESCRIPTION

This function writes an integer to the stream specified. <i> is an integer containing the byte value representation of the character to be printed. <stream> is the stream to be written to.

NAME putdir - put a virtual file into specified directory

SYNOPSIS putdir(<vfvariable>,"<path>","<file>")

DESCRIPTION

The putdir function is used in conjunction with the get_envelope function to move a virtual file into a specified directory/file. <vfvariable> is a virtual file variable used for assigning the returned value from get_envelope. <path> is the full path name of the directory where <file> is to be put.

EXAMPLE

```
'check for files going to geisco
session = get_envelope("geisco")
if session then begin
    putdir(session,"out","geisco")
end
```

In this example, the files retrieved by get_envelope are assigned to "session", then put into a file called "geisco" in the "out" directory.

NOTES

You use this function in your communications script along with the get_envelope function to prepare files for the EDI/e communications module to send.

SEE ALSO chapter 4, get_envelope.

putrec

NAME putrec - write a record to a file

SYNOPSIS

```
putrec (<record>, <stream>)
```

DESCRIPTION

This function is a record level output routine. Given a mapfile record definition, putrec writes the record to a file. The field definition in the record specifies the field format of what is written. Either the variable declared in a field at the time of the putrec call, or the value is clause in the field definition specifies the field value of what is written. If both a variable declaration and value is clause are present, then the variable binding value takes precedence.

<record> is a record definition. <stream> is a stream to which output is written.

read edi            read edi

NAME read edi - create an EDI tree from a virtual file

SYNOPSIS read edi [on <file>] <variable>

DESCRIPTION

The read edi function reads an EDI document from a virtual file, builds an EDI tree, performs compliance checking and then assigns the new EDI tree to <variable>. The default stream that this function reads from is stdin. If you specify on <file>, read edi reads in the document from <file>. <file> is a variable whose current value is a file opened for reading.

EXAMPLES

```
read edi doc810
```

In this example, read edi reads in an EDI document from stdin, builds an EDI tree and assigns the result to the variable <doc810>.

```
read edi on edi.01 doc810
```

This example uses the on <file> clause to read in a document from the variable edi.01.

NOTES

You should only use on <file> when you require an input in addition to stdin. The EDI/e system determines default routing information for translation output from stdin.

A virtual file has two parts: a header and a body. The header is like a packing slip; the body is like the associated package. The header contains information about where the document came from, when it was sent, and how it should be processed by EDI/e. The body contains the actual document.

SEE ALSO chapter 4.

NAME record - define and name a record

SYNOPSIS

```
record <record name>
begin
  <field definitions>
end
```

DESCRIPTION

This statement defines and names a record. Each field within a record has the following form:

```
<field name> pic <string descriptor> [usage is <usage clause>]
                                     [value is <value clause>]
```

EXAMPLES

```
record A
begin
  filler     pic x(12)            value is "*header*"
  contents   pic xSzzz9.99
  value      pic 999V99           usage is comp
end record B
begin
  fld1       pic 9(2)
  fld2       pic 9(2)
  fld3       pic x(*)
  fld4       pic S999.99          value is 123.45
end
```

In record A, all fields are fixed-length. In record B, field fld3 is variable length. The end of field fld3 is reached when the following field has the value 123.45.

The following example shows the use of signatures:

```
record C
signature at offset 23:
        pic -S(5).99 must not match -123.45 or 45.78
begin
  fld1     pic x(2)
  fld2     pic x(*)
end
``` record

You can use a signature to quickly determine if a text pattern matches a record. In this example, when a match is attempted against record C, the text reader begins by skipping ahead 23 characters. (The text reader counts the first character as position number 1). It then checks whether the text at this location matches the pattern $(5).99. If the text does not match, the attempted match against record C fails. If a match does occur, the numeric value of the text pattern is computed. If the result is either -123.45 or 45.78, the match fails; otherwise, it succeeds.

NOTES

In general, a variable-length field can be followed by other fields, as long as the trailing field has a value is clause, or is a 'b' (blank) field. A record can contain more than one variable-length field, but such fields have to be separated by at least one record with a value is clause.

SEE ALSO pic.

NAME return - assign a value to a function and return the value to the caller

SYNOPSIS return <expression>

DESCRIPTION

When this statement is executed, control returns to the point where the function was invoked, and the value of <expression> is assigned to the function call. Statements in the called function that follow the return statement are not executed.

Every function must contain a return statement; otherwise, an error results.

A function call is permitted anywhere an expression is allowed. A function call cannot be used as a statement in itself, however.

NOTES

You cannot include a return statement in a subroutine, as a subroutine cannot return a value.

SEE ALSO function, multivalued function.

NAME route_app_to_translator - route application text to the EDI/e translator

SYNOPSIS route_app_to_translator(vf)

DESCRIPTION

This function routes a non-EDI document to the EDI/e translator.

It takes vf as its only argument.

EXAMPLE

```
begin
    foreach doc in doclist do begin
    print "deenv: routing to translator"
    route_app_to_translator(vf)
    end
end
```

NOTES

You use this function in your de-enveloping script for non-EDI files.

SEE ALSO chapter 4, split.

route_edi_to_translator

NAME route_edi_to_translator - route EDI text to the EDI/e translator

SYNOPSIS route_edi_to_translator(vf)

DESCRIPTION

This function routes an EDI document to the EDI/e translator.

It takes vf as its only argument.

EXAMPLE

```
begin
   vflist = deenvelope(stdin,"X12")
     foreach vf in vflist do begin
        set_edi_normal_sender(stdin,"mfg")
        set_edi_normal_receiver(stdin,"ge")
        print "deenv: routing to translator\n")
        route_edi_to_translator(vf)
     end
```

NOTES

You use this function in your de-enveloping script for EDI files.

SEE ALSO deenvelope.

route_to_deenv

NAME route_to_deenv - route a virtual file list to the EDI/e de-enveloper

SYNOPSIS route_to_deenv(vf)

DESCRIPTION

This function routes a virtual file list of non-EDI documents to the EDI/e de-enveloper.

EXAMPLE

```
begin
    'check for incoming non-edi message for the mfg application
    vflist = dir ("mfg")
    foreach vf in vflist do begin
        setattr (vf, "Content-Type" "nonedi")
        setattr (vf, "Application-Id" "mfg")
        print "comm: routing to deenv\n")
        route_to_deenv(vf)
    end
end
```

This example takes the files found in the "mfg" directory, returns an array of virtual files, and routes the list to the EDI/e de-enveloper.

NOTES

You use this function in your communications script for non-EDI files.

SEE ALSO chapter 4, dir, setattr.

NAME segment - define a segment

SYNOPSIS

```
segment <name> <requirement designator> <max repetitions>
```

DESCRIPTION

The segment statement identifies the location of a segment in a document definition, and describes the attributes of the segment in the definition. A segment statement can only appear in a document definition. The <requirement designator> can be "m" (mandatory), "f" (floating), "o" (optional), or "c" (conditional).

The value of <max repetitions> indicates the maximum number of consecutive occurrences of the segment within the document being defined.

EXAMPLE

```
segment n1 m 1
```

In this example, for the defined document, segment n1 must appear, but can appear only once.

SEE ALSO area, define document, loop.

NAME select - select a sequence of actions depending upon a value

SYNOPSIS

```
select <expression> from
  case <exp1> : <statement list>
  case <exp2> : <statement list>
  ...
end
```

DESCRIPTION

The select statement selects a sequence of actions, depending upon the value of a particular expression. The value of <expression> is compared to <exp1>, <exp2>, and so on. When a match is found, the program executes the corresponding statement list. If no match is found, no action occurs.

EXAMPLE

```
select x*3+2 from
  case 1: y=3
          print "x =",x
  case 2: z=x-3
          print "z =",z
end
```

Note that the statements corresponding to each case value are not enclosed by begin and end statements.

setattr          setattr

NAME setattr - set attributes of virtual file

SYNOPSIS setattr(vf,<"attribute name">,"<attribute value>")

DESCRIPTION

This function sets attributes of a virtual file on the routing form. <attribute name> is a user-defined attribute and <attribute value> is that attribute's value. These attributes identify the file type (EDI, non-EDI, or text). Along with the node and communications facility, they determine the de-enveloping script for the file.

EXAMPLE

```
setattr(vf,"Content-Type","mfg")
setattr(vf,"Application-Id","mfg")
```

These two examples set the values for the Content-Type and Application-ID attributes.

NOTES

You use this function in your communications script. These values correspond to the values you entered in the de-enveloping script table. These two values, along with the node and facility, determine which de-enveloping script to run.

SEE ALSO chapter 4, route_to_deenv.

NAME set_app_normal_receiver - set the normalized receiver of a document

SYNOPSIS set_app_normal_receiver(<stream>, "<application>")

DESCRIPTION

This function sets the normalized receiver of a document for non-EDI to EDI routing.

EXAMPLE set_app_normal_receiver(stdin, "mfg")

NOTES

You use this function in your de-enveloping script for non-EDI files. If you do not use this function, the default normalized receiver value from the Application ID table is used.

SEE ALSO chapter 4, set_app_normal_sender.

set_app_normal_sender

NAME set_app_normal_sender - set the normalized sender of a document

SYNOPSIS set_app_normal_sender(<stream>,"<application>")

DESCRIPTION

This function sets the normalized sender of a document for non-EDI to EDI routing.

EXAMPLE

```
set_app_normal_receiver(stdin,"ge")
```

NOTES

You use this function in your de-enveloping script for non-EDI files. If you do not use this function, the default normalized sender value from the Application ID table is used.

SEE ALSO chapter 4, set_app_normal_sender.

set_edi_normal_receiver

NAME set_edi_normal_receiver - set the normalized sender of a document

SYNOPSIS set_edi_normal_receiver(<stream>, "<application>")

<stream> is the stream to be read. <application> can be "interchange," to specify use of the ISA information, or "fg," to specify use of the GS information. (Alias tables are used to translate the encoded information to the normalized information.)

DESCRIPTION

This function sets the normalized receiver of a document for EDI to non-EDI routing.

EXAMPLE

```
set_edi_normal_receiver(stdin,"ge")
```

NOTES

You use this function in your de-enveloping scripts for EDI files.

SEE ALSO chapter 4, set_edi_normal_sender.

set_edi_normal_sender

NAME set_edi_normal_sender - set the normalized sender of a document

SYNOPSIS set_edi_normal_sender(<stream>, "<application>")

<stream> is the stream to be read. <application> can be "interchange," to specify use of the ISA information, or "fg," to specify use of the GS information. (Alias tables are used to translate the encoded information to the normalized information.)

DESCRIPTION

This function sets the normalized sender of a document for EDI to non-EDI routing.

EXAMPLE

```
set_edi_normal_sender(stdin, "mfg")
```

NOTES

You use this function in your de-enveloping scripts for EDI files.

SEE ALSO chapter 4, set_edi_normal_receiver.

NAME split - make separate documents from a group of non-EDI documents

SYNOPSIS split(<stream>,"<filemap>")

DESCRIPTION

The function split *splits* a group of non-EDI documents into separate documents. <stream> is the stream to be read. <filemap> is one of your filemaps.

In order to reference the split documents in your script, you must use an assignment statement.

EXAMPLE

See the example under do_split.

NOTES

You use this function in your de-enveloping script for non-EDI files.

NAME subdirs - give the names of all sub-directories in a given directory

SYNOPSIS subdirs("<path>")

DESCRIPTION

The subdirs function returns an array of the names of the sub-directories in the directory specified by <path>. If <path> is an empty string, the current directory is used.

EXAMPLE

```
sublist = subdirs("/macys/edi")
```

This example returns an array to the variable sublist of all the subdirectories in the path macys/edi. You could then use the foreach statement to access the returned values as follows:

```
foreach i in sublist do
begin
 print i
end
```

NOTES

You can use this function to scan a given directory for sub-directories where documents are stored. For instance, you may organize your documents according to trading partner and then by type, that is, EDI, non-EDI or text.

subroutine

Name subroutine - define and name a subroutine

SYNOPSIS

```
subroutine <name> [(<formal parameter declarations>)]
[<local declarations>]
begin
  <statement list>
end
```

DESCRIPTION

This function defines and names a subroutine. Any allowed statement except return or returns can go in the statement list.

EXAMPLE

```
subroutine condprint(str,val)
begin
  if val > 0
  then print "string = ",str
end
```

This subroutine prints the value of its string argument <str>, provided that the value of its numeric argument <val> is greater than zero.

Once you define your subroutine, you invoke it with the call statement. For example,

```
call condprint(abc,2)
```

In this instance, the string is printed because 2 is greater than zero.

substr　　　　　　　　　　　　　　　　　　　　　　　　　　substr

NAME substr - get a substring of a given string

SYNOPSIS

```
substr(<"str">,<p1>,<p2>)
```

DESCRIPTION

The substr function returns a string of characters taken from position <p1> to position <p2> in string <str>. <p1> and <p2> must be integers. If <p2> exceeds the length of <str>, then all the characters from position <p1> onwards are returned.

<p1> and <p2> can be negative numbers. If you use a negative number, the beginning position becomes the end of the string, and characters are selected backwards (moving to the left of the string).

If <p2> is negative and has a magnitude greater than the length of the string, <p2> is treated as if its value were 1.

EXAMPLES

```
s1 = substr("abcdef",2,5)
```

This example assigns the value "bcde" to variable s1.

```
s2 = substr("abcdef",3,99)
```

This example assigns "cdef" to variable s2.

```
s3 = substr("abcdef", 1, -1)
```

This example assigns "abcdef" to variable s3.

```
s4 = substr(1855, -3, -1)
```

This example assigns "855" to the variable s4.

SEE ALSO cat.

5-72

NAME system - run shell commands

SYNOPSIS system(<command string>)

DESCRIPTION

The system function runs shell commands from within an "e" script. If desired, you can use the return code given by the shell.

EXAMPLES

```
return_code = system("cp file1 file2")
```

This example stores the result of the Unix cp (copy) command in "return_code."

```
call system("cp file1 file2")
```

This example does not use a return code.

NAME trim - trim leading and trailing characters

SYNOPSIS trim ("<string>" "<trimset>")

DESCRIPTION

This function trims leading and trailing characters from <string> by the string <trimset>. It returns a trimmed string.

EXAMPLE

```
trim "xxabyy" "yx"
```

This example produces the following string:

```
"ab"
``` while  while

NAME while - execute statements repeatedly while a condition is met

SYNOPSIS

```
while <condition>
   <statement list>
wend
```

DESCRIPTION

The while and wend statements execute repeatedly a series of statements, as long as a certain condition is met.

When the while statement is first executed, <condition> is evaluated. If it is false, the statement immediately following wend (if any) is executed. If it is true, each statement in <statement list> is executed, and <condition> is re-evaluated. This process is repeated until <condition> is false. Note that unless some statement in <statement list> changes the value of <condition>, the while statement never terminates.

NAME write edi - convert an EDI tree to EDI text

SYNOPSIS

```
write edi [on <file>] <variable>
[segment = <expression-producing-one-character-string>]
[, element = <expression-producing-one-character-string>]
[, subelement = <expression-producing-one-character-string>]
```

DESCRIPTION

The write edi function performs occurrence count and syntax compliance checking on an EDI tree, then writes the tree as an EDI document. <variable> is an EDI tree. If you use the on <file> clause, write edi writes the document to <file>. <file> is a variable that has been opened as a file to be written to. The default stream that this function writes to is stdin.

The routing information in stdin normally determines the delimiting characters in the created EDI document. You can override these characters with the following:

- segment = "\r" overrides the default segment terminator character.

- element = "+" overrides the default element separator character.

- subelement = " ' " overrides the subelement separator character.

You can specify segment, element and subelement in any order, or not at all. If you uuse more than one, you must separate them with commas. The following lists all of the legal combinations of the use of these optional clauses:

```
WRITE EDI doc SEGMENT = "\n"
WRITE EDI doc SEGMENT = "\n", ELEMENT = "*"
WRITE EDI doc SEGMENT = "\n", ELEMENT = "*", SUBELEMENT = "'"
WRITE EDI doc SEGMENT = "\n", SUBELEMENT = "'"
WRITE EDI doc SEGMENT = "\n", SUBELEMENT = "'", ELEMENT = "*"
WRITE EDI doc ELEMENT = "*"
WRITE EDI doc ELEMENT = "*", SEGMENT = "\n"
WRITE EDI doc ELEMENT = "*", SEGMENT = "\n", SUBELEMENT = "'"
WRITE EDI doc ELEMENT = "*", SUBELEMENT = "'"
WRITE EDI doc ELEMENT = "*", SUBELEMENT = "'", SEGMENT = "\n"
WRITE EDI doc SUBELEMENT = "'"
WRITE EDI doc SUBELEMENT = "'", ELEMENT = "*"
WRITE EDI doc SUBELEMENT = "'", ELEMENT = "*", SEGMENT = "\n"
WRITE EDI doc SUBELEMENT = "'", SEGMENT = "\n"
WRITE EDI doc SUBELEMENT = "'", SEGMENT = "\n", ELEMENT = "*"
```

With the optional on <file> clause, the above becomes the following:

```
WRITE EDI ON file doc SEGMENT = "\n"
WRITE EDI ON file doc SEGMENT = "\n", ELEMENT = "*"
WRITE EDI ON file doc SEGMENT = "\n", ELEMENT = "*", SUBELEMENT = "'"
WRITE EDI ON file doc SEGMENT = "\n", SUBELEMENT = "'"
WRITE EDI ON file doc SEGMENT = "\n", SUBELEMENT = "'", ELEMENT = "*"
WRITE EDI ON file doc ELEMENT = "*"
WRITE EDI ON file doc ELEMENT = "*", SEGMENT = "\n"
WRITE EDI ON file doc ELEMENT = "*", SEGMENT = "\n", SUBELEMENT = "'"
WRITE EDI ON file doc ELEMENT = "*", SUBELEMENT = "'"
WRITE EDI ON file doc ELEMENT = "*", SUBELEMENT = "'", SEGMENT = "\n"
WRITE EDI ON file doc SUBELEMENT = "'"
WRITE EDI ON file doc SUBELEMENT = "'", ELEMENT = "*"
WRITE EDI ON file doc SUBELEMENT = "'", ELEMENT = "*", SEGMENT = "\n"
WRITE EDI ON file doc SUBELEMENT = "'", SEGMENT = "\n"
WRITE EDI ON file doc SUBELEMENT = "'", SEGMENT = "\n", ELEMENT = "*"
```

5-77

What is claimed is:

1. A computer implemented method for translating electronic data in a computer system in a computer system from a first format to a second format, comprising the steps of:
   (a) determining which one of a plurality of communication protocols to utilize to receive data as a function of a communication process used to transmit the data to the computer system;
   (b) receiving input data as a unit of work in a first format, the data comprises a plurality of data components;
   (c) assigning a script name to the unit of work to identify a de-enveloping procedure that will be used to separate the plurality of data components of the received data into individual data components, the de-enveloping procedure identified being dependent on the communication process used to transmit the data to the computer system;
   (d) dividing the received data into individual data components by executing the identified de-enveloping procedure;
   (e) translating the individual data components from the first format into a second format which is chosen to be compatible with a desired destination for the data; and
   (f) arranging the individual data components into a package so that the package is available for transmission at any time by the computer system to the desired destination.

2. The method of claim 1 wherein said translating step comprises the steps of:
   a. executing a first script to identify, classify, organize, route, and determine the translation requirements of said plurality of data components in said first format; and
   b. executing a second script to transform said plurality of data components in said first format to said second format.

3. The method of claim 2 wherein said scripts are executed by an interpreter.

4. The method of claim 2 wherein said scripts are executed by a compiler.

5. The method of claim 2 wherein said transforming step comprises the steps of:
   a. constructing a data tree structure having a plurality of branches and a plurality of nodes to represent a document or transaction;
   b. mapping one of said plurality of data components in said first format onto said data tree structure;
   c. mapping data in said data tree structure into said plurality of data components in said second format.

6. The method of claim 5 wherein said data tree structure is defined by specifications of an electronic data interchange document standard.

7. The method of claim 6 wherein said specifications comprise segment definitions and element definitions and wherein said step of constructing a data tree structure comprises the steps of:
   a. identifying a specification;
   b. defining a plurality of nodes, said nodes corresponding to said segment and element definitions; and
   c. developing a path specification for accessing said nodes.

8. The method of claim 7 wherein said step of identifying a specification comprises the steps of:
   a. identifying a specification identifier number;
   b. identifying an EDI standard;
   c. identifying an EDI standard version number; and
   d. using a hunt sequence associated with said version to resolve said segment and element definitions.

9. The method of claim 7 wherein said element definitions have associated data types, said data types being defined by a regular expression, said regular expression being computed when said element definition is read.

10. The method of claim 5 wherein said step of mapping to said data tree comprises the steps of:
    a. defining a plurality of data records, each of said records having one or more fields;
    b. parsing said one of said plurality of data components;
    c. matching data in said one of said plurality of data components to said fields in said record definitions; and
    d. binding said fields to said matching data.

11. The method of claim 5 wherein said step of mapping from said tree structure comprises the steps of:
    a. determining the identity of delimiters to be used to delimit said data;
    b. traversing said data tree in a depth first order; and
    c. formatting each of said nodes and placing said delimiters.

12. The method of claim 1 wherein said individual data components in said second format are maintained in a depository until they are transmitted to said destination.

13. The method of claim 1 wherein said script is defined in a programming language, said programming language incorporating a group of translating instructions corresponding to several translating steps in the flow of translating, including a pattern matching procedure for extracting data from a data stream, a data tree structure creation procedure, and a mapping procedure for mapping extracted data to a tree structure and mapping a data tree structure to an output stream.

14. The method of claim 13 wherein said programming language uses a relational model to represent data to facilitate processing by structured query language commands.

15. The method of claim 13 wherein said programming language is executed through an interpreter.

16. The method of claim 1 wherein said unit of work is divided into pages, said data components comprise application data components, and said dividing step comprises the steps of:
   a. marking a beginning of a data component;
   b. parsing through said unit of work;
   c. pattern matching data in said pages and extracting an identifier from each of said pages;
   d. marking an end of a data component when said identifier changes; and
   e. dividing out as a data component the data between said marked beginning and end.

17. A system for translating electronic data from a first format to a second format, comprising:
   a network; and
   a computer coupled to the network for receiving data transmitted from the network, said computer including:
      a communication interface including
         a driver to accept data in a first format as a unit of work, the data comprises a plurality of data components, and
         a script which determines a communication protocol to utilize to accept the data as a function of a communication process used to transmit the data to the communication interface,
      a de-enveloper coupled to the communications interface, said de-enveloper includes
         means for receiving the data from the communication interface,
         means for assigning a script name to the unit of work to identify a de-enveloping procedure that will be used to separate the received data into individual data components, the identified de-enveloping procedure being dependent on the communication process used to transmit the data to the communication interface, and
         means for dividing the received data into individual data components by executing the identified de-enveloping procedure,
      a translator coupled to the de-enveloper, said translator manipulates the individual data components from the first format into a second format which is chosen to be compatible with a desired destination for the data, and
      an enveloper coupled to the translator and the communication interface, said enveloper groups the translated individual data components into a package so that the package is available for transmission at any time by the communication interface to the desired destination.

18. The system according to claim 17 wherein said means for assigning a script name, further includes:
   means for dividing the received data into individual data components;
   means for identifying sender, receiver and transaction type; and
   means for determining the type of transformation needed and destination of the transformed individual data components.

* * * * *

UNITED STATES PATENT AND TRADEMARK OFFICE
CERTIFICATE OF CORRECTION

PATENT NO. : 5,202,977
DATED : April 13, 1993
INVENTOR(S) : Pasetes, Jr. et al.

It is certified that error appears in the above-identified patent and that said Letters Patent is hereby corrected as shown below:

Column 5, lines 49-50, change "accomodate" to --accommodate--;

Column 8, line 64, change "and 5E" to --, 5E and 5F--;

Column 11, line 63, change "request" to --requests--;

Column 15, line 38, change "5E" to --5F--;

Column 15, line 45, change "5B" to --5C--;

Column 15, line 55, change "5E" to --5F--;

Column 16, line 53, delete "In turn, data variables are one type of e-language";

Column 17, line 13, change "an" to --a--;

Column 17, line 66, change "employs" to --employ--;

Column 18, line 39, change "810" to --810--;

UNITED STATES PATENT AND TRADEMARK OFFICE
CERTIFICATE OF CORRECTION

PATENT NO. : 5,202,977

DATED : April 13, 1993

INVENTOR(S) : Pasetes, Jr. et al.

It is certified that error appears in the above-identified patent and that said Letters Patent is hereby corrected as shown below:

Column 18, line 57 change "(0)" to --(O)"--;

Column 18, lines 65-66, change "tree HEADING LOOP

__N1[3]N1[2]" to --tree\HEADING\LOOP

__N1[3]\N1[2]";

Column 19, line 45, change "[-9]" to --[0-9]--;

Column 20, line 41, change "tree HEADING LOOP

__[3]N2[2]" to --tree\HEADING\LOOP

__N1[3]\N2[2]".

UNITED STATES PATENT AND TRADEMARK OFFICE
CERTIFICATE OF CORRECTION

PATENT NO. : 5,202,977
DATED : April 13, 1993
INVENTOR(S) : Pasetes, Jr. et al.

It is certified that error appears in the above-indentified patent and that said Letters Patent is hereby corrected as shown below:

Column 21, lines 5 and 6, change "tree HEADING LOO__P N1[1] PER [1][2]" to --tree\HEADING\LOOP__ N1[1]\PER [1][2]"--;

Column 21, line 20, change ""n"" to --"\n"--;

Column 21, line 39, change "tree HEADING BIG" to --tree\HEADING\BIG"--;

Column 21, line 58, change "tree HEADING BIG" to --tree\HEADING\BIG--;

Column 283, lines 32-33, delete "in a computer system" (both occurrences).

Signed and Sealed this

Nineteenth Day of April, 1994

Attest:

BRUCE LEHMAN

Attesting Officer      Commissioner of Patents and Trademarks